United States Patent [19]

Kyojima et al.

[11] Patent Number: 5,434,962
[45] Date of Patent: Jul. 18, 1995

[54] METHOD AND SYSTEM FOR AUTOMATICALLY GENERATING LOGICAL STRUCTURES OF ELECTRONIC DOCUMENTS

[75] Inventors: Masaki Kyojima; Koji Kusumoto; Makoto Takeoka; Noriyuki Kamibayashi, all of Tokyo, Japan

[73] Assignee: Fuji Xerox Co., Ltd., Tokyo, Japan

[21] Appl. No.: 248,547

[22] Filed: May 24, 1994

Related U.S. Application Data

[63] Continuation of Ser. No. 756,061, Sep. 6, 1991, abandoned.

[30] Foreign Application Priority Data

Sep. 7, 1990 [JP] Japan .................................. 2-235740
Nov. 8, 1990 [JP] Japan .................................. 2-301164

[51] Int. Cl.$^6$ .............................................. G06F 3/14
[52] U.S. Cl. .................................................. 395/145
[58] Field of Search ............................ 395/145, 148; 364/419.1

[56] References Cited

U.S. PATENT DOCUMENTS

| | | | |
|---|---|---|---|
| 3,886,325 | 5/1975 | Dorr et al. ................. | 235/61.6 R |
| 4,633,430 | 12/1986 | Cooper ........................ | 364/419 |
| 4,751,740 | 6/1988 | Wright ........................ | 382/1 |
| 4,912,669 | 3/1990 | Iwamoto et al. .......... | 364/419 |
| 4,949,287 | 8/1990 | Yamaguchi et al. ....... | 364/419 |
| 4,996,662 | 2/1991 | Cooper et al. ............. | 364/900 |
| 5,043,891 | 8/1991 | Goldstein et al. ......... | 364/419.1 |
| 5,119,491 | 6/1992 | Iwai et al. ................... | 395/600 |
| 5,130,924 | 7/1992 | Barker et al. .............. | 364/419 |
| 5,181,162 | 1/1993 | Smith et al. ................ | 364/419 |
| 5,251,314 | 10/1993 | Williams ..................... | 364/419.1 |
| 5,280,574 | 1/1994 | Mizuta et al. .............. | 395/145 |

OTHER PUBLICATIONS

ITO/TG97/SG18/WG3 N 764 entitled "Informal Introduction to ODA", pp. 1-16, published in 1987.
GCL 890058, "Concepts and Models for Structured Documents", pp. 7-38, by R. Furuta, Cambridge Univ. Press, 1989.
ISO 8613-2, 1989 (E) pp. 4-7, 54,55, 124, 146, 153, 165, 1989.
"An Approach to Automatical Forms Processing System" by Syozi Yamada and Katarou Yamashite, pp. 2571-2572, 1987.
"A Proposal on Forms Processing User Interface" by Kaori Asami and Syozi Yamada, pp. 2213-2214, published in 1988.
"A Prototype of ODA Documents Processing System—Design Issues" by Masami Ishida and Makoto Murata, 1988.
"A Prototype of ODA Document Processing System (2)—Input and Imaging Processes" by Yoshiaki Suzuki et al., pp. 1855-1856, 1988.
"A Prototype of an ODA Document Processing System (3)—Layout Process" by by N. Hayashi et al., pp. 1857-1858, 1988.

Primary Examiner—Heather R. Herndon
Assistant Examiner—N. Kenneth Burraston
Attorney, Agent, or Firm—Finnegan, Henderson, Farabow, Garrett & Dunner

[57] ABSTRACT

According to the present invention, a document structure generation system in which logical structure generation rules are established between a logical structure satisfying the restrictions of a generic logical structure which restricts the logical structure of an input document or documents and a logical structure satisfying the restrictions of a generic logical structure which restricts the logical structure of an output document or documents. A logical structure of an output document can be automatically generated from a logical structure of an input document according to the rules.

5 Claims, 50 Drawing Sheets

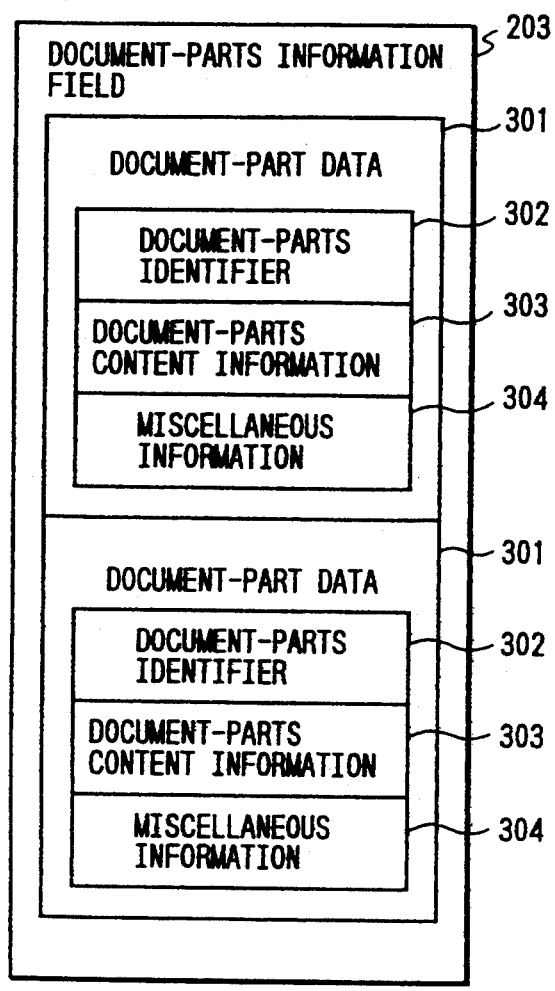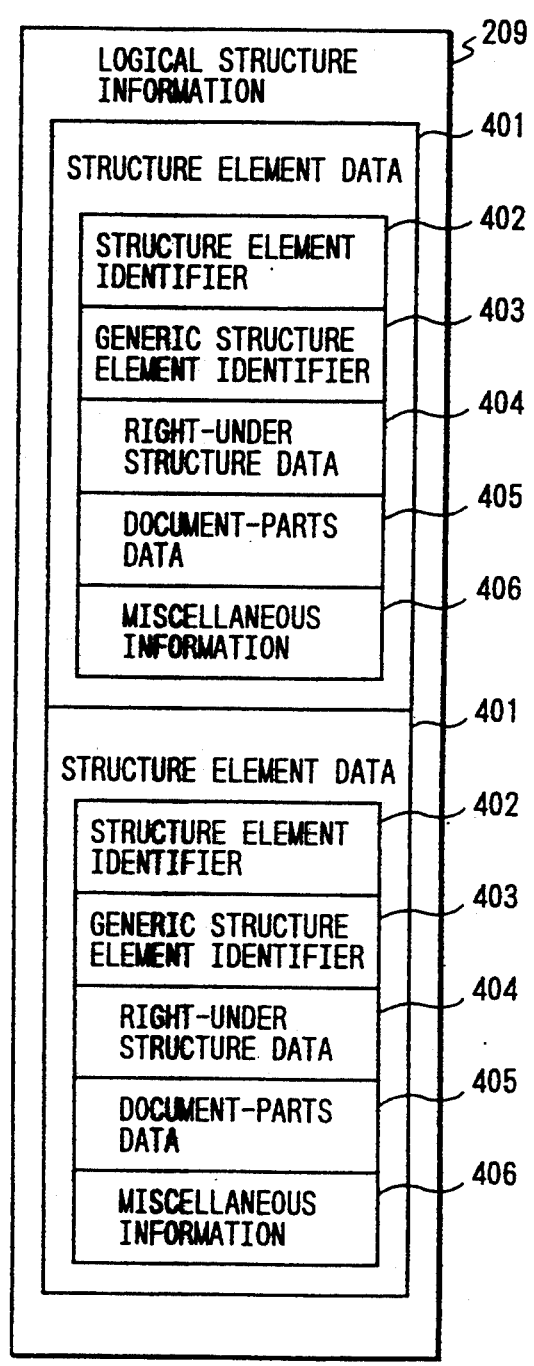

FIG. 7

| | | |
|---|---|---|
| PAPER CLASS 701 | 703 | 702 |
| R | R-1-2-1-1 | R-3-1 |
| $(R-1, R-2, R-3) | nil | ¢(R-3-1-1, R-3-1-2) |
| NAME→PAPER | NAME→NAME OF AUTHOR | NAME→MAIN BODY ELEMENT |
| R-1 | R-1-2-1-2 | R-3-1-1 |
| $(R-1-1, R-1-2) | nil | nil |
| NAME→HEADER | NAME→POST | NAME→INDENTATION |
| R-1-1 | R-2 | R-3-1-2 |
| nil | ¥(R-2-1) | nil |
| NAME→TITLE | NAME→ABSTRACT | NAME→DRAWING |
| R-1-2 | R-2-1 | |
| ¥(R-1-2-1) | nil | |
| NAME→GROUP OF AUTHOR | NAME→INDENTATION | |
| R-1-2-1 | R-3 | |
| $(R-1-2-1-1, R-1-2-1-1) | ¥(R-3-1) | |
| NAME→AUTHOR | NAME→MAIN BODY | |

Labels: 707, 708, 704, 705, 706

FIG. 8

| PAPER CLASS 801 | 812 | 802 |
|---|---|---|
| r | r-1-2-1-2 | r-3-2 |
| R | R-1-2-1-2 | R-3-1 |
| (r-1, r-2, r-3) | nil | (r-3-2-1) |
| nil | (3. PAPER A) | nil |
| NAME→PAPER A | NAME→POST | NAME→MAIN BODY ELEMENT 2 |
| r-1 | r-2 | r-3-2-1 |
| R-1 | R-2 | R-3-1-1 |
| (r-1-1, r-1-2) | (r-2-1) | nil |
| nil | nil | (6. PAPER A, 7. PAPER A) |
| NAME→HEADER | NAME→ABSTRACT | NAME→INDENTATION 3 |
| r-1-1 | r-2-1 | r-3-3 |
| R-1-1 | R-2-1 | R-3-1 |
| nil | nil | (r-3-3-1) |
| (1. PAPER A) | (4. PAPER A) | nil |
| NAME→TITLE | NAME→INDENTATION 1 | NAME→MAIN BODY ELEMENT 3 |
| r-1-2 | r-3 | r-3-3-1 |
| R-1-2 | R-3 | R-3-1-2 |
| (r-1-2-1) | (r-3-1, r-3-2, r-3-3) | nil |
| nil | nil | (8. PAPER A) |
| NAME→GROUP OF AUTHOR | NAME→MAIN BODY | NAME→DRAWING |
| r-1-2-1 | r-3-1 | |
| R-1-2-1 | R-3-1 | |
| (r-1-2-1-1, r-1-2-1-2) | (r-3-1-1) | |
| nil | nil | |
| NAME→AUTHOR | NAME→MAIN BODY ELEMENT 1 | |
| r-1-2-1-1 | r-3-1-1 | |
| R-1-2-1-1 | R-3-1-1 | |
| nil | nil | |
| (2. PAPER A) | (5. PAPER A) | |
| NAME→NAME OF AUTHOR | NAME→INDENTATION 2 | |

Labels: 803, 804, 805, 806, 807, 808, 809, 810, 811

FIG. 12

ABSTRACT CLASS — 1203

1201:
| r | r-1-2-1-1 | r-1-3 |
| R | R-1-2-1-1 | R-1-3 |
| (r-1) | nil | (r-1-3-1, r-1-3-2) |
| nil | (2. ABSTRACT A) | nil |
| NAME→ABSTRACT A | NAME→AUTHOR NAME 1-1 | NAME→ABSTRACT 1 |

| r-1 | r-1-2-1-2 | r-1-3-1 |
| R-1 | R-1-2-1-2 | R-1-3-1 |
| (r-1-1, r-1-2, r-1-3) | nil | nil |
| nil | (3. ABSTRACT A) | (6. ABSTRACT A) |
| NAME→SUMMARY 1 | NAME→POST 1-1 | NAME→INDENTATION 1-1 |

| r-1-1 | r-1-2-2 | r-1-3-2 |
| R-1-1 | R-1-2-1 | R-1-3-1 |
| nil | (r-1-2-2-1, r-1-2-2-2) | nil |
| (1. ABSTRACT A) | nil | (7. ABSTRACT A) |
| NAME→TITLE 1 | NAME→AUTHOR 1-2 | NAME→INDENTATION 1-2 |

1202:
| r-1-2 | r-1-2-2-1 | |
| R-1-2 | R-1-2-1-1 | |
| (r-1-2-1, r-1-2-2) | nil | |
| nil | (4. ABSTRACT A) | |
| NAME→AUTHOR GROUP 1 | NAME→AUTHOR NAME 1-2 | |

| r-1-2-1 | r-1-2-2-2 | |
| R-1-2-1 | R-1-2-1-2 | |
| (r-1-2-1-1, r-1-2-1-2) | nil | |
| nil | (5. ABSTRACT A) | |
| NAME→AUTHOR 1-1 | NAME→POST 1-2 | |

FIG. 15(a)

```
┌─────────────────────────────────────┐
│ ABSTRACT GENERATION                 │─── 1501
├─────────────────────────────────────┤
│ ABSTRACT CLASS                      │─── 1502
├─────────────────────────────────────┤
│ PAPER CLASS, ABSTRACT CLASS         │─── 1503
├─────────────────────────────────────┤
│  ┌───────────────────────────────┐  │
│  │ RULE 1                        │  │──1504
│  ├───────────────────────────────┤  │
│  │ No = R@ABSTRACT CLASS : o     │  │──1505
│  ├───────────────────────────────┤  │
│  │ Ni = R@ABSTRACT CLASS : i     │  │
│  ├───────────────────────────────┤  │
│  │ COUNT(No) ← COUNT(Ni) + 1     │  │
│  └───────────────────────────────┘  │
│  ┌───────────────────────────────┐  │
│  │ RULE 2                        │  │──1506
│  ├───────────────────────────────┤  │
│  │ No = R-1-2#1. R-1#x. R@ABSTRACT CLASS : o │
│  │      AND x ≦ COUNT(R@ABSTRACT CLASS : i)  │
│  ├───────────────────────────────┤  │
│  │ Ni = R-1-2#1. R-1#x. R@ABSTRACT CLASS : i │
│  ├───────────────────────────────┤  │
│  │ COUNT(No) ← COUNT(Ni)         │  │
│  └───────────────────────────────┘  │
│  ┌───────────────────────────────┐  │
│  │ RULE 3                        │  │
│  ├───────────────────────────────┤  │
│  │ No = R-1-2#1. R-1#x. R@ABSTRACT CLASS : o │
│  │      AND x = COUNT(R@ABSTRACT CLASS : i) + 1 │
│  ├───────────────────────────────┤  │
│  │ Ni = R-1-2#1. R-1#1. R@PAPER CLASS : i │
│  ├───────────────────────────────┤  │
│  │ COUNT(No) ← COUNT(Ni)         │  │
│  └───────────────────────────────┘  │
│  ┌───────────────────────────────┐  │
│  │ RULE 4                        │  │
│  ├───────────────────────────────┤  │
│  │ No = R-1-3#1. R-1#x. R@ABSTRACT CLASS : o │
│  │      AND x ≦ COUNT(R@ABSTRACT CLASS : i)  │
│  ├───────────────────────────────┤  │
│  │ Ni = R-1-3#1. R-1#x. R@ABSTRACT CLASS : i │
│  ├───────────────────────────────┤  │
│  │ COUNT(No) ← COUNT(Ni)         │  │
│  └───────────────────────────────┘  │
│  ┌───────────────────────────────┐  │
│  │ RULE 5                        │  │
│  ├───────────────────────────────┤  │
│  │ No = R-1-3#1. R-1#x. R@ABSTRACT CLASS : o │
│  │      AND x = COUNT(R@ABSTRACT CLASS : i) + 1 │
│  ├───────────────────────────────┤  │
│  │ Ni = R-2#1. R@PAPER CLASS : i │  │
│  ├───────────────────────────────┤  │
│  │ COUNT(No) ← COUNT(Ni)         │  │
│  └───────────────────────────────┘  │
└─────────────────────────────────────┘
```

FIG. 15(b)

RULE 6 — 1507

No = R-1-1#1. R-1#x. R@ABSTRACT CLASS : o
    AND x≤COUNT(R@ABSTRACT CLASS : i) — 1508

Ni = R-1-2#1. R-1#x. R@ABSTRACT CLASS : i

CONTENTS(No) ← CONTENTS(Ni)

RULE 7

No = R-1-1#1. R-1#x. R@ABSTRACT CLASS : o
    AND x = COUNT(R@ABSTRACT CLASS : i) + 1

Ni = R-1-2#1. R-1#1. R@PAPER CLASS : i

CONTENTS(No) ← CONTENTS(Ni)

RULE 8

No = R-1-2-1-1#1. R-1-2-1#x. R-1-2#1.
        R-1#y. R@ABSTRACT CLASS : o
    AND y≤COUNT(R@ABSTRACT CLASS : i)

Ni = R-1-2-1-1#1. R-1-2-1#x. R-1-2#1.
        R-1#y. R@ABSTRACT CLASS : i

CONTENTS(No) ← CONTENTS(Ni)

RULE 9

No = R-1-2-1-1#1. R-1-2-1#x. R-1-2#1.
        R-1#y. R@ABSTRACT CLASS : o
    AND y = COUNT(R@ABSTRACT CLASS : i) + 1

Ni = R-1-2-1-1#1. R-1-2-1#x. R-1-2#1.
        R-1#y. R@ABSTRACT CLASS : i

CONTENTS(No) ← CONTENTS(Ni)

FIG. 20(c)

ABSTRACT CLASS

| r |
|---|
| R |
| (r-1, r-2) |
| nil |
| NAME→ABSTRACT |

| r-1 |
|---|
| R-1 |
| (r-1-1, r-1-2, r-1-3) |
| nil |
| NAME→SUMMARY |

| r-1-1 |
|---|
| R-1-1 |
| no-info |
| nil |
| NAME→TITLE |

| r-1-2 |
|---|
| R-1-2 |
| no-info |
| nil |
| NAME→AUTHOR GROUP |

~2007

| r-1-3 |
|---|
| R-1-3 |
| no-info |
| nil |
| NAME→RESUME |

| r-2 |
|---|
| R-1 |
| no-info |
| nil |
| NAME→SUMMARY |

FIG. 20(d)

ABSTRACT CLASS

| r |
|---|
| R |
| (r-1, r-2) |
| nil |
| NAME→ABSTRACT |

| r-1-3 |
|---|
| R-1-3 |
| no-info |
| nil |
| NAME→RESUME |

| r-1 |
|---|
| R-1 |
| (r-1-1, r-1-2, r-1-3) |
| nil |
| NAME→SUMMARY |

| r-2 |
|---|
| R-1 |
| no-info |
| nil |
| NAME→SUMMARY |

| r-1-1 |
|---|
| R-1-1 |
| nil |
| ? |
| NAME→TITLE |

| r-1-2 |
|---|
| R-1-2 |
| (r-1-2-1, r-1-2-2) |
| nil |
| NAME→AUTHOR GROUP |

| r-1-2-1 |
|---|
| R-1-2-1 |
| no-info |
| nil |
| NAME→AUTHOR |

| r-1-2-2 |
|---|
| R-1-2-1 |
| no-info |
| nil |
| NAME→AUTHOR |

FIG. 20(e)

ABSTRACT CLASS

| | |
|---|---|
| r | r-1-2-1-2 |
| R | R-1-2-1-2 |
| (r-1, r-2) | nil |
| nil | ? |
| NAME→ABSTRACT | NAME→POST |

| | |
|---|---|
| r-1 | r-1-2-2 |
| R-1 | R-1-2-1 |
| (r-1-1, r-1-2, r-1-3) | (r-1-2-2-1, r-1-2-2-2) |
| nil | nil |
| NAME→SUMMARY | NAME→AUTHOR |

| | |
|---|---|
| r-1-1 | r-1-2-2-1 |
| R-1-1 | R-1-2-1-1 |
| nil | nil |
| ? | ? |
| NAME→TITLE | NAME→AUTHOR NAME |

| | |
|---|---|
| r-1-2 | r-1-2-2-2 |
| R-1-2 | R-1-2-1-2 |
| (r-1-2-1, r-1-2-2) | nil |
| nil | ? |
| NAME→AUTHOR GROUP | NAME→POST |

| | |
|---|---|
| r-1-2-1 | r-1-3 |
| R-1-2-1 | R-1-3 |
| (r-1-2-1-1, r-1-2-1-2) | no-info |
| nil | nil |
| NAME→AUTHOR | NAME→RESUME |

| | |
|---|---|
| r-1-2-1-1 | r-2 |
| R-1-2-1-1 | R-1 |
| nil | no-info |
| ? | nil |
| NAME→AUTHOR NAME | NAME→SUMMARY |

| ABSTRACT CLASS | | |
|---|---|---|
| r<br>R<br>(r-1, r-2)<br>nil<br>NAME→ABSTRACT | r-1-2-1-2<br>R-1-2-1-2<br>nil<br>?<br>NAME→POST | r-1-3-2<br>R-1-3-1<br>no-info<br>nil<br>NAME→INDENTATION |
| r-1<br>R-1<br>(r-1-1, r-1-2, r-1-3)<br>nil<br>NAME→SUMMARY | r-1-2-2<br>R-1-2-1<br>(r-1-2-2-1, r-1-2-2-2)<br>nil<br>NAME→AUTHOR | r-2<br>R-1<br>no-info<br>nil<br>NAME→SUMMARY |
| r-1-1<br>R-1-1<br>nil<br>?<br>NAME→TITLE | r-1-2-2-1<br>R-1-2-1-1<br>nil<br>?<br>NAME→AUTHOR NAME | |
| r-1-2<br>R-1-2<br>(r-1-2-1, r-1-2-2)<br>nil<br>NAME→AUTHOR GROUP | r-1-2-2-2<br>R-1-2-1-2<br>nil<br>?<br>NAME→POST | |
| r-1-2-1<br>R-1-2-1<br>(r-1-2-1-1, r-1-2-1-2)<br>nil<br>NAME→AUTHOR | r-1-3<br>R-1-3<br>(r-1-3-1, r-1-3-2)<br>nil<br>NAME→RESUME | |
| r-1-2-1-1<br>R-1-2-1-1<br>nil<br>?<br>NAME→AUTHOR NAME | r-1-3-1<br>R-1-3-1<br>no-info<br>nil<br>NAME→INDENTATION | |

FIG. 20(g)

ABSTRACT CLASS

| | | |
|---|---|---|
| r<br>R<br>(r-1, r-2)<br>nil<br>NAME→ABSTRACT | r-1-2-1-2<br>R-1-2-1-2<br>nil<br>?<br>NAME→POST | r-1-3-2<br>R-1-3-1<br>nil<br>?<br>NAME→INDENTATION |
| r-1<br>R-1<br>(r-1-1, r-1-2, r-1-3)<br>nil<br>NAME→SUMMARY | r-1-2-2<br>R-1-2-1<br>(r-1-2-2-1, r-1-2-2-2)<br>nil<br>NAME→AUTHOR | r-2<br>R-1<br>(r-2-1, r-2-2, r-2-3)<br>nil<br>NAME→SUMMARY |
| r-1-1<br>R-1-1<br>nil<br>?<br>NAME→TITLE | r-1-2-2-1<br>R-1-2-1-1<br>nil<br>?<br>NAME→AUTHOR NAME | r-2-1<br>R-1-1<br>no-info<br>nil<br>NAME→TITLE |
| r-1-2<br>R-1-2<br>(r-1-2-1, r-1-2-2)<br>nil<br>NAME→AUTHOR GROUP | r-1-2-2-2<br>R-1-2-1-2<br>nil<br>?<br>NAME→POST | r-2-2<br>R-1-2<br>no-info<br>nil<br>NAME→AUTHOR GROUP |
| r-1-2-1<br>R-1-2-1<br>(r-1-2-1-1, r-1-2-1-2)<br>nil<br>NAME→AUTHOR | r-1-3<br>R-1-3<br>(r-1-3-1, r-1-3-2)<br>nil<br>NAME→RESUME | r-2-3<br>R-1-3<br>no-info<br>nil<br>NAME→RESUME |
| r-1-2-1-1<br>R-1-2-1-1<br>nil<br>?<br>NAME→AUTHOR NAME | r-1-3-1<br>R-1-3-1<br>nil<br>?<br>NAME→INDENTATION | |

| ABSTRACT CLASS | | |
|---|---|---|
| r<br>R<br>(r-1, r-2)<br>nil<br>NAME→ABSTRACT | r-1-2-1-2<br>R-1-2-1-2<br>nil<br>?<br>NAME→POST | r-1-3-2<br>R-1-3-1<br>nil<br>?<br>NAME→INDENTATION |
| r-1<br>R-1<br>(r-1-1, r-1-2, r-1-3)<br>nil<br>NAME→SUMMARY | r-1-2-2<br>R-1-2-1<br>(r-1-2-2-1, r-1-2-2-2)<br>nil<br>NAME→AUTHOR | r-2<br>R-1<br>(r-2-1, r-2-2, r-2-3)<br>nil<br>NAME→SUMMARY |
| r-1-1<br>R-1-1<br>nil<br>?<br>NAME→TITLE | r-1-2-2-1<br>R-1-2-1-1<br>nil<br>?<br>NAME→AUTHOR NAME | r-2-1<br>R-1-1<br>nil<br>?<br>NAME→TITLE |
| r-1-2<br>R-1-2<br>(r-1-2-1, r-1-2-2)<br>nil<br>NAME→AUTHOR GROUP | r-1-2-2-2<br>R-1-2-1-2<br>nil<br>?<br>NAME→POST | r-2-2<br>R-1-2<br>(r-2-2-1)<br>nil<br>NAME→AUTHOR GROUP |
| r-1-2-1<br>R-1-2-1<br>(r-1-2-1-1, r-1-2-1-2)<br>nil<br>NAME→AUTHOR | r-1-3<br>R-1-3<br>(r-1-3-1, r-1-3-2)<br>nil<br>NAME→RESUME | r-2-2-1<br>R-1-2-1<br>no-info<br>nil<br>NAME→AUTHOR |
| r-1-2-1-1<br>R-1-2-1-1<br>nil<br>?<br>NAME→AUTHOR NAME | r-1-3-1<br>R-1-3-1<br>nil<br>?<br>NAME→INDENTATION | r-2-3<br>R-1-3<br>no-info<br>nil<br>NAME→RESUME |

FIG. 20(i)

| ABSTRACT CLASS | | | |
|---|---|---|---|
| r<br>R<br>(r-1, r-2)<br>nil<br>NAME→ABSTRACT | r-1-2-1-2<br>R-1-2-1-2<br>nil<br>?<br>NAME→POST | r-1-3-2<br>R-1-3-1<br>nil<br>?<br>NAME→INDENTATION | r-2-2-1-2<br>R-1-2-1-2<br>nil<br>?<br>NAME→POST |
| r-1<br>R-1<br>(r-1-1, r-1-2, r-1-3)<br>nil<br>NAME→SUMMARY | r-1-2-2<br>R-1-2-1<br>(r-1-2-2-1, r-1-2-2-2)<br>nil<br>NAME→AUTHOR | r-2<br>R-1<br>(r-2-1, r-2-2, r-2-3)<br>nil<br>NAME→SUMMARY | r-2-3<br>R-1-3<br>(r-2-3-1)<br>nil<br>NAME→RESUME |
| r-1-1<br>R-1-1<br>nil<br>?<br>NAME→TITLE | r-1-2-2-1<br>R-1-2-1-1<br>nil<br>?<br>NAME→AUTHOR NAME | r-2-1<br>R-1-1<br>nil<br>?<br>NAME→TITLE | r-2-3-1<br>R-1-3-1<br>nil<br>?<br>NAME→RESUME |
| r-1-2<br>R-1-2<br>(r-1-2-1, r-1-2-2)<br>nil<br>NAME→AUTHOR GROUP | r-1-2-2-2<br>R-1-2-1-2<br>nil<br>?<br>NAME→POST | r-2-2<br>R-1-2<br>(r-2-2-1)<br>nil<br>NAME→AUTHOR GROUP | |
| r-1-2-1<br>R-1-2-1<br>(r-1-2-1-1, r-1-2-1-2)<br>nil<br>NAME→AUTHOR | r-1-3<br>R-1-3<br>(r-1-3-1, r-1-3-2)<br>nil<br>NAME→RESUME | r-2-2-1<br>R-1-2-1<br>(r-2-2-1-1, r-2-2-1-2)<br>nil<br>NAME→AUTHOR | |
| r-1-2-1-1<br>R-1-2-1-1<br>nil<br>?<br>NAME→AUTHOR NAME | r-1-3-1<br>R-1-3-1<br>nil<br>?<br>NAME→INDENTATION | r-2-2-1-1<br>R-1-2-1-1<br>nil<br>?<br>NAME→AUTHOR NAME | |

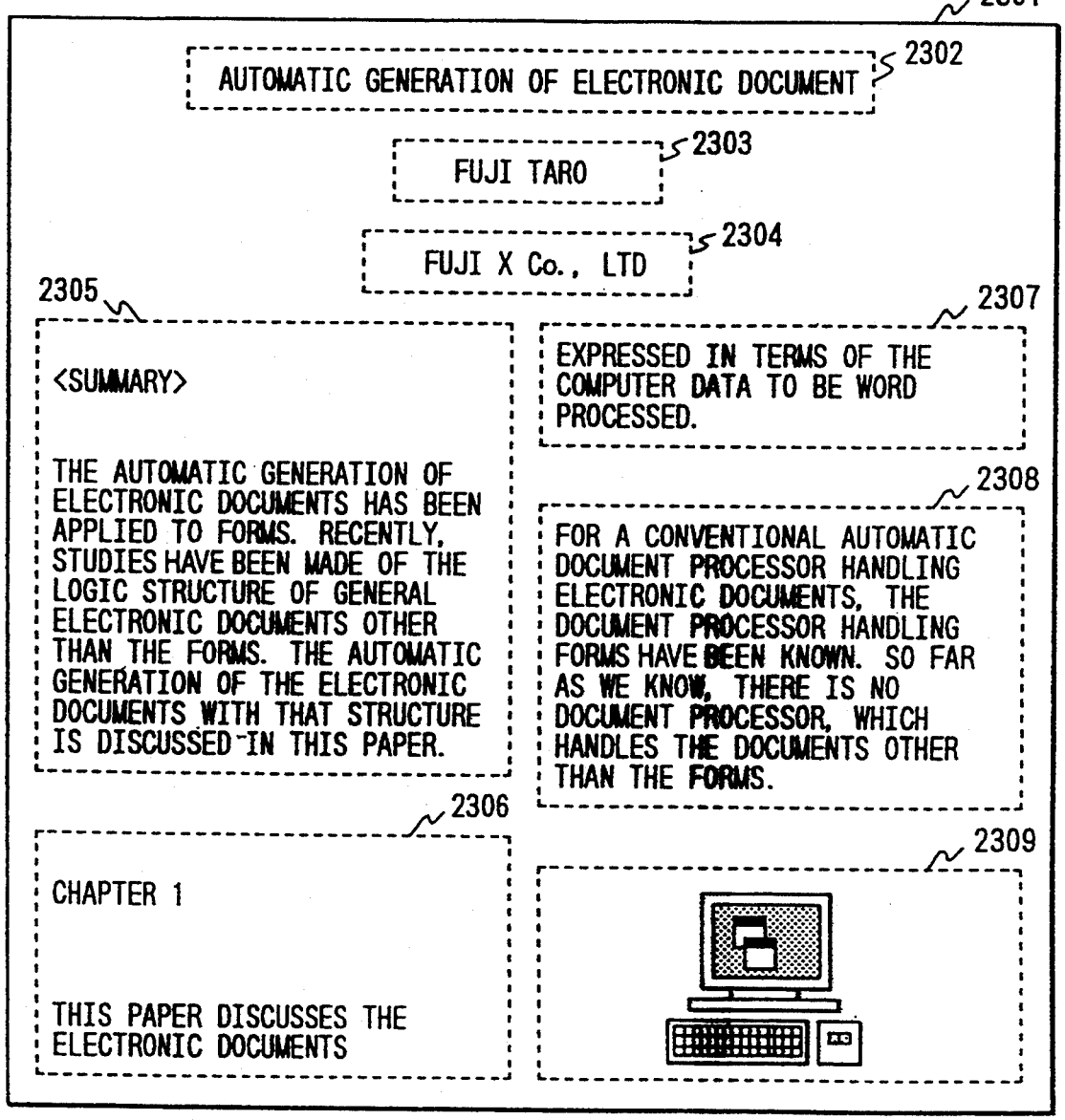

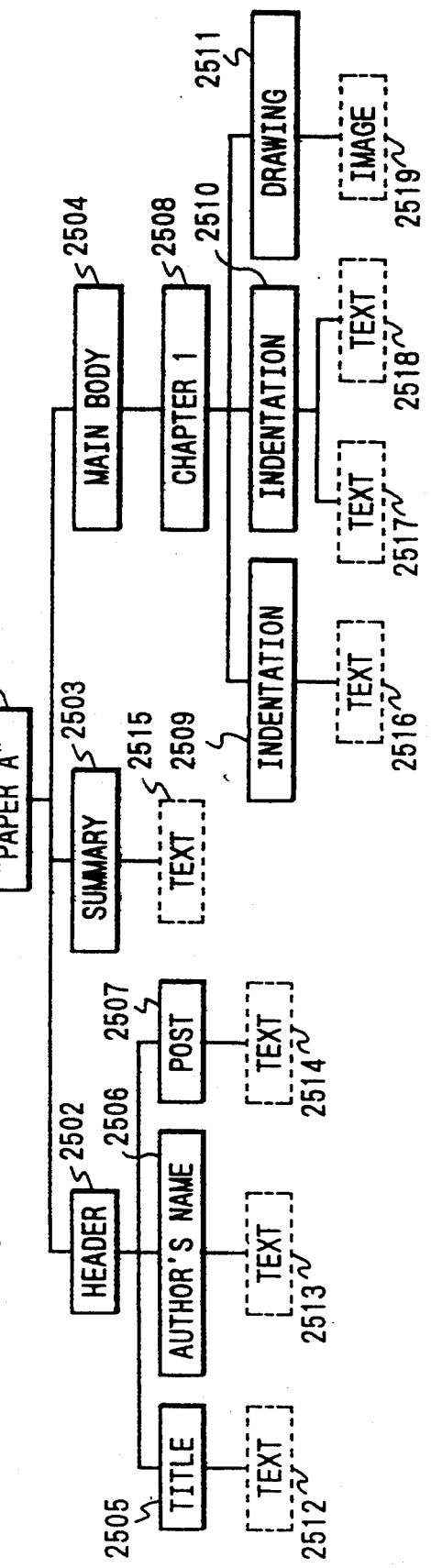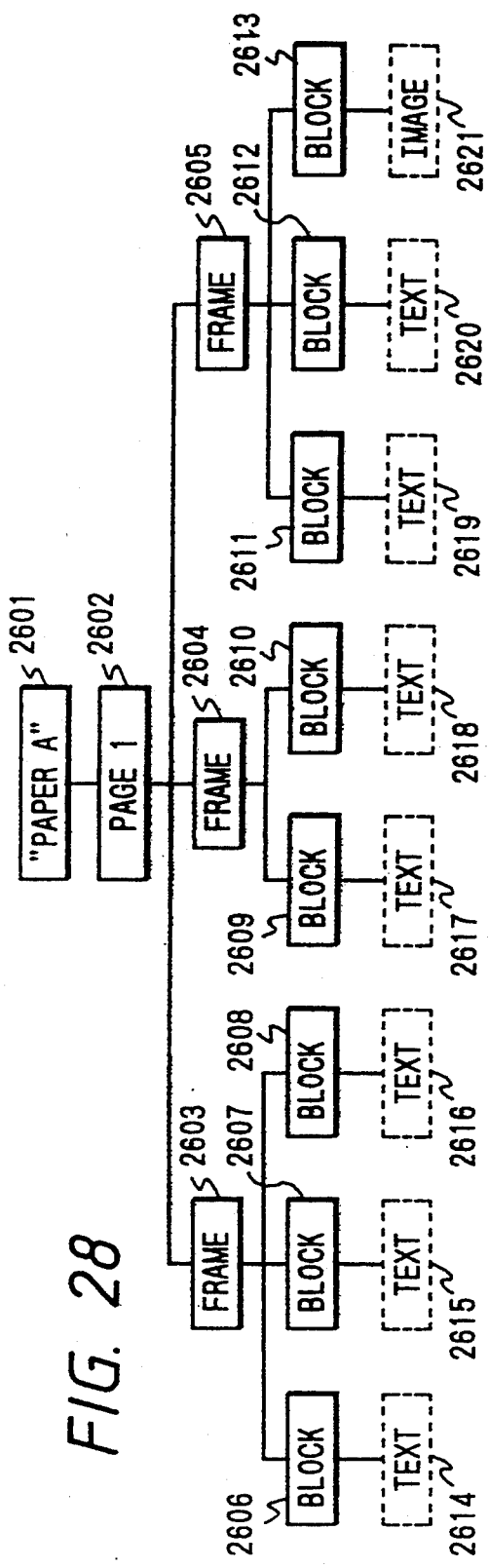
FIG. 27
FIG. 28

FIG. 31

AUTOMATIC GENERATION OF ELECTRONIC DOCUMENT — 2904
2902  2903  FUJI TARO   FUJI X Co., LTD
2905
<SUMMARY>
THE AUTOMATIC GENERATION OF ELECTRONIC DOCUMENTS HAS BEEN APPLIED TO FORMS. RECENTLY, STUDIES HAVE BEEN MADE OF THE LOGIC STRUCTURE OF GENERAL ELECTRONIC DOCUMENTS OTHER THAN THE FORMS. THE AUTOMATIC GENERATION OF THE ELECTRONIC DOCUMENTS WITH THAT STRUCTURE IS DISCUSSED IN THIS PAPER.

FUTURE OF OFFICE AUTOMATION — 2908
2906  2907  REINAN JIRO   OUR LABORATORY
2909
<SUMMARY>
PERSONAL COMPUTERS/WORK STATIONS HAVE BEEN TOOLS ESSENTIAL TO THE OFFICE WORK IN RECENT OFFICES. THE AUTOMATION OF THE OFFICE WORK BECOMES MORE IMPORTANT. THIS PAPER WILL DISCUSS THE FUTURE OF THE OFFICE WORK.

DOCUMENT PROCESSING IN OFFICES — 2912
2910  2911  TOMIREI GORO   X UNIVERSITY
2913
<SUMMARY>
IN OFFICE WORK, THE DOCUMENT PROCESSING TAKES AN IMPORTANT

FIG. 32

| ATTRIBUTE NAME | ATTRIBUTE VALUE |
|---|---|
| EDITOR | AUTO |
| DATE | 9/14 1989. |

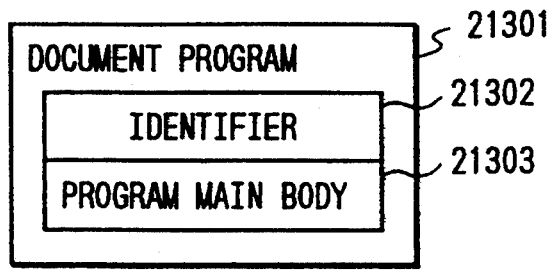

- 21301 DOCUMENT PROGRAM
- 21302 IDENTIFIER
- 21303 PROGRAM MAIN BODY

FIG. 36

```
DOCUMENT PROGRAM IDENTIFIER : ABSTRACT PREPARATION

ℓ1  : (SetID  "ABSTRACT")
ℓ2  : (MakeRoot (MakeNewNode "ABSTRACT"))
ℓ3  : (AddChild ABSTRACT (MakeNewNode "LITERATURE 1"))
ℓ4  : (AddChild ABSTRACT (MakeNewNode "LITERATURE 2"))
ℓ5  : (AddChild ABSTRACT (MakeNewNode "LITERATURE 3"))
ℓ6  : (AddSubTree LITERATURE 1 TITLE@PAPER A
ℓ7  : (AddSubTree LITERATURE 1 AUTHOR'S NAME@PAPER A
ℓ8  : (AddSubTree LITERATURE 1 POST@PAPER A
ℓ9  : (AddSubTree LITERATURE 1 SUMMARY@PAPER A
ℓ10 : (AddSubTree LITERATURE 2 TITLE@PAPER B
ℓ11 : (AddSubTree LITERATURE 2 AUTHOR'S NAME@PAPER B
ℓ12 : (AddSubTree LITERATURE 2 POST@PAPER B
ℓ13 : (AddSubTree LITERATURE 2 SUMMARY@PAPER B
ℓ14 : (AddSubTree LITERATURE 3 TITLE@PAPER C
ℓ15 : (AddSubTree LITERATURE 3 AUTHOR'S NAME@PAPER C
ℓ16 : (AddSubTree LITERATURE 3 POST@PAPER C
ℓ17 : (AddSubTree LITERATURE 3 SUMMARY@PAPER C
ℓ18 : (ChangeText "X LABORATORY" "Ourlaboratory")
ℓ19 : (SetAttribute "EDITOR" "Auto")
ℓ20 : (SetAttribute "EDIT DATE" (Date))
```

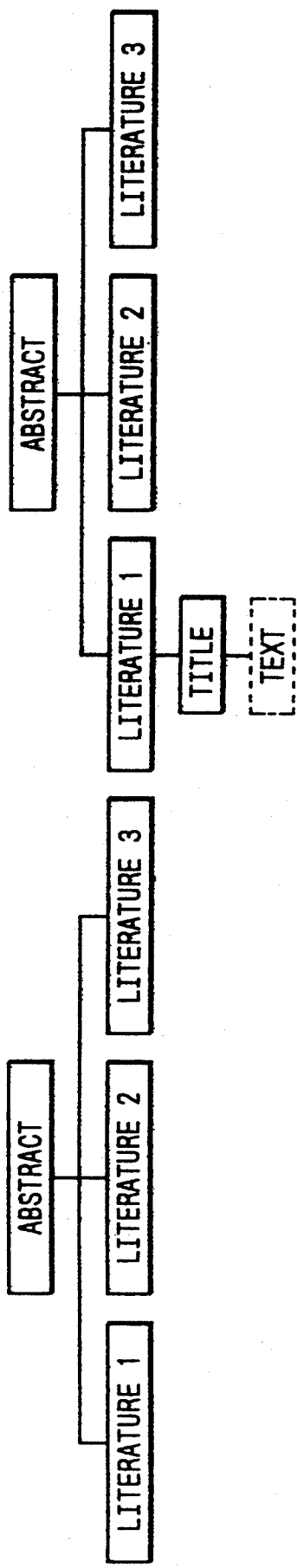
FIG. 46
FIG. 47
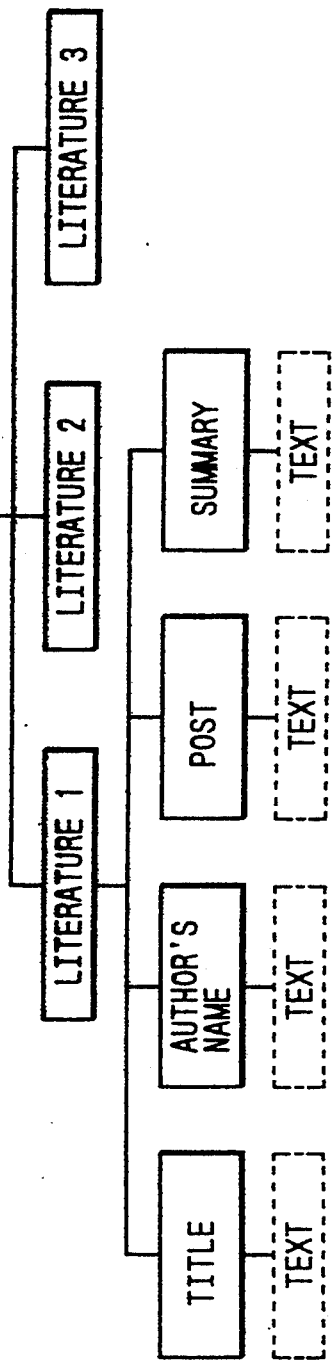
FIG. 48

METHOD AND SYSTEM FOR AUTOMATICALLY GENERATING LOGICAL STRUCTURES OF ELECTRONIC DOCUMENTS

This application is a continuation of Ser. No. 756,061 filed Sep. 6, 1991, now abandoned.

BACKGROUND OF THE INVENTION

The present invention relates to an electronic document processing system such as a system for generating document structures of electronic documents processed by word processors, work stations having document processing functions, and the like. More particularly, the invention relates to a system for automatically generating document structures of a new electronic document from or on the basis of the document structure of at least one already existing electronic document.

A known system for generating document structures of new electronic documents based on already existing or old electronic documents has been proposed. There has been proposed a document structure generation system which handles forms as the documents to be processed in a paper written by Yamada, entitled "An Approach to Automatical Forms Processing Systems" on page 2571 in the collected papers in the 35th National Convention of Data Processing Academy, and a paper written by Asami and Yamada, entitled "A Proposal on Forms Processing User Interface" on page 2571 in the collected papers in the 36th National Convention of Data Processing Academy.

In the forms, items to be entered and the format of data to be entered into the items are predetermined, and, thus, the data structure of the forms can easily be defined. Accordingly, the automatic processing for the forms can be readily accomplished by defining a data structure of the forms, preparing a program for automatically generating new forms from old forms, and executing the program to process the input data of the forms.

With regard to general-purpose electronic documents such as technical papers, manuals and specifications, except such a document as a form in which the items and the format of the data to be writted to the items are predetermined, there has not yet been developed means to define the data structure for those general-purpose electronic documents. This results in making it difficult to realize the automatic processing of the general-purpose electronic documents.

Recently, as described in a paper entitled "Concepts and Models for Structured Documents" by Furuta, R. in Cambridge University Press, pp 7–38 (1988), an electronic document is considered as being composed of a set of document-parts. Structually, the electronic document may be expressed by a logical structure and/or a layout structure. The logical structure represents logical relationships among the parts of document. The layout structure represents relationships among the document-part on the basis of the physical layout. The approach may relatively readily express the data structure of the electronic document.

The document with the above-described document structure is called as a structured document.

The ODA (Office Document Architecture) as an international standard specifying the concepts of the structured documents, requires the electronic document to have a specific logical structure representative of relationships among the document-parts and a specific layout structure representative of relationships among the document-parts as described in ISO/IS 8613, Information Processing—Text and Office System—Office Document Architecture (ODA) and Interchange Format (1988).

The ODA also prescribes a generic structure (consisting of a generic logical structure and a generic layout structure) which restricts possible structures of a specific logical structure and a specific layout structure.

The documents of the same type have the same generic structure. For example, all the patent specifications have a same generic structure, and all the technical manuals have also a same generic structure.

The ODA document is generated with reference to a structural mode of the generic structure.

The electronic document processing techniques, which are for the edit processing and the automatic layout processing of electronic documents according to the ODA rules, have been proposed in the following papers:

1) Paper written by Ishida and Murata, entitled "A prototype of ODA Documents Processing System (1)—Subject of Design—" on page 1853 in the collected papers in the 37th National Convention of Data Processing Academy, 2) Paper written by Suzuki, Nakatsuyama, and Murata, entitled "A prototype of an ODA Document Processing System (2) —input and imaging processes—" on page 1855 in the collected papers in the 37th National Convention of Data Processing Academy, and 3) Paper written by Hayashi, Saito, Ishida, and Murata, entitled "A prototype of an ODA Document Processing System (3) —Layout Processing—" on page 1857 in the collected papers in the 37th National Convention of Data Processing Academy.

Most of the document processing works in offices have the following features:

(1) The logical structures of the documents are explicitly or implicitly prescribed in the company, and most of the documents perfectly or partially satisfy the requirements for the prescribed logical structures.

(2) Relationships based on the logical structure exist among documents. (For example, the title of a document is of the same as an item in another document).

A part or the whole of a document is periodically or intermittently generated many times, or a number of parts of a document or a number of documents are generated once.

The document processing, except forms processings, for example, is performed through an interactive edit by an operator.

In this case, the following features may be pointed out:

(1) Similar interactive edit works are periodically or intermittently applied to a number of documents of the same type many times or much edit work is applied one time.

(2) Most document processing work is accomplished based on already existing documents.

The document processing as just mentioned involves the problems of redundancy and inefficiency arising from the interactive edit by an operator.

The documents with the fixed document structure, such as tables and forms, can be completed by the prior art in a manner that the correspondence is set up between the content of a document and that of another document, and the new document is generated on the basis of the correspondence.

In technical literatures, manuals, reports, and the like, a general framework is applied to the documents, but no restriction is placed in determining the detailed structure.

The logical structures of those documents cannot be represented until the structured documents according to the ODA are presented.

However, the logical structures which have been prescribed according to the ODA, only restricts possible structures before the generation of documents. Accordingly, it is disadvantageous in that it is impossible to determine the document contents and the number of contents before the generation of the document, the logical structure of which is determined when generating the document, resulting in making it impossible to accomplish automatic processing by way of automatically processing as done for forms in view of the correspondence among the document parts.

SUMMARY OF THE INVENTION

The present invention has been made to solve the problems as mentioned above, and an object of the present invention is to provide an automatic document generation system capable of handling the structured documents, other than forms, with less manual labor.

To achieve the above object, there is provided a system for generating document structures of electronic documents each of which has a logical structure expressed in terms of nodes indicative of a group of document-parts as grouped on the basis of structural meaning, and in which restrictions on a connection state of nodes within which the logical structure of the document may hold are defined by a generic logical structure, wherein when the document structure generating system receives the logical structure of at least one already existing electronic document, and outputs a part or the whole of a logical structure of a new electronic document, rules for generating a logical structure of an output document on the basis of the information from the logical structure of at least one input document, are previously set up between an input generic logical structure which restricts the logical structure of the input document and an output generic logical structure which restricts the logical structure of the output document, the document structure generation system gains the information of a logical structure satisfying the restrictions of the input generic logical structure from the logical structure of the input document, and automatically generates a part or the whole logical structure satisfying the restrictions of the output generic logical structure.

According to another aspect of the invention, there is provided a system for generating document structures of electronic documents each of which has a logical structure expressed by a tree structure as a connection of nodes indicative of a group of document-parts as grouped on the basis of structural meaning, in which the restrictions on a connection state of nodes within which the document logical structure may hold are defined by a generic logical structure expressed by a set of generic logical structure elements as basic elements of the nodes which may appear in the tree structure, and in which the restrictions on a string of child nodes of the nodes of which the basic elements are the generic logical structure elements, are described in the generic logical structure elements, wherein when the document structure generation system receives the logical structure of at least one already existing electronic document, and outputs a part or the whole of a logical structure of a new electronic document, logical structure element generation rules are previously set up, which includes a relationship between a string of child nodes applicable to the nodes of which the basic elements are the generic logical structure elements contained in an input generic logical structure which restricts the logical structure of an input document, and a string of child nodes applicable to the nodes of which the basic elements are generic logical structure elements contained in an output generic logical structure which restricts the logical structure of an output document, and application conditions to select the node to which the relationship is applied, whereby the document structure generation system automatically generates a part or the whole logical structure of the output document on the basis of the logical structure of the input document according to the logical structure element generation rules.

In the invention, generation rules are previously established between a logical structure satisfying the restrictions of a generic logical structure which restricts the logical structure of an input document or documents and a logical structure satisfying the restrictions of a generic logical structure which restricts the logical structure of an output document or documents. A logical structure of an output document can be automatically generated from a logical structure of an input document according to the rules.

Particularly when the generation rules are described for the generic logical structures in which the restrictions on the logical structure are described, the logical structures having the same generic logical structures can be processed using the same generation rule.

For example, if there is a generic logical structure of a patent specification, the rules for the automatic logical structure generation, that are described using the generic logical structure, are applicable for all the patent specifications.

The present invention is effective particularly for the generation of specific logical structures of the ODA.

According to the the other aspect of the present invention, there is provided an electronic document processing system comprising: an electronic document memory unit for storing at least one electronic document including a set of document-parts each containing a part of the document contents, a logical structure containing logical relationships among the document-parts, a layout structure containing positional relationships of the document-parts from a document layout point of view, and the document attributes; a document program memory unit for storing a program to generate the whole or a part of a set of document-parts, logical structure, and/or attributes of an electronic document from the set of document-parts, logical structure, and attributes of the electronic document; and a document program executing unit for reading the electronic document from said electronic document memory unit, executing the program described in said document program memory unit, and automatically generating the whole or a part of a set of document-parts, logical structure, and/or attributes of an electronic document.

BRIEF DESCRIPTION OF THE DRAWINGS

In the accompanying drawings:

FIG. 3 a diagram showing a data structure of the document-parts information contained in the electronic document data;

FIG. 4 is a diagram showing a data structure of the logical structure data contained in the electronic document data;

FIG. 7 is a diagram useful in explaining the content of a generic logical structure having a generic logical structure identifier called "Paper Class", which is stored in the generic logical structure memory unit;

FIG. 8 is a diagram useful in explaining the content of a logical structure information field contained in an electronic document having a document identifier called "Paper A", which is stored in the generic logical structure memory unit;

FIG. 12 is a diagram useful in explaining the content of the logical structure information contained in an electronic document having a document identifier "abstract A", which is stored in the electronic document memory unit;

FIGS. 15a and 15b shows diagrams which cooperate to show the content of a logical structure generation program having an identifier "Abstract Generation", which is stored in the logical structure generation program memory unit;

FIGS. 20a–20i are diagrams useful in explaining a process through which a new logical structure is generated according to the flow chart of FIG. 19, the diagrams showing a generic logical structure identifier and a status of the logical structure;

FIG. 25 is an explanatory diagram for explaining an electronic document with an identifier "Paper A", stored in the electronic document memory unit 2103 in FIG. 23;

FIG. 26 is a table listing attributes of the "Paper A";

FIG. 27 is a diagram showing a logic structure of the "Paper A", which is expressed in a tree structure showing comprehensive relationships;

FIG. 28 is a diagram showing a layout structure of the "Paper A", which is also expressed in a tree structure showing comprehension relationships;

FIG. 31 is an explanatory diagram for explaining an electronic document which is automatically generated from the "Paper A", "Paper B", and "Paper C" when the document program executing unit 2106 (FIG. 23) executes a document program (to program 2104 (FIG. 23); be given in later and shown in FIG. 36) stored in the document program memory unit 2104 (FIG. 23);

FIG. 32 is a table listing attributes of the "Abstract";

FIG. 35 is a diagram showing a data structure of a document program stored in the document program memory unit;

FIG. 36 is a diagram showing an example of the document program described in the document program memory unit 2104;

FIGS. 46 to 48 are diagrams showing processes of generating logic structures of electronic documents outputted when the document program executing unit 2106 executes the document program (shown in FIG. 36) for the "Paper A", "Paper B", and "Paper C" (shown in FIGS. 25, 29, and 30);

DESCRIPTION OF THE PREFERRED EMBODIMENTS

A preferred embodiment of the present invention will be described with reference to the accompanying drawings.

Figure 1:
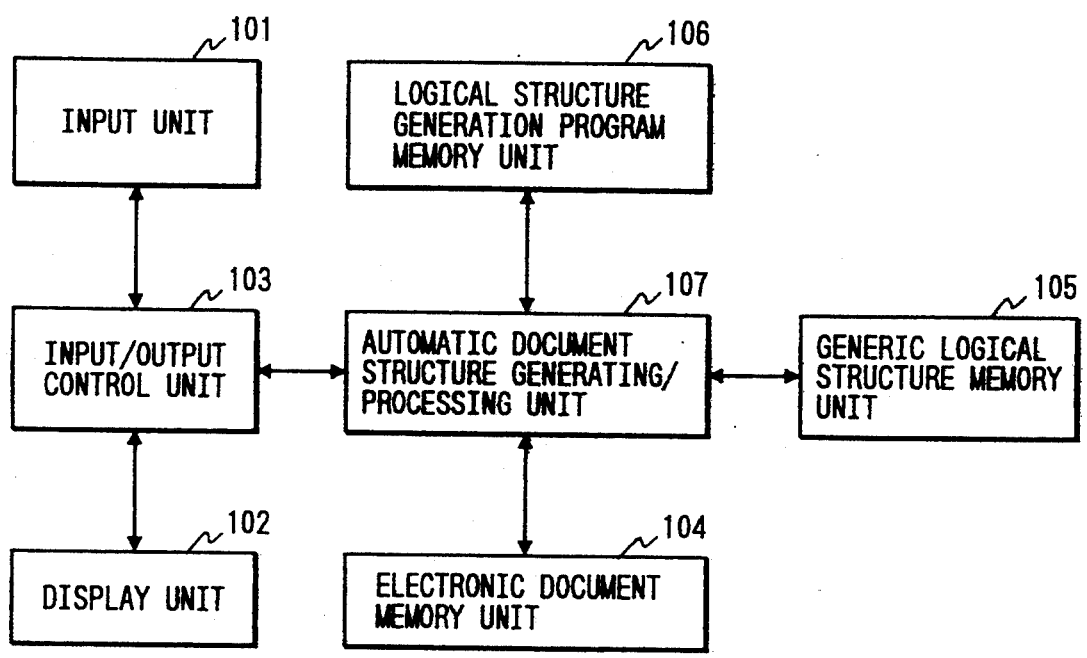
FIG. 1 is a block diagram showing a scheme of a system for generating logical structures of documents incorporating the invention.

FIG. 1 is a block diagram showing a scheme of a system for generating logical structures of documents incorporating the invention.

In the figure, reference numeral 101 designates an input unit including a keyboard, a mouse, and the like. An operator operates the input unit 101 to enter an instruction to start an automatic logical structure generating processing.

A display unit 102 is a CRT display, for example. Numeral 103 designates an input/output control unit. An electronic document memory unit 104 stores sets of document-parts of electronic documents, logical structures, layout structures, and document attributes. A generic logical structure memory unit 105 stores a generic logical structure as a common structure for the documents to be processed in an automatic logical structure generating processing mode.

A logical structure generation program memory unit 106 stores a logical structure generation program for generating a logical structure and a new electronic document from a logical structure of an existing electronic document.

An automatic logical structure generating/processing unit 107 generates a logical structure of a new document, document-parts of a new electronic document, and a new connection of the logical structure and the document-parts, which satisfy the restrictions on a generic logical structure stored in the generic logical structure memory unit 105, the generic logical structures derived from a logical structure of an electronic document or documents stored in the electronic document memory unit 104 according to a logical structure generation program stored in the logical structure generation program memory unit 106.

Figure 2:
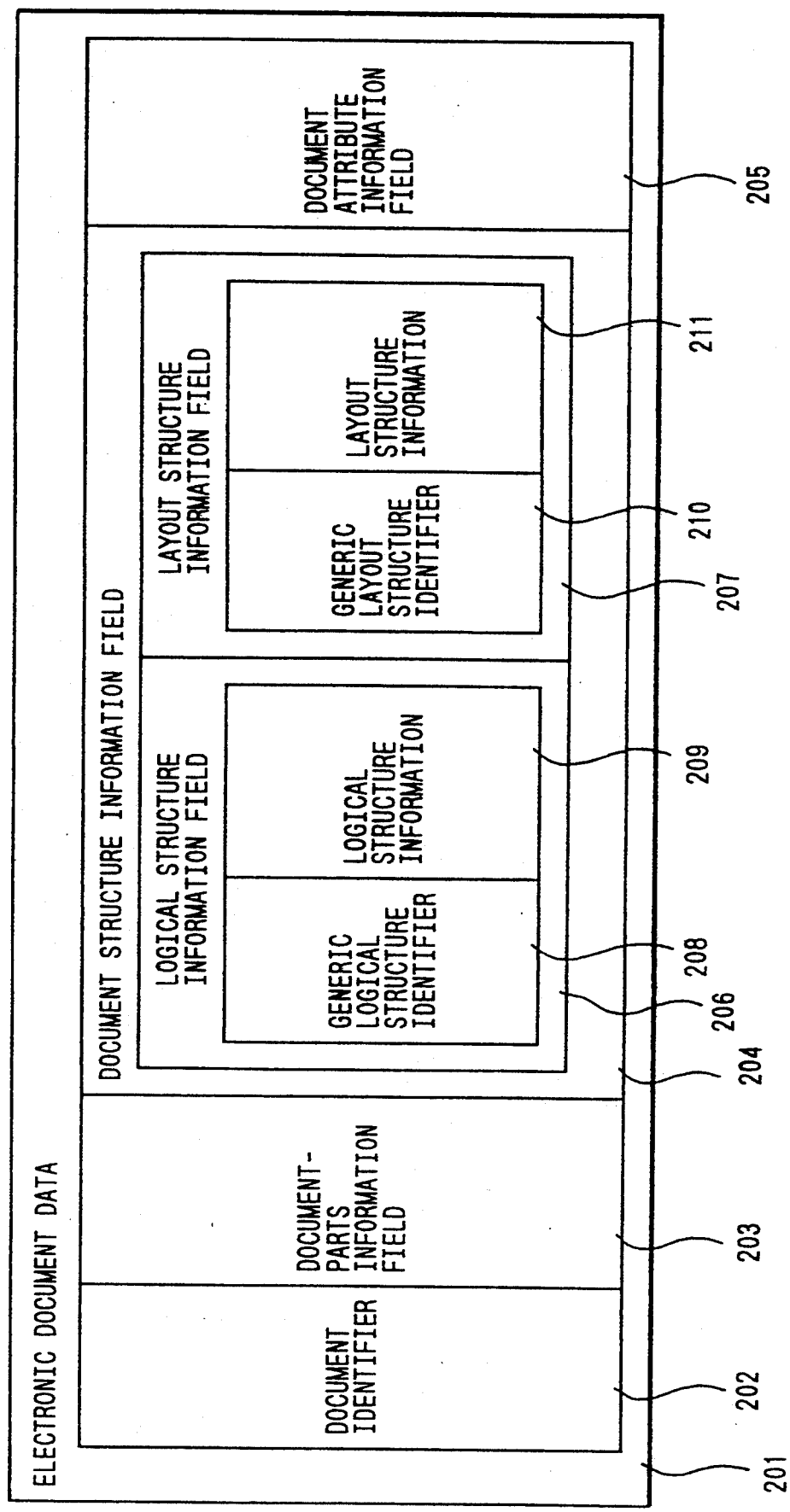
FIG. 2 is a diagram showing a data structure of an electronic document to be stored in the electronic document memory unit.

FIG. 2 is an explanatory diagram showing a data structure of an electronic document to be stored in the electronic document memory unit 104.

In the figure, reference numeral 201 designates electronic document data; 202, a document identifier as an identifier of the electronic document; 203, a document-parts information field as information on document-parts as a part of the electronic document data; 204, a document structure information field as information on the document structures (logical structure and layout structure) as part of the electronic document data; 205, a document attribute information field as information on document attribute as part of electronic document data; 206, a logical structure information field; 207, a layout structure information field contained in the document structure information field 204; 208, a generic logical structure identifier as an identifier of a generic logical structure which restricts generation of a logical structure contained in logical structure information field 206; 209, logical structure information contained in the logical structure information field 206; 210, a generic layout structure identifier as an identifier of a generic layout structure which restricts generation of a generic layout structure contained in the layout structure information field 207; and 211, layout structure information contained in the layout structure information field 207.

FIG. 3 is an explanatory diagram showing a data structure of the document-parts information contained in the electronic document data. In the figure, reference numeral 301 designates document-part data; 302, a document-parts identifier contained in document-part data 301; and 303, a field for storing information on the content of document-parts, which is contained in the document-part data 301, more specifically storing information on a part of the content of a document contained in the document-parts.

304 denotes a field for storing miscellaneous information on document-parts data contained in the document-part data 301.

FIG. 4 is an explanatory diagram showing a data structure of the logical structure data contained in the electronic document data.

In the present embodiment, the logical structure is arranged such that nodes, each indicating a group of document-part as grouped on the structural meaning, are connected in a tree structure, and the document-parts are connected to leaf nodes in the logical structure. Either of a plurality of child nodes or a plurality of document-parts are clustered from the node. Nothing hangs down from the document-parts.

In the figure, reference numeral 401 indicates a structure element field for storing data of structure elements, which make up a logical structure. The structure elements correspond to the nodes in the logical structure.

Information on the connection of the structure elements, which holds information on a string (right-under structure) of the child nodes of the structure elements, is expressed in terms of right-under structure data.

A structure element identifier 402, contained in the structure element data 401, indicates an identifier of the structure element.

An identifier 403 serves as an identifier of a generic structure element which restricts the structure element designated by the structure element identifier 402.

The generic structure elements make up a generic logical structure, and restricts the right-under structure of the structure elements.

One generic structure element restricts one or a plurality of structure elements.

Reference numeral 404 indicates right-under structure data in which if the structure element designated by the structure elements identifier 402 has a right-under structure, the right-under structure is described.

The right-under data 404 stores a list of identifiers of the child nodes of the structure elements, i.e., a list of structure element identifier.

Numeral 405 indicates such document-parts data that, when the structure element designated by the structure element identifier 402 is a leaf node having no child node, and when it has specific document-parts, it is described.

The document-parts data holds a list of document-part identifier.

A field 406 stores miscellaneous information on the structure elements data contained in the structure element data 401.

The layout structure information 211 contained in the electronic document data 201 has also a data structure similar to that of the logical structure information 209.

Figure 5:
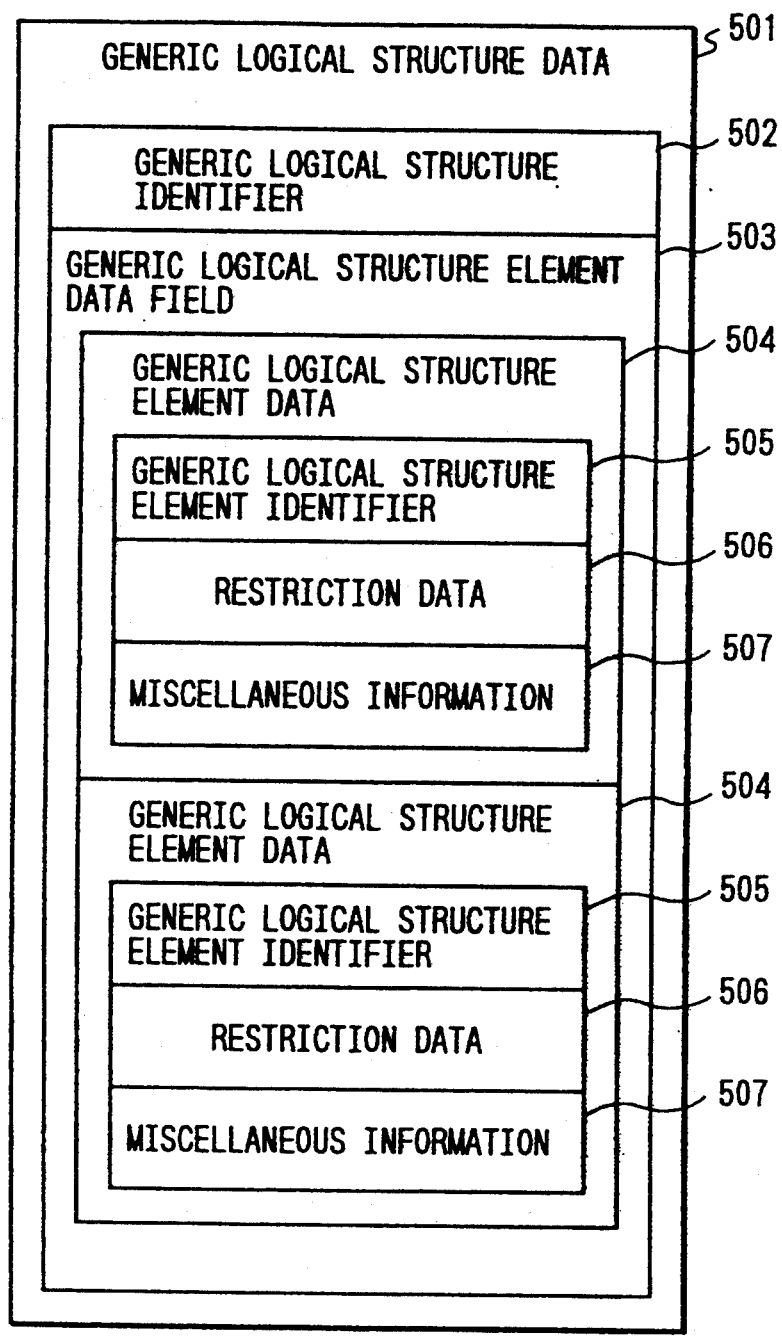
FIG. 5 is a diagram showing a data structure of the generic logical structure data stored in the generic logical structure memory unit.

FIG. 5 is an explanatory diagram showing a data structure of the generic logical structure data stored in the generic logical structure memory unit 105.

In the figure, reference numeral 501 designates generic logical structure data; 502, a generic logical structure identifier; 503, a generic stucture element data field which stores data of the generic stucture elements constituting a generic logical structure; 504, generic stucture element data stored in the generic stucture element data field 503; and 505, a generic stucture element identifier for identifying individual generic stucture element data items, that is, an identifier for the generic stucture elements.

Reference numeral 506 represents restriction information for restricting the right-under structure of the structure element; and 507, a field for storing miscellaneous information on the generic stucture element data contained in the generic stucture element data 504.

Figure 6:
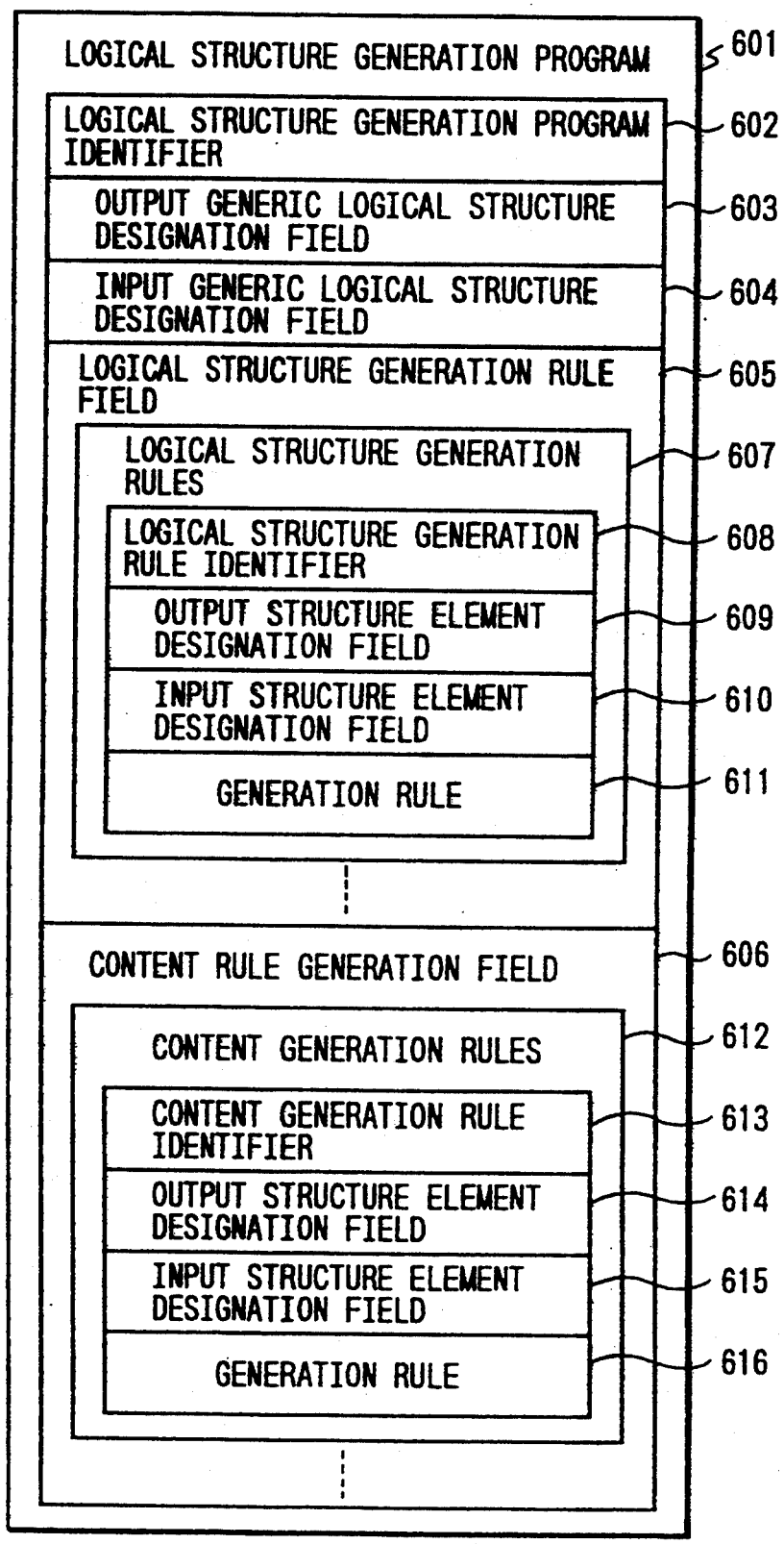
FIG. 6 is a diagram showing a data structure of a logical structure generation program stored in the logical structure generation program memory unit.

FIG. 6 is a diagram showing a data structure of a logical structure generation program stored in the logical structure generation program memory unit 106.

In the figure, reference numeral 601 designates a logical structure generation program; 602, a logical structure generation program identifier; 603, an output logical structure designating field for designating a generic logical structure of a logical structure of an output electronic document; 604, an input generic logical structure designating field for designating a generic logical structure of a logical structure of an electronic document to be inputted; and 605, a field for structure element generation rules contained in a logical structure generation program, in which rules for generating a new logical structure from an already existing logical structure are described.

Numeral 606 designates a field for content generation rules contained in the logical structure generation program 601. In this field, rules are described which are for generating document-parts of a new document and a connection of the document-parts and a logical structure of the new document, from document-parts of an old document, and a connection of the document-parts and a logical structure of the old document.

Numeral 607 indicates structure element generation rules stored in the structure element generation rule field 605; 608, a structure elements generation rule identifier for identifying the structure element generation rules; 609, an output structure element designation field which stores description of conditions (structure element designation description) for the structure elements in the logical structure of the output document to which the structure element generation rules designated by the structure element generation rule identifier 607 is applied; and 610, an input structure element designation field which stores description of conditions (structure element designation description) for the structure elements in the logical structure of the input document to which the structure element generation rules designated by the structure element generation rule identifier 607 is applied.

The descriptions in the input and output structure element designation fields serve as the condition for applying the structure element generation rule.

Reference numeral 611 designates generation rules applied to the structure elements designated by the output and input structure element designation fields 609 and 610.

Numeral 612 designates content generation rules stored in the content generation rule field 606; 613, a content generation rule identifier for identifying each content generation rule; 614, an output structure element designation field which stores description of conditions (structure element designation description) for the structure elements in the logical structure of the output document to which the content generation rules designated by the content generation rule identifier 613 is applied; and 615, an input structure element designation field which stores description of conditions (structure element designation description) for the structure elements in the logical structure of the input document to which the content generation rules designated by the content generation rule identifier 613 is applied.

The descriptions of the input and output structure element designation fields serve as the conditions for applying the content generation rule.

Numeral 616 designates generation rules applied to the structure elements as designated by the output and input structure element designation fields 614 and 615.

FIG. 7 is a diagram for explaining the content of a generic logical structure having a generic logical structure identifier called "Paper Class", which is stored in the generic logical structure memory unit.

In the figure, reference numeral 701 designates a generic logical structure identifier; and 702, a generic logical structure element data field.

Some items of generic logical structure element data 703 are stored in the generic logical structure element data field 702, In the case of the paper class, 13 items of generic logical structure element data 703 are stored in the generic logical structure element structure data field 702.

What is expressed by "R", "-", and numerals, as indicated typically in block 704, is the generic structure element identifier.

Restriction information, which restricts the right-under structure as a string of child nodes of the structure elements, as typically in block 705, is described by descriptors, such as "$", " " and "¢", and "nil" or list of the generic logical stucture element identifiers 705 or "nil".

Numeral 706 designates the name attached to each generic logical stucture element data 703 to provide an easy understanding by users, and corresponds to the miscellaneous information 507.

FIG. 8 is a diagram for explaining the content of a logical structure information field 206 contained in an electronic document having a document identifier 202 called "Paper A", which is stored in electronic document memory unit 104.

In the figure, reference numeral 801 designates a generic logical structure identifier, which is an identifier of a generic logical structure, which restricts a logical structure of an electronic document of "paper A"; 802, a logical structure information; and 803, structure element data.

16 items of structure element data are stored in the logical structure information 802.

What is expressed by "r", "−" and numbers, as indicated typically in block 804, is the structure element identifier.

A generic stucture element identifier, as an identifier of a generic stucture element, which restricts the right-under structure data 806 as a string of child nodes of the structure elements 804, as typically in block 805, is described by "R", "-", and numbers.

What is described by list of structure element identifiers 804, or "nil" is the right-under structure data 806 representing the right-under structure.

What is described by a list or "nil", as typically indicated by a block 807, is document-parts data representing the document-parts of the structure element.

Either of the right-under structure data or the document-parts is always "nil".

This corresponds to the fact that either the child node or the document-part is always connected to the underside of the node in the logical structure.

Numeral 808 designates the name attached to each generic logical stucture element 805 to provide an easy understanding by users, and corresponds to the miscellaneous information 406.

Figure 9:
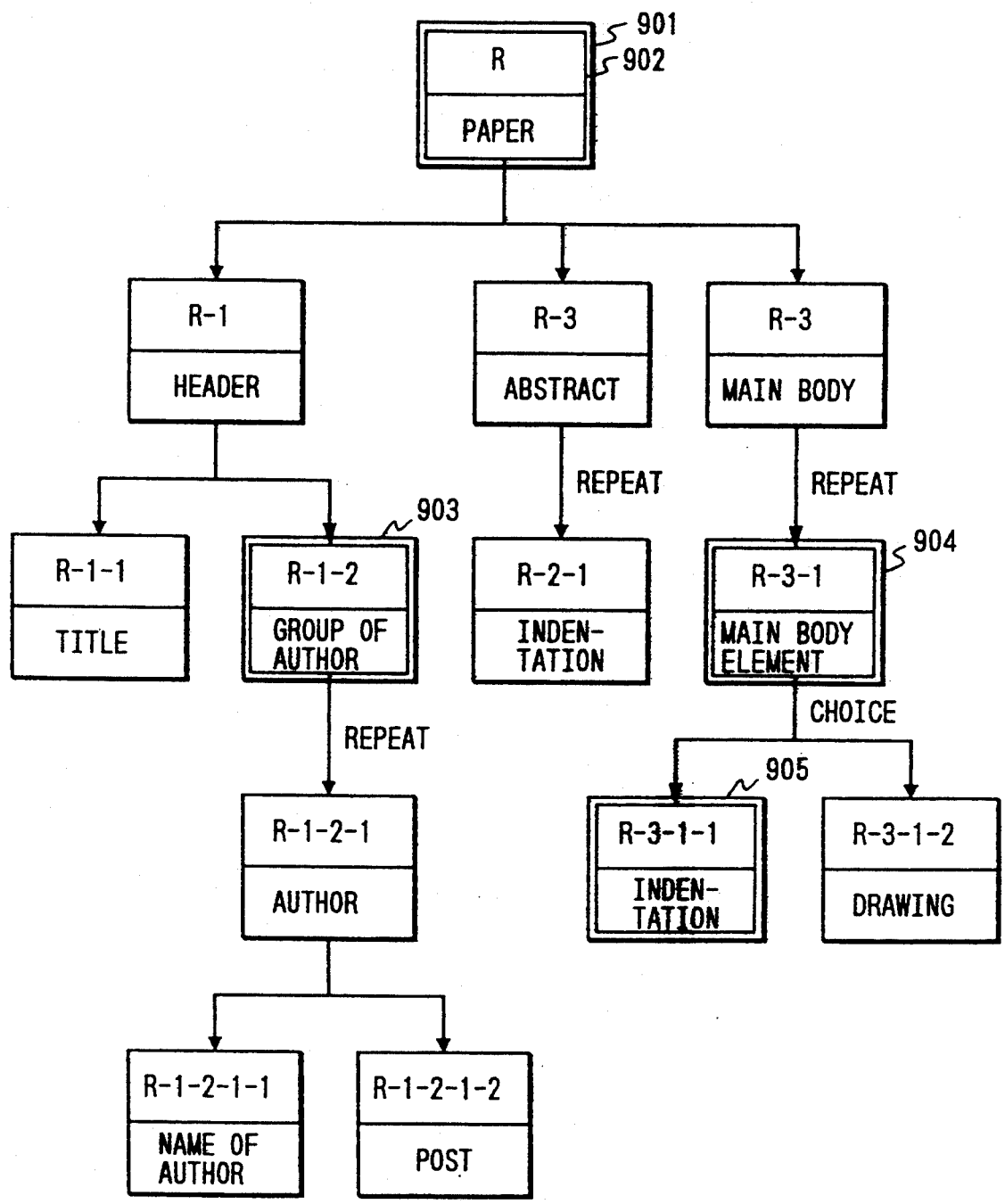
FIG. 9 is a diagram showing in the form of graph the content of the generic logical structure shown in FIG. 7.

FIG. 9 is a diagram showing in the form of a graph the content of the generic logical structure shown in FIG. 7. In the figure, a rectangular block as typically indicated by reference numeral 901 represents a generic logical stucture element. The upper half of a rectangular block 902 representing the generic logical structure element is assigned to write a generic logical structure element indentifier whereas the lower half thereof is assigned to write the the name of the generic logical stucture element.

The generic logical stucture element data corresponding to the rectangular block 901 is 707 (generic stucture element "R") (the identifiers are coincident with each other).

The restriction information for the generic logical stucture element "R" is $$\$(R\text{-}1, R\text{-}2, R\text{-}3) \qquad (1)$$

The symbol $ indicates that it has the right-under structure of the same pattern as that of a list.

Accordingly, the above expression means that the structure element restricted by the generic logical stucture element "R" has a right-under structure having a pattern of (structure element restricted by the generic stucture element "R-1", structure element restricted by the generic stucture element "R-2", structure element restricted by the generic stucture element "R-3").

This is illustrated in FIG. 9 such that three arrows of no labels are derived from the block 901 are connected to three generic logical stucture elements "R-1", "R-2", and "R-3".

The generic logical stucture element data corresponding to a block 903 is data 708 (generic logical stucture element "R-1-2").

The restriction information for the generic logical stucture element "R-1-2" is $$(R\text{-}1\text{-}2\text{-}1) \qquad (2)$$

The symbol  indicates repetitive patterns described in the list.

Accordingly, the expression shows that the structure element restricted by the generics logical stucture element "R-1-2" has a right-under structure consisting of repetitive structure elements, that are restricted by the generic stucture element "R-1-2-1".

This is illustrated in FIG. 9 that an arrow labeled "repeat", derived from the block 903 is connected to a generic stucture element "R-1-2-1".

The generic stucture element data corresponding to a block 904 is data 703 (generic stucture element "R-3-1").

The restriction information for the generic logical stucture element "R-3-1" is

¢(R-3-1-1, R-3-1-2 )        (3)

The symbol ¢ indicates any of descriptions in the list is selected.

Accordingly, the expression shows that the structure element restricted by the generic logical stucture element "R-3-1" has a right-under structure having either of the following patterns:

(structure element restricted by the generic logical stucture element "R-3-1-1")

or (structure element restricted by the generic logical stucture element "R-3-1-2").

This is illustrated in FIG. 9 that an arrow labeled "choice", derived from the block 904 is connected to a generic stucture element "R-3-1-1" and "R-3-1-2".

Figure 10:
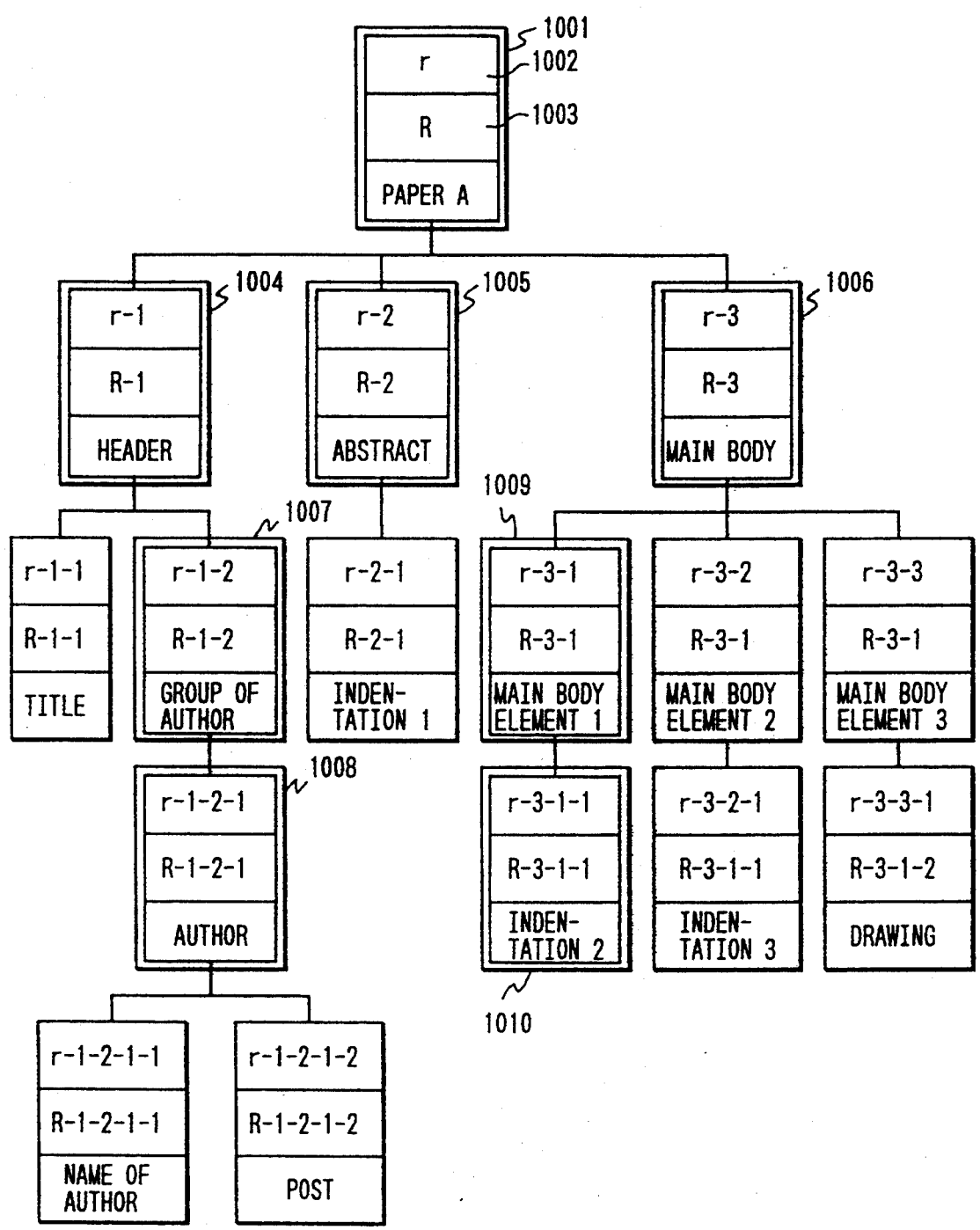
FIG. 10 is a diagram showing in the form of graph the content of the generic logical structure shown in FIG. 8.

FIG. 10 is a diagram showing in the form of a graph the content of the logical structure shown in FIG. 8.

In the figure, the connection of the structure elements to the document-parts is not illustrated.

In the figure, a rectangular block as typically indicated by reference numeral 1001 indicates a structure element.

A structure element identifier of each structure element, as indicated by numeral 1002, is placed in the top stage of the block.

A generic logical stucture element identifier of a generic logical stucture element, which restricts each structure element, is placed in the middle stage of the block, as indicated by numeral 1003.

The bottom stage of the block contains the name of the structure element described in the miscellaneous information 406.

A generic logical stucture element which restricts a structure element 1001 (structure element "r") is data 901 (generic logical stucture element "R") (this is a generic logical stucture element identifier of "paper A", which indicates the generic logical structure, "paper class" shown in FIG. 9, and the generic logical stucture element is designated by the generic logical stucture element identifier of the structure element "r").

Accordingly, the right-under structure of the structure element "r" is restricted by an expression of $(R-1, R-2, R-3)        (4)

The structure element data of the structure element "r" is data 809.

The right-under structure data of the structure element data 809 contains description of (r-1, r-2, r-3).

The structure element having an identifier "r-1" is data 1004, and a generic stucture element "R-1" restricts the structure element "r-1".

The structure element having an identifier "r-2" is data 1005, and a generic logical stucture element "R-2" restricts the structure element "r-2".

The structure element having an identifier "r-3" is data 1006, and a generic logical stucture element "R-3" restricts the structure element "r-3".

Accordingly, the right-under structure of the structure element "r" satisfies the restriction information of a generic logical stucture element which restricts the structure element "r".

A generic stucture element which restricts a structure element 1007 (structure element "r-1-2") is data 903 (generic logical stucture element "R-1-2").

Therefore, the right-under structure of the structure element "r-1-2" is restricted by description of (R-1-2-1)        (5)

The structure element data of the structure element "r-1-2" is data 810. The right-under structure data of the structure data 810 contains description of (r-1-2-1).

The structure element having an identifier "r-1-2-1" is placed in a block 1008, and a generic logical structure element "R-1-2" restricts the structure element "r-1-2-1".

Accordingly, the right-under structure of the structure element "r-1-2" satisfies the restriction information of a generic logical stucture element which restricts the structure element "r-1-2".

The generic logical stucture element which restricts a structure element 1009 (structure element "r-3-1") is placed in a block 904 (generic logical stucture element "R-3-1").

The right-under structure of the structure element "r-3-1" is restricted by description of

¢(R-3-1-1, R-3-1-2).        (6)

The structure element data of the structure element "r-3-1" is placed in a block 811.

The right-under structure of the structure element data contains description of (r-3-1-1).

A structure element having an identifier "r-3-1-1" is placed in a block 1010, and the structure element "r-3-1-1" is restricted by a generic logical stucture element "R-3-1-1".

Accordingly, the right-under structure of the structure element "r-3-1" satisfies the restriction information which restricts that structure element.

A generic logical stucture element which restricts the structure element 1010 (structure element "r-3-1-1") is contained in a block 905 (generic logical stucture element "R-3-1-1").

The restriction information for the generic stucture element "R-3-1-1" is "nil".

This means that the structure element restricted by the generic stucture element "R-3-1-1" has no right-under structure.

Hence, the right-under structure data of the structure element "r-3-1-1" is "nil".

In place of the right-under structure data, the structure element "r-3-1-1" has the document-part connected thereto thereunder.

As shown in FIG. 8, the structure element "r-3-1-1" is connected to a document-parts having a document-parts identifier "5. paper A".

Figure 11:
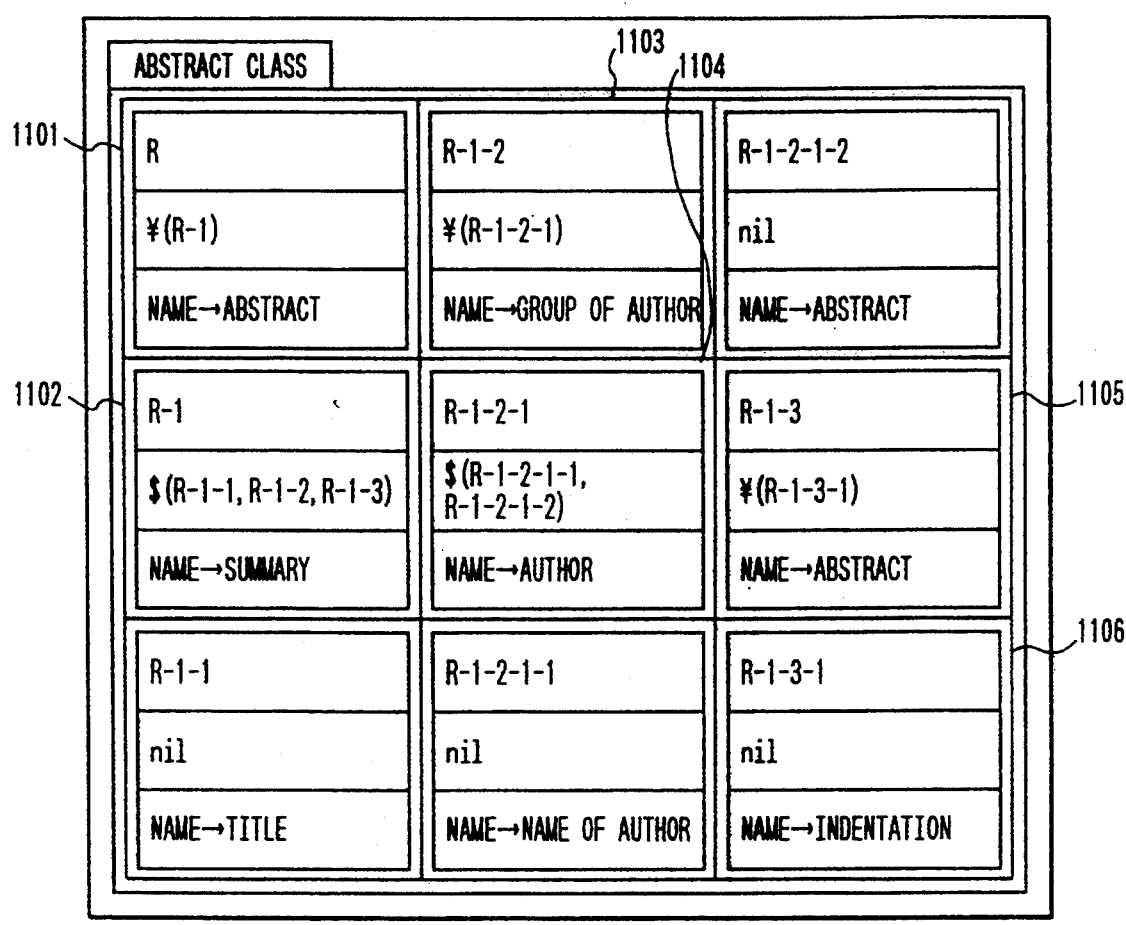
FIG. 11 is a diagram useful in explaining the content of a generic logical structure having a generic logical structure identifier "abstract class", which is stored in the generic logical structure memory unit.

FIG. 11 is a diagram for explaining the content of a generic logical structure having a generic logical structure identifier "abstract class", which is stored in the generic logical structure memory unit 105.

FIG. 12 is a diagram for explaining the content of the logical structure information contained in an electronic document having a document identifier "abstract A", which is stored in the electronic document memory unit 104.

Figure 13:
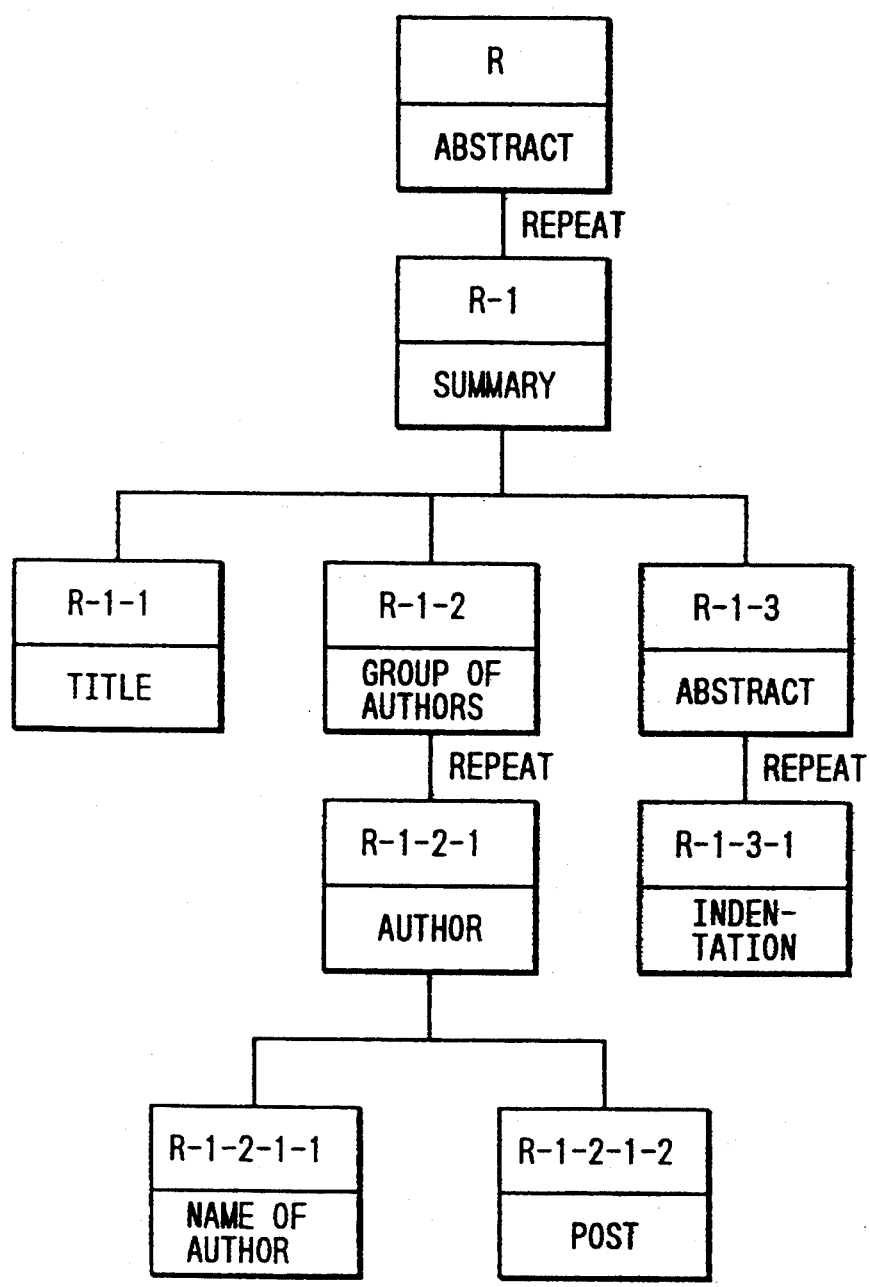
FIG. 13 is a diagram showing in graph form the content of the generic logical structure shown in FIG. 11.

FIG. 13 is a diagram showing in graph form the content of the generic logical structure shown in FIG. 11.

Figure 14:
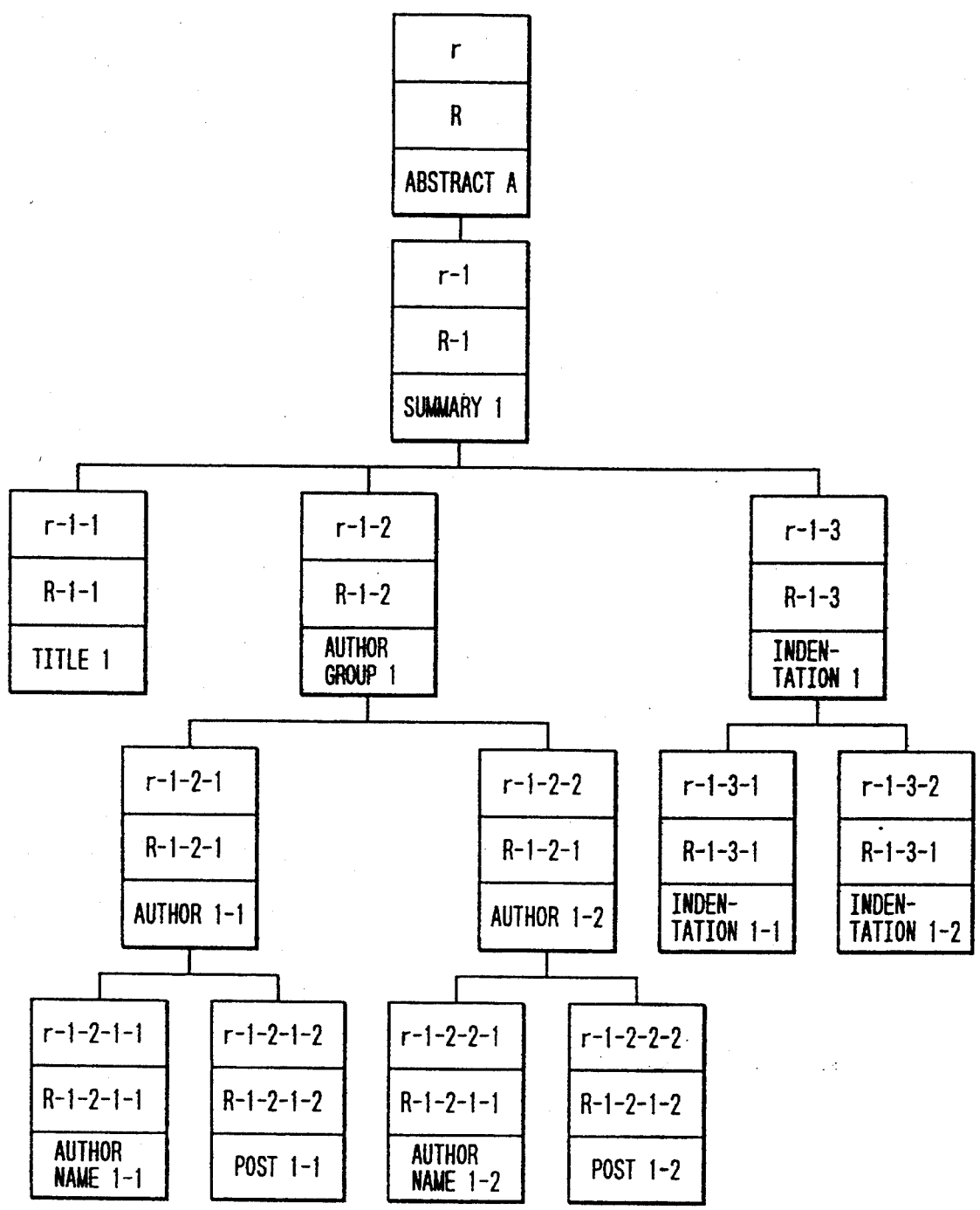
FIG. 14 is a diagram showing in graph form the content of the logical structure shown in FIG. 12.

FIG. 14 is a diagram showing in graph form the content of the logical structure shown in FIG. 12.

In the figure, the connection of the structure elements and the document-parts is not illustrated.

FIGS. 15(*a*) and 15(*b*) are diagrams, which cooperate to show the content of a logical structure generation program having an identifier "Abstract Generation", which is stored in the logical structure generation program memory unit 106. In the figure, reference numeral 1501 indicates a logical structure generation program identifier field in which an identifier "Abstract Generation" is stored.

Numeral 1502 designates a field of an output generic logical structure designation. It is designated here that a generic logical structure, which restricts a logical structure generated by this logical structure generation program, has the identifier of "Abstract Generation".

An input generic logical structure designation field 1503 designates that there are two logical structures to be an input to the logical structure generation program; one restricted by a generic logical structure having an identifier "Paper class", and the other by a generic logical structure "Abstract class".

Numeral 1504 designates a logical structure generation rule field, and one of the logical structure generation rules is designated by numeral 1505.

Numeral 1507 designates a content generation rule field, and one of the content generation rules is designated by numeral 1508.

Figure 16A:
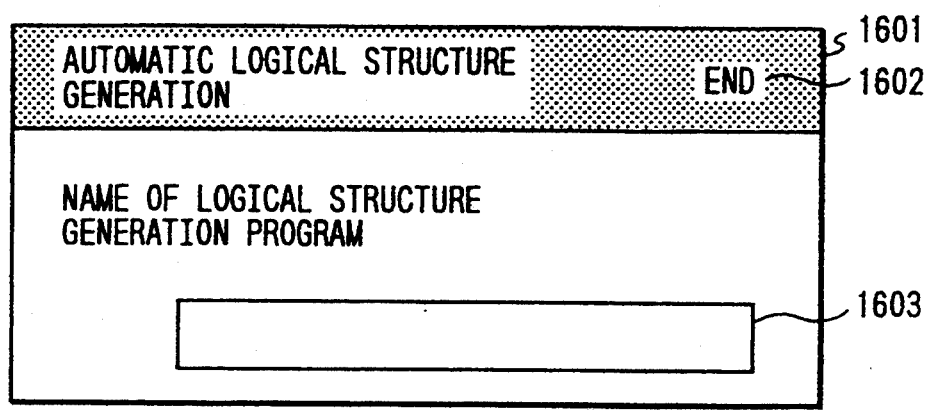
FIGS. 16a and 16b shows diagrams, showing a logical structure generation window to be displayed in the display unit 102 when a user designates a logical structure generation program, and an example of the window when an item is entered.

FIGS. 16(*a*) and 16(*b*) are diagrams showing a logical structure generation window to be displayed in the display unit 102 when a user designates a logical structure generation program, and an example of the window when necessary information is entered, respectively.

FIG. 16(*a*) shows an automatic logical structure generation window to be displayed in the display unit 102 when a user designates a logical structure generation program stored in the logical structure generation program memory unit 106.

In the figure, an automatic logical structure generation window is designated by reference numeral 1601. An end button 1602 is used when a user instructs the end of the window by using a pointing device, such as a mouse. In a logical structure generation program identifier describing field 1603, the user describes an identifier of the logical structure generation program.

In the window shown in FIG. 16(*b*), an identifier "Abstract Generation" is described in the filed 1603.

Figure 17A:
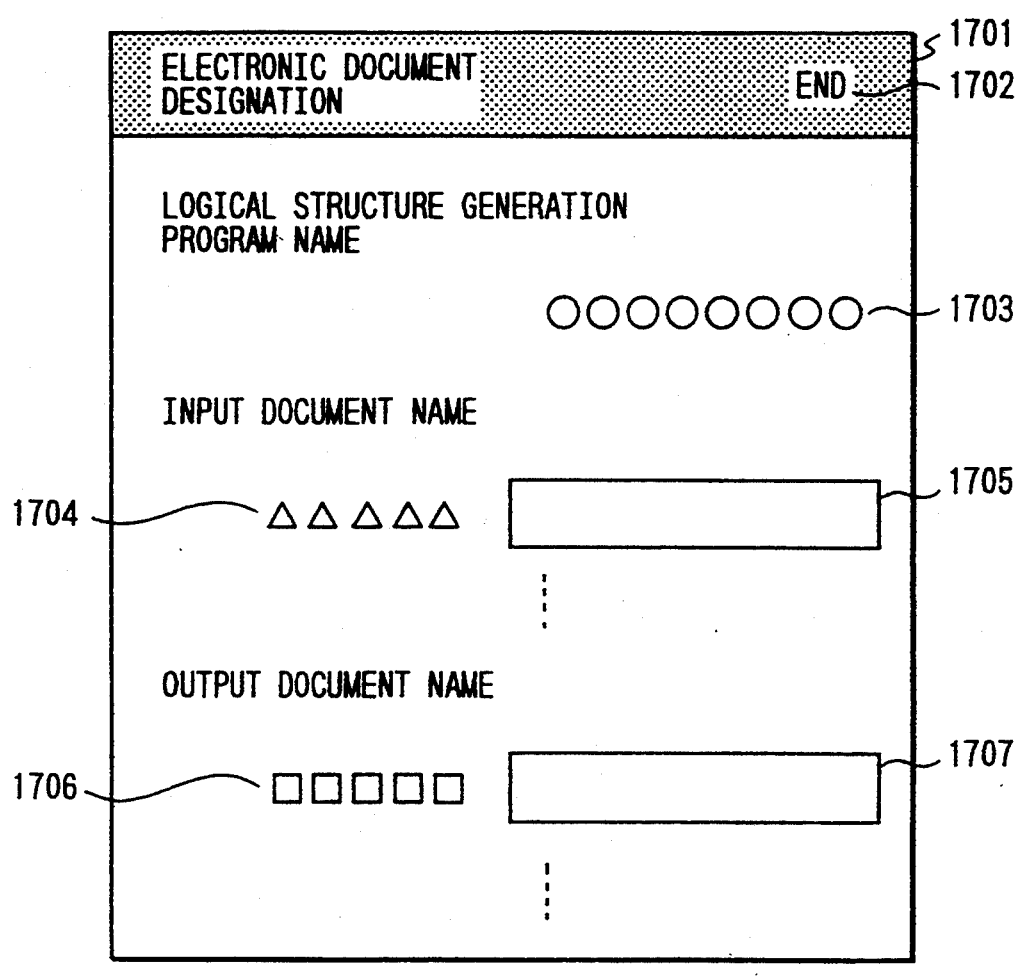
FIGS. 17a, 17b, and 17c shows diagrams an electronic document designation window and its specific examples.

FIGS. 17(*a*) to 17(*c*) are diagrams showing an electronic document designation window and its specific examples. By using the window, the user designates an identifier of an input electronic document with a logical structure and that of an output electronic document with a structure, after entering of necessary information to the automatic logical structure generation window is completed.

FIG. 17(*a*) shows an electronic document designation window in which the user designates an identifier of an electronic document with an input logical structure and that of an electronic document with an output logical structure, after he enters an automatic logical structure generation window.

In the figure, an electronic document designation window is designated by reference numeral 1701. An end button 1702 is used when a user instructs the end of the window by using a pointing device, such as a mouse.

Reference numeral 1703 designates a display location to be filled with an identifier of a logical structure generation program, which is to be executed.

The identifier is coincident with a logical structure generation program identifier that is designated by a user at the time of entering the automatic logical structure generation window 1601.

Numeral 1704 designates a display location to be filled with an identifier of a generic logical structure, which restricts a logical structure to be an input for a logical structure generation program displayed in the display location 1703.

Its content is coincident with the content of an input generic logical structure designation of the logical structure generation program displayed in the display location 1703.

An input electronic document identifier description field 1705 is used when a user designates an identifier of an electronic document with a logical structure to be an input to a logical structure generation program, which is displayed in the display location 1703.

A generic logical structure identifier contained in the electronic document of an electronic document designated in the field must be coincident with an identifier of the generic logical structure displayed in the display location 1704.

When there exist a plurality of logical structures, which are to be input to the logical structure generation program displayed in the display location 1703, in other words, when a plurality of generic logical structure identifiers are described in the input generic logical structure designation displayed in the display location 1703, there exist the same number of pairs of the input generic logical structure identifier display location and the input electronic document identifier description field as that of the input logical structures.

An output generic logical structure identifier display location 1706 is provided for displaying an identifier of a generic logical structure, which restricts a logical structure, which is to be output from the logical structure generation program displayed in the display location 1703.

Its content is coincident with the content of an output generic logical structure designation of the logical structure generation program displayed in the display location 1703.

An output electronic document identifier description field 1707 is used when a user designates an identifier of a new electronic document with an output logical structure of the logical structure generation program displayed in the display location 1703.

When there exist a plurality of output logical structures of the logical structure generation program displayed in the display location 1703, that is, when a plurality of generic logical structure identifiers are described in the output generic logical structure designation of the logical structure generation program, that is displayed in the display location 1703, there exist the same number of pairs of the output generic logical structure identifier display location and the output electronic document identifier description field as that of the output logical structures.

Figure 16B:
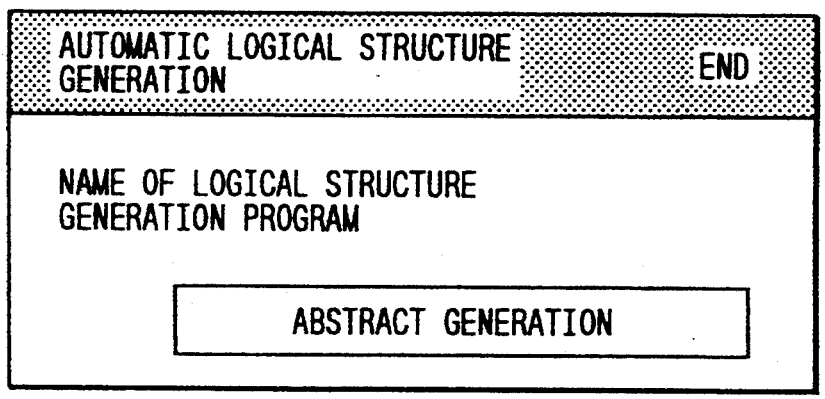
Figure 17B:
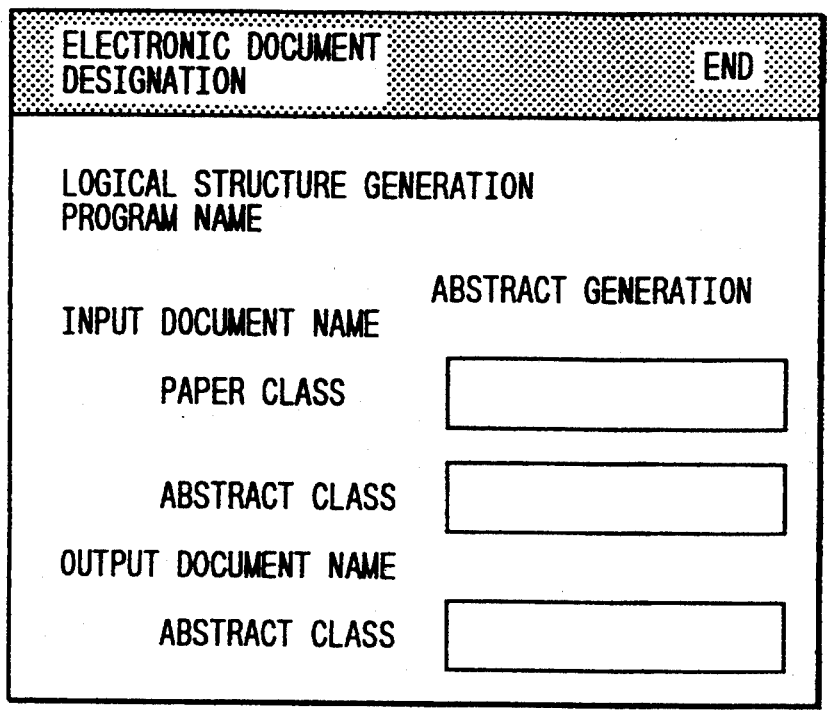

FIG. 17(b) shows a display example of an electronic document designation window, which is presented when the automatic logical structure generation window is as shown in FIG. 16(b).

Figure 17C:
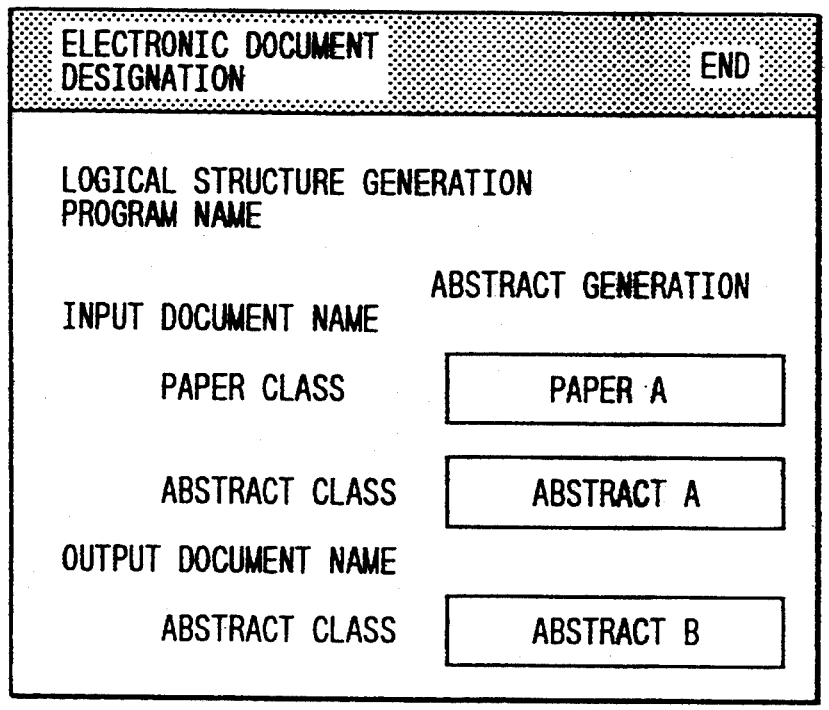

FIG. 17(c) shows a display example of the window when a user fills the respective fields thereof with identifiers.

Figure 18A:
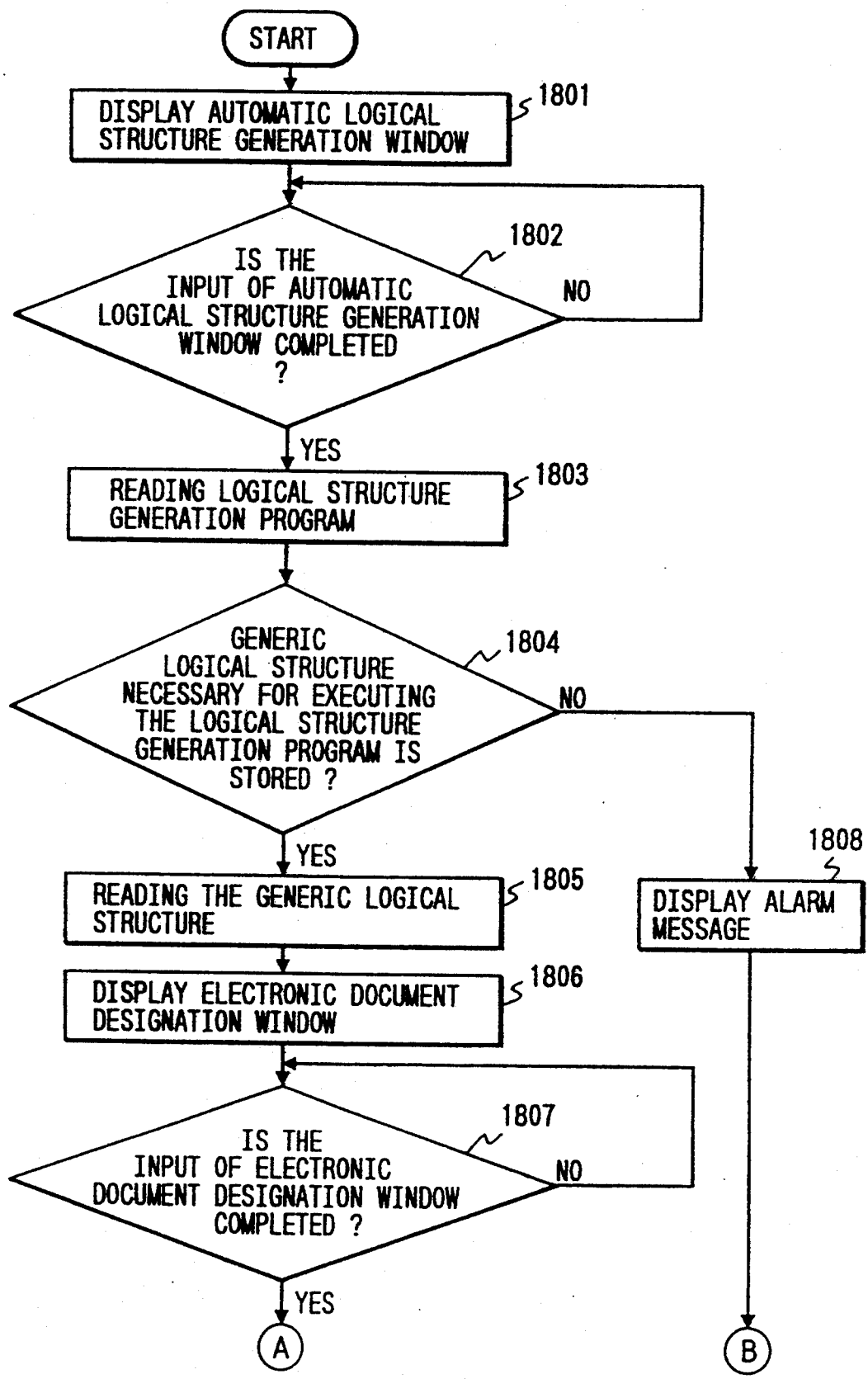
FIGS. 18a and 18b are flow charts showing a flow of processings by the automatic logical structure generation system when it automatically generates a logical structure, document-parts, and connections of the logical structure and the document-parts of a new document from a logical structure, document-parts, and connections of the logical structure and the document-parts of an old document.
Figure 18B:
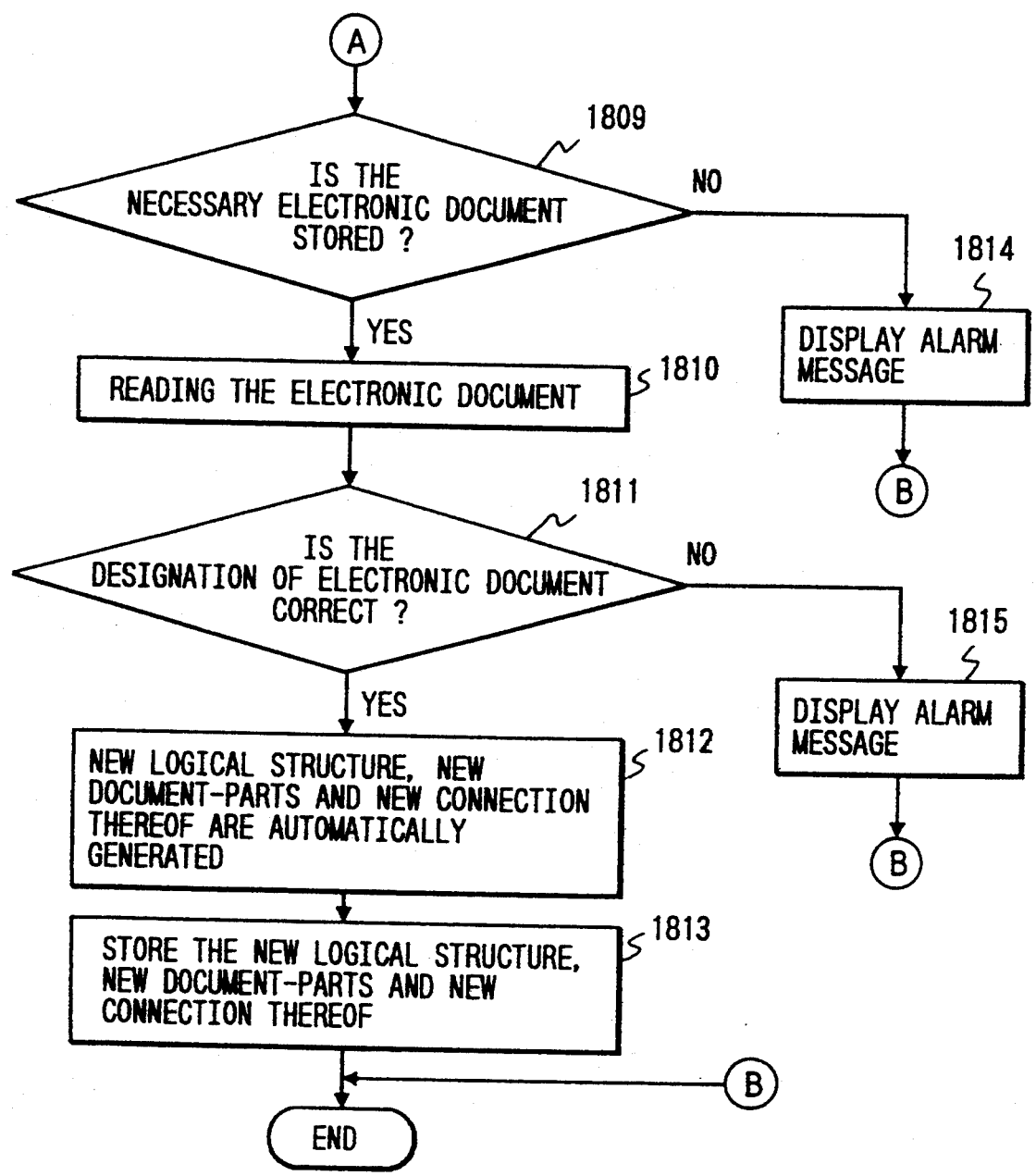

FIGS. 18(a) and 18(b) are flow charts showing a processing flow by the automatic logical structure generation system when it automatically generates a logical structure, document-parts, and connections of the logical structure and the document-parts of a new document from a logical structure, document-parts, and connections of the logical structure and the document-parts of an old document.

Figure 19:
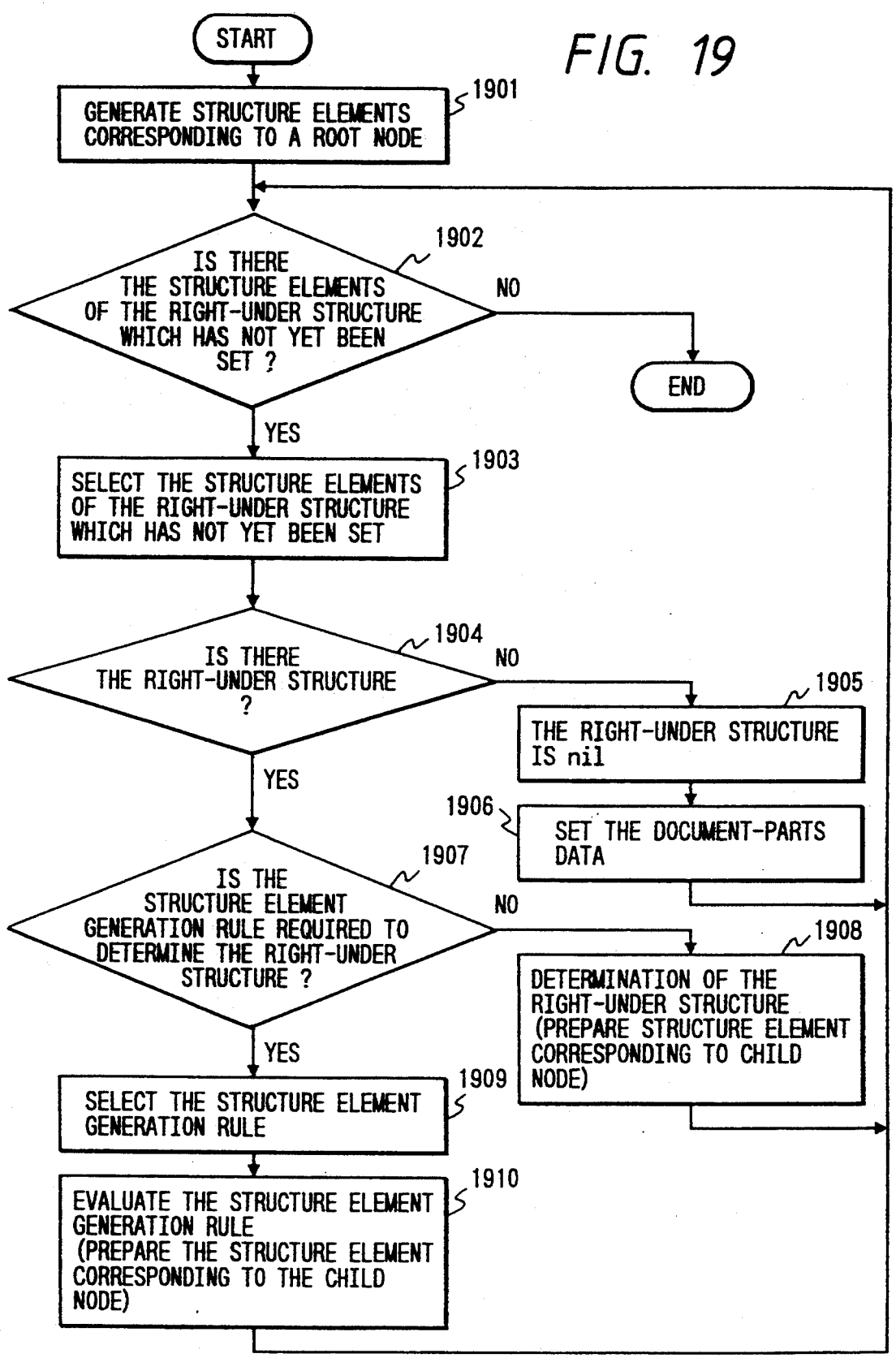
FIG. 19 is a flow chart showing a step of FIG. 18 describing "Generate a new logical structure and new document-parts, and new connections of them"

FIG. 19 is also a flow chart showing a detail of the step 1812 of FIG. 18(a) describing "Generate a new logical structure and new document-parts, and new connections of them".

FIGS. 20(a) to 20(i) are diagrams for explaining a process of the generation of a new logical structure according to the flow chart of FIG. 19, the diagrams showing a generic logical structure identifier and states of the logical structure.

Figure 21:
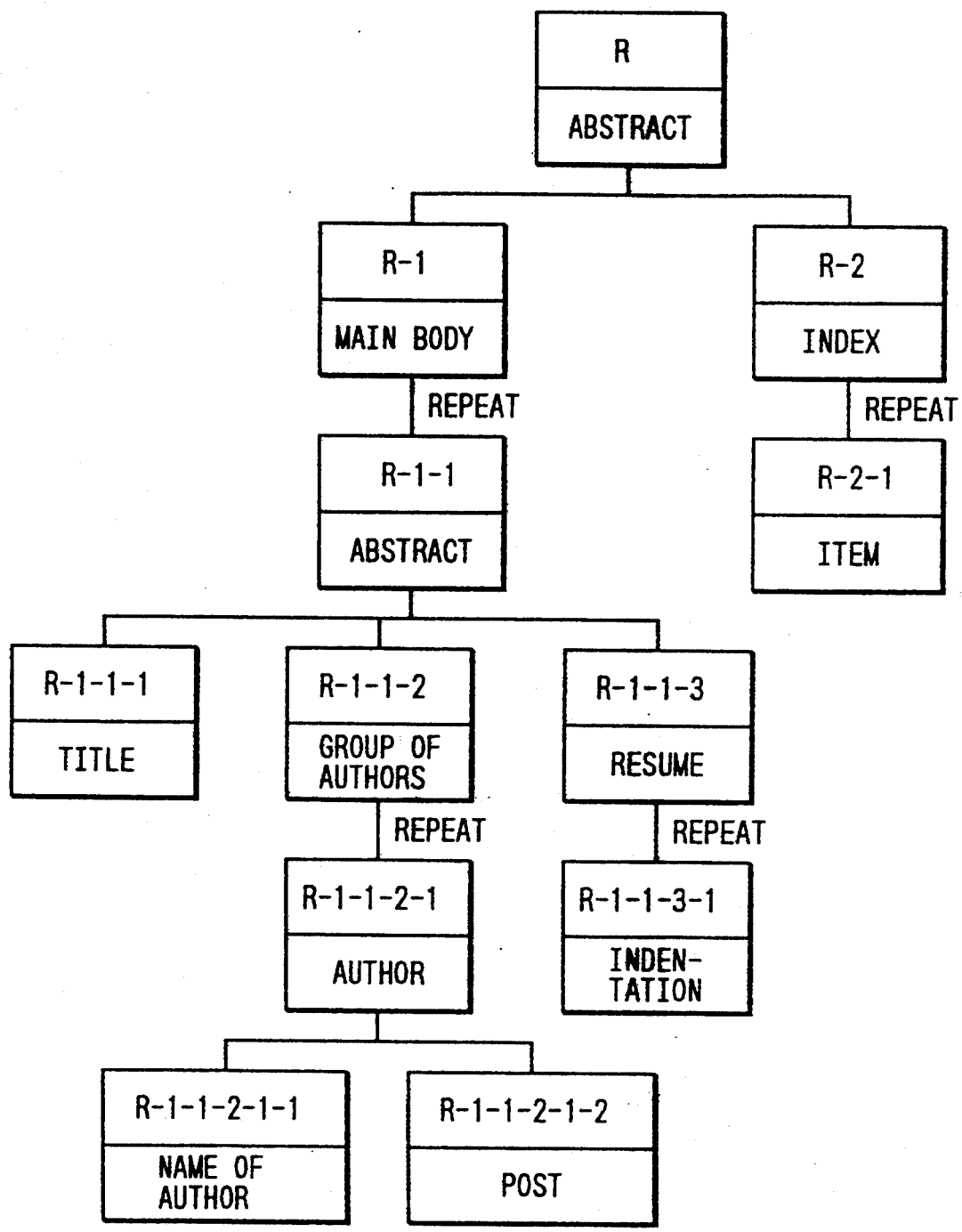
FIG. 21 is a diagram showing in graph form the content of "Abstract class (revised)" as the generic logical structure stored in the generic logical structure memory unit 105.

FIG. 21 is a diagram showing in graph form the content of "Abstract class (revised)" as the generic logical structure stored in the generic logical structure memory unit 105.

Figure 22A:
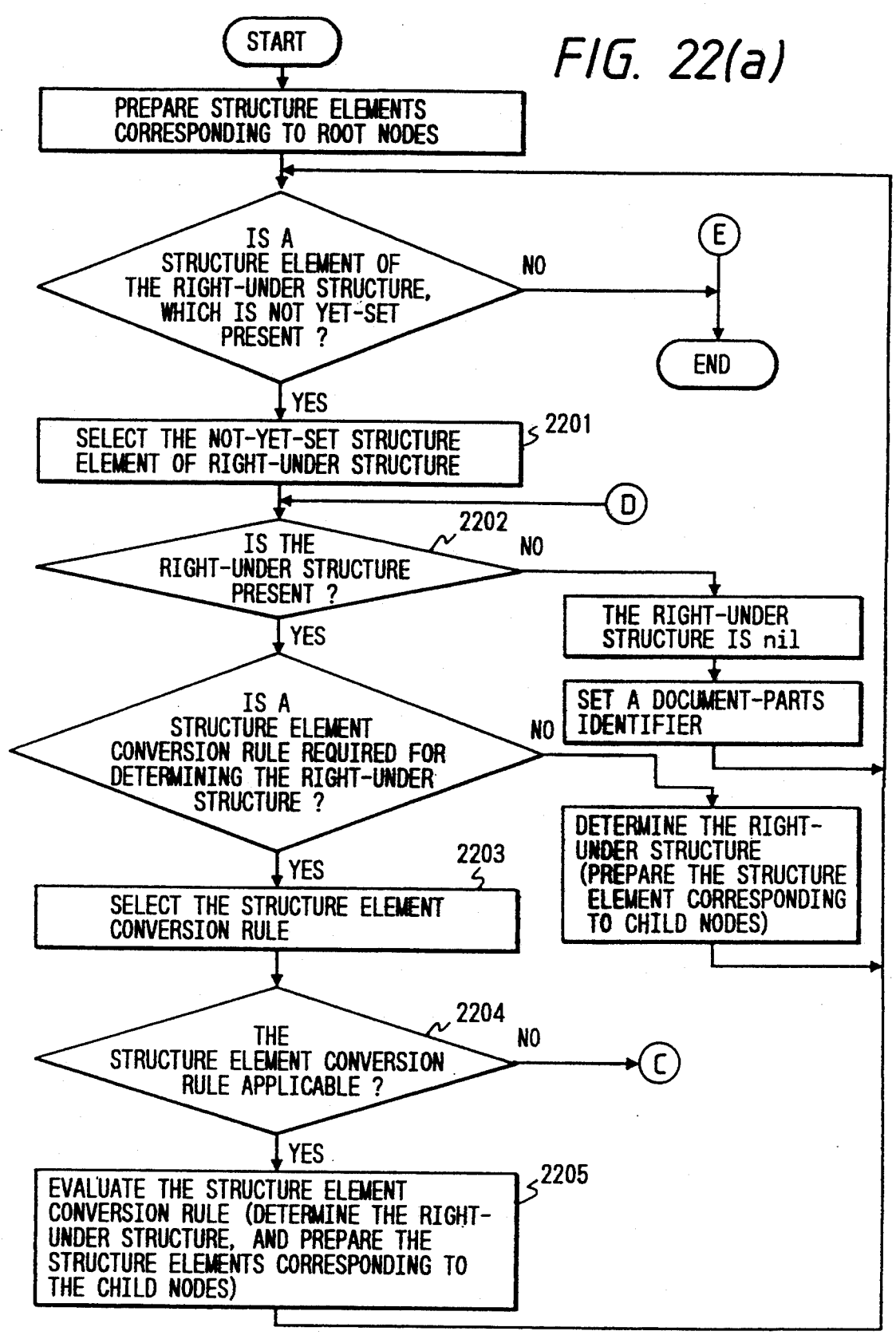
FIGS. 22a and 22b are flow charts showing the details of the step 1812 (to generate a new logical structure, new document-parts, and new connections of them) in the flow chart of FIG. 18, which is different from the flow chart of FIG. 19.
Figure 22B:
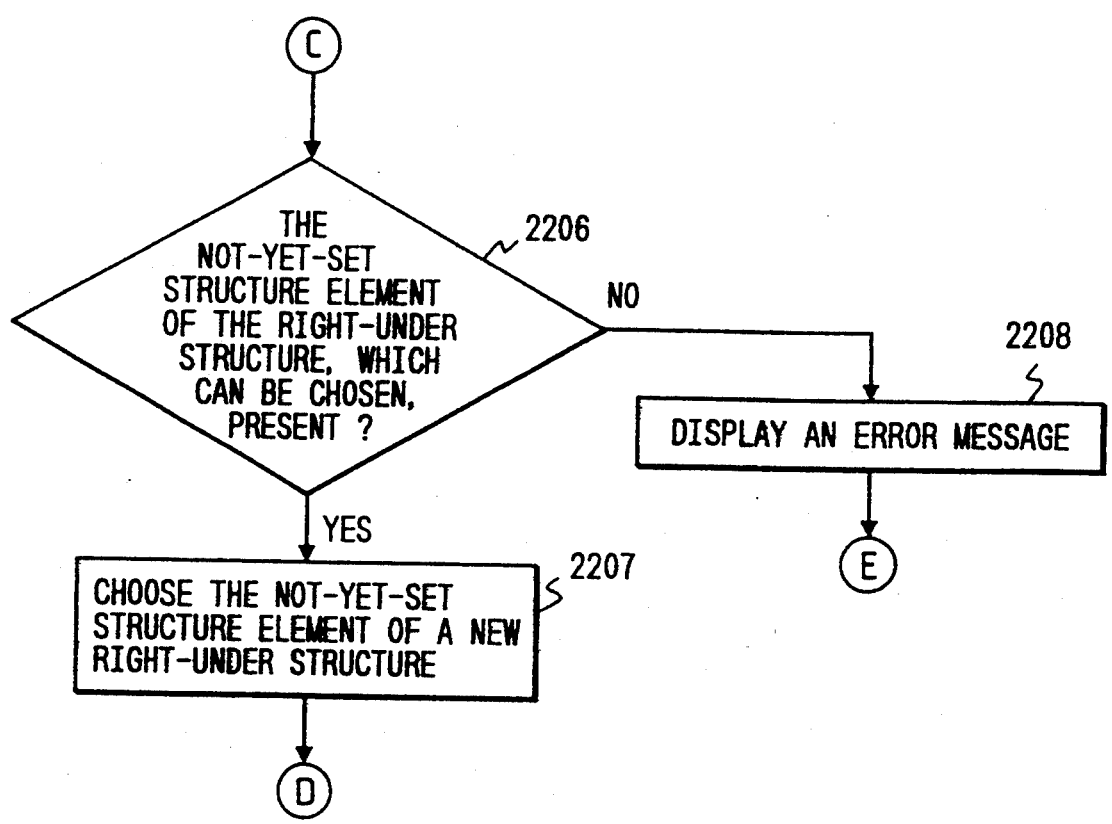

FIGS. 22(a) and 22(b) are the other flow charts showing the details of the step 1812 (to generate a new logical structure, new document-parts, and new connections of them) in the flow chart of FIG. 18, which is different from the flow chart of FIG. 19.

A flow of processings for an automatic logical structure generation program will be described with reference to the flow charts of FIGS. 18(a) and 18(b). In this instance, a logical structure, document-parts, and connections of the logical structure and the document-parts of a new electronic document "Abstract B", of which the generic logical structure is "Abstract class" shown in FIG. 11, are automatically generated from the logical structure, document-parts, and connections of the logical structure and the document-parts of an electronic document "Paper A", of which the generic logical structure is "Paper class" shown in FIG. 7 and which has the logical structure shown in FIG. 8, and the logical structure, document-parts, and connections of the logical structure and the document-parts of an electronic document "Abstract A", of which the generic logical structure is "Abstract class" shown in FIG. 11 and which has the logical structure shown in FIG. 12. The logical structure generation program "Abstract generation" is used for the automatic logical structure generation.

The generic logical structures, "Paper class" and "Abstract class", are stored in the generic logical structure memory unit 105.

The electronic document, "Paper A" and "Abstract A", are stored in the electronic document memory unit 104.

The logical structure generation program, "Abstract generation", is stored in the logical structure generation program memory unit 106.

An automatic generation of a logical structure, document-parts, and connections of the logical structure and the document-parts are instructed from the input unit 101 by a user or any other means, into the automatic logical structure generating/processing unit 107. In response to this, the automatic logical structure generation window 1601 is displayed in the display unit 102 (step 1801).

A user inputs an identifier of the logical structure generation program into the logical structure generation program identifier field 1603, and instructs the end of the program identifier entering (step 1802). Then, the logical structure generation program with the identifier, which is described in the logical structure generation program identifier field 1603, is read out of the logical structure generation program memory unit 106, and applied to the automatic logical structure generating/processing unit 107 (step 1803).

In this instance, the identifier of the logical structure generation program used for the automatic logical structure generation processing is "Abstract generation". Accordingly, the identifier is entered into the automatic logical structure generation window, as shown in FIG. 16(b). The logical structure generation program with the identifier, "Abstract generation", shown in FIG. 15 is applied to the automatic logical structure generating/processing unit 107.

When the logical structure generation program is applied to the automatic logical structure generating/processing unit 107, control checks whether or not the generic logical structure necessary for executing the logical structure generation program is stored in the generic logical structure memory unit 105 (step 1804).

If not stored, a message meaning "not stored" is displayed in the display unit 102 (step 1808), and the logical structure generation processing ends.

If stored, the generic logical structure is read out of the generic logical structure memory unit 105 to be applied to the automatic logical structure generating/processing unit 107 (step 1805).

In the automatic logical structure generation system of the present invention, the generic logical structures which respectively restrict the logical structures of input and output electronic documents are required for executing the logical structure generation program.

It is for this reason that check is made as to whether or not the generic logical structures are stored.

The identifiers of those generic logical structures are stored in the output generic logical structure designation field 603 and input generic logical structure designation field 604, stored in the logical structure generation program 610.

In this processing, the identifier, "Abstract class" is described in the output generic logical structure designating field of the logical structure generation program "Abstract generation", and the identifiers of "Paper class" and "Abstract class" are described in the input generic logical structure designating field.

Control checks whether or not the generic logical structures with the identifiers of "Paper class" and "Abstract class" are stored in the generic logical structure memory unit 105.

The generic logical structure with the identifier of "Paper class" is as shown in FIG. 7. The generic logical structure with the identifier of "Abstract class" is as shown in FIG. 11.

Those generic logical structures which are stored in the generic logical structure memory unit 105, are read out of the memory unit to be applied to the automatic logical structure generating/processing unit 107.

Thereafter, the electronic document designation window 1701 is displayed in the display unit 102 (step 1806).

At this time, the identifier of the logical structure generation program, which is applied to the automatic logical structure generating/processing unit 107 in step 1803, is displayed in the display location 1703 for displaying the logical structure generation program identifier. The contents stored in the input generic logical structure designating field 604 of the logical structure generation program and the contents stored in the output generic logical structure designating field 603 are respectively displayed in the input generic logical structure identifier display location 1704 and output generic logical structure identifier display location 1706.

In this processing, the logical structure generation program applied to the automatic logical structure generating/processing unit 107 is as shown in FIG. 15, and hence the electronic document designation window has a display as shown in FIG. 17(b).

The identifiers of the electronic documents which are the input and output to and from the logical structure generation program, are respectively entered into the input electronic document identifier description field 1705 and the output electronic document identifier description field 1707, by the user (step 1807). Then, control checks if the electronic document having the identifier described in the field 1705 is stored in the electronic document memory unit 104 (step 1809).

If not stored, a message meaning "not stored" is displayed in the display unit 102 (step 1814), and the automatic logical structure generation processing ends.

If stored, the electronic document is read out of the electronic document memory unit 104 to be applied to the automatic logical structure generating/processing unit 107 (step 1810).

When the user fills the fields in the electronic document designation window as shown in FIG. 17(c), the electronic document with the identifiers of "Paper A" and "Abstract A" are stored in the electronic document memory unit, and thus the electronic document is read out of the electronic document memory unit to be applied to the automatic logical structure generating/processing unit 107.

After the electronic document is applied to the automatic logical structure generating/processing unit 107, control checks whether or not an identifier of a generic logical structure which restricts the logical structure of the electronic document, i.e., the generic logical structure identifier in the electronic document, is coincident with the identifier stored in the input generic logical structure designation field of the logical structure generation program (step 1811). If not coincident, a message showing "incoincident" is displayed in the display unit 102 (step 1815). And the logical structure generation processing ends.

If coincident, a new logical structure, new document-parts, and new connections of the logical structure and the document-parts of an electronic document are automatically generated (step 1812).

After the generation of the logical structure, document-parts, and connections of the logical structure and the document-parts, those of a new electronic document are stored in the electronic document memory unit 104 (step 1813).

An identifier of the new electronic document is the identifier described in the field 1707 of the electronic document designation window 1701.

Of the data of the electronic document, the data that has not yet been set, such as layout structure, is stored as it is. When an automatic layout processing or an edit processing by a user is executed later, the not-yet-set data is set.

A system of "generation of a new logical structure, new document-parts, and new connections of the logical structure and the document-parts" in step 1812, on the basis of the same processing example, will be described with reference to the flow chart of FIG. 19.

In this embodiment, the generation of a logical structure means the generation of structure elements constituting the logical structure.

As shown in FIG. 4, each structure element includes an structure element identifier, a generic stucture element identifier, right-under structure data, document-parts data, and miscellaneous information.

Of those items of data, the structure element identifier is automatically determined depending on a tree structure to be generated.

Firstly, structure elements corresponding to a root node are generated (step 1901).

An identifier of the structure element corresponding to the root node is "r".

In this instance, the structure element corresponding to the root node is restricted by a generic stucture element 1101 shown in FIG. 11.

Accordingly, the generic stucture element identifier is an identifier "R" of the generic stucture element 1101.

The right-under structure data is not set at this time, and "no-info" is described.

Also at this time, the document-parts data is set as "nil".

In this instance, "name" provided for ease of user's understanding is set in the miscellaneous information 406. In the automatic logical structure generation processing, this name is the same name as set in the miscellaneous information of the generic stucture element, which restricts the structure element.

Accordingly, in the case of the structure element corresponding to root node, information "name→abstract" which is of the same as the content of the miscellaneous information of the generic stucture element 1101, is set.

Figure 20A:
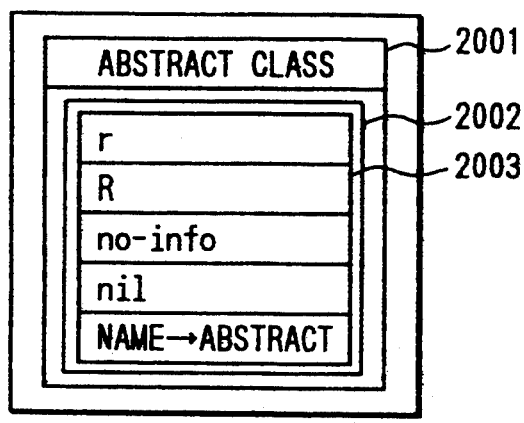

A generic logical structure identifier of "Abstract B" generated anew and a status of a logical structure are as shown in FIG. 20(a).

Then, searching is carried out to search the structure elements of the right-under structure which has not yet been set, i.e., the structure element of which the right-under structure data is "no-info" (step 1902).

If such structure element is not present, the generation of the logical structure ends.

If present, one of such structure elements is selected (step 1903), and the right-under structure is set.

The structure element of which the right-under structure is "no-info" at the time of FIG. 20(a) is only the structure element "r" (2002). Accordingly, that structure element is set.

The structure element selected in step 1903 is checked as to if it contains the right-under structure (1904).

The result of the check depends on whether or not the restriction information of the generic stucture element, which restricts the structure element, contains "nil".

If it contains "nil", the structure element has no right-under structure, and hence the right-under structure data is "nil" (step 1905).

Since the structure element that contains no right-under structure contains document-parts, document-parts data of the structure element is set (step 1906).

The setting of the document-parts is carried out by the steps of: generating document-parts by copying the document-parts of the input electronic document and setting a list of the document-parts identifiers of the generated document-parts in the document-parts data of the structure element of which the document-parts data is to be set.

The setting of the document-parts is executed by selecting and evaluating the rules for generating the content of the logical structure generation program shown in FIG. 15.

The select/evaluation method is similar to a select/evaluation method of the structure element generation rule to be given later, but it is not essential to the present invention and hence no explanation of it will be given. In setting of the document-parts data (step 1906), "?" is set equally.

If, in step 1904, the information retained in the restriction information field of the generic stucture element, which restricts the structure element, is not "nil", it has a right-under structure, and the right-under structure is set in step 1907 and the subsequent ones.

The generic structure element, which restricts the structure element "r" (2002), is the generic stucture element "R" (1101) shown in FIG. 11, as seen from the "Abstract class" of the generic stucture element identifier and the generic stucture element identifier "R" of the structure element "r" shown in FIG. 20(a). The generic stucture element identifier "R" (1101) has the restriction information and hence the structure element "r" (2002) has the right-under structure.

In setting the right-under structure, control decides whether or not the structure element generation rule described in the logical structure generation program must be applied to the determination of the right-under structure (1907).

The decision is made on the basis of the information of the generic stucture element, which restricts the structure element of which the right-under structure is to be determined.

The restriction information is expressed by using descriptors of "$", " " and "¢", and a list of the generic stucture element identifiers or "nil".

If the restriction information is "nil", it is removed on the basis of the decision in step 1904, and step 1907 is not executed.

If the restriction information is expressed by the descriptor "$" and a list of the generic stucture element identifiers following the descriptor, a string of the structure element corresponding to the list of the generic stucture element identifier, if it is formed, is the right-under structure, and therefore there is no need to apply the structure element generation rule.

If the restriction information includes the descriptor " " and the list of the generic stucture element identifier following the descriptor, the right-under structure is structured such that the string of the structure element corresponding to the list of the generic stucture element identifier is repeated. Therefore, the number of the repetitions must be determined according to the structure element generation rule.

If the restriction information includes the descriptor "¢" and the list of the generic stucture element identifier following the descriptor, the right-under structure includes the structure element restricted by one generic stucture element in the list of the generic stucture element identifier. Hence, the generic stucture element to be selected must be determined according to the structure element generation rule.

If the application of the structure element generation rule is not required, a structure element as a child node of the structure element is generated based on the restriction information of the generic stucture element, which restricts the structure element of which the right-under structure is to be determined. A list of an identifier of the structure element as the child node is set in the right-under structure data of the structure element of which the right-under structure is to be determined (step 1908). Then, the control returns to step 1902.

In this case, the right-under structure data of the structure element as the child node formed anew is "no-info".

If the application of the structure element generation rule is required, it is determined which of the structure element generation rules is used (step 1909).

The restriction information of the generic stucture element "R", which restricts the structure element "r", is $$(R-1). \tag{7}$$

Accordingly, the structure element generation rule must be applied.

The structure element generation rule 607 used for determining the right-under structure is determined by a structure element designation expression, which expresses the structure element of which the right-under structure is under determination, and structure element designation description described in the output structure element designation field 609 retained in the structure element generation rule 607.

The structure element designation expression has the following form, under the BNF system;

```
<Structure element designation expression>
: : = <structure element designation field> @
    <identifier of generic logical structure>
        : <input/output identifier>,
<Structure element designation field>
    : : = <structure element designator>
        <structure element designator>.
        <structure element designation field>,
<Structure element designator>
    : : = <identifier of generic structure element>
                        # <natural number>
        <identifier of generic structure element>,
<Input/output identifier>: : = i   o — (8)
```

The structure element designation expression of the structure element "r-1-3-2" contained in the logical structure of the "Abstract A" as the input electronic document in the instant processing, is

R1-3-1#2. R-1-3#1. R-1#1.

R@Abstract class: i     (9)

The last letter "i" is the input/output identifier. The identifier signifies that the structure element designation expression relates to the logical structure of an input electronic document.

The input/output identifier of "o" signifies that the structure element designation expression relates to the logical structure of an output electronic document.

The description "Abstract class" following the "@" is an identifier of a generic logical structure, which restricts a logical structure including the structure element expressed by the structure element designation expression.

$$@\text{Abstract class: i} \tag{10}$$

From the above expression, it is seen that a logical structure including the structure element expressed by structure element designation expression is the logical structure of an input electronic document, and is restricted by the generic logical structure "Abstract class".

$$R\text{-}1\text{-}3\text{-}1\#2. \ R\text{-}1\text{-}3\#1. \ R\text{-}i\#1.R \tag{11}$$

The above part is a structure element designation field in which structure element designators are connected by ".", and expresses a route in the logical structure, which starts from a structure element as a root node of the logical structure which contains the structure element expressed by the structure element designation expression and reaches the structure element expressed by the structure element designation expression.

The structure element designator "R" located at the rightmost place in the expression (11) indicates the structure element (in the logical structure expressed by the structure element designation expression) that is restricted by the generic stucture element having an identifier "R", viz., the structure element "r" (root node).

An identifier of the generic stucture element, which restricts the root node in the logical structure which contains the structure element expressed by the structure element designation expression, necessarily is described in the rightmost, structure element designator in the structure element designation field.

Each structure element designator, other than the rightmost, in the structure element designation field indicates one of the structure elements contained in the right-under structure of the structure element that is designated by the structure element designator located on the right side of the structure element designator in question.

An example of this follows.

$$R\text{-}1\#1.R \tag{12}$$

"R-1#1" of this part in expression (11) indicates the first structure element (designated by "#1") in a list expressing the right-under structure, which is contained in the structure elements restricted by the generic stucture element with an identifier "R-1", which the structure elements are contained in the right-under structure of the structure element designated by "R".

Accordingly, it indicates the structure element "r-1" contained in the logical structure of "Abstract A".

Similarly, the following part of expression (11)

$$R\text{-}1\text{-}3\#1.R\text{-}1\#1.R \tag{13}$$

designates a structure element "r-1-3", and the whole expression (9) designates a structure element "r-1-3-2".

Thus, the structure element designation expression expresses the structure element, in such a way that on the route in the logical structure, which starts from a structure element corresponding to a root node of the logical structure and reaches the structure element expressed by the structure element designation expression, the structure elements on the route are successively designated by the structure element designator.

In the structure element designation expression, all of the structure elements in the logical structure can be designated, and the structure element designated is only one.

If the structure element 2002 is expressed by the structure element designation expression, then $$R@\text{Abstract class: o.} \tag{14}$$

A structure element designation description, which is described in the output structure element designation field retained in the structure element generation rule, contains the condition for the structure element designation expression.

Therefore, the structure element generation rule is applied only to the setting of the right-under structure of the structure element expressed by the structure element designation expression, which satisfies the condition set by the structure element designation description described in the output structure element designation field.

The structure element designation description in the output structure element designation field of the structure element generation rule "rule1" (1505) contained in the logical structure generation program, "Abstract generation", shown in FIG. 15, is $$\text{No}=R@\text{Abstract class: o.} \tag{15}$$

This describes that the structure element generation rule "rule1" is applied to the determination of the right-under structure of the structure element designated by a structure element designation expression given by $$R@\text{Abstract class: o.} \tag{16}$$

Therefore, to determine the right-under structure of the structure element 2002, the structure element generation rule "rule1" is used.

"No" is called as a generation variable, and indicates the structure element which satisfies the condition set in the description following "=" in the structure element designation description at the time of application of the structure element generation rule.

The same thing is true for a generation variable "Ni", contained in the input structure element designation field, structure element designation description.

The generation variable is used in the generation rule of the structure element generation rule.

A description in the output structure element designation field in the structure element generation rule "rule2" (1506) contained in the same logical structure generation program, "Abstract generation", is $$\text{No}=R\text{-}1\text{-}2\#1.R\text{-}1\#x.R@\text{Abstract class: o}$$

and $$x \leq \text{count } (R@\text{abstract class: i}). \tag{17}$$

This describes that the structure element generation rule "rule2" is applied to the determination of the right-under structure of the structure element designated by a structure element designation expression given by $$No = R\text{-}1\text{-}2\#1.R\text{-}1\#x.R@ \text{ Abstract class : o.} \quad (18)$$

Here, there is a variable denoted as "x".

For such a variable, an arbitrary natural number is allowed within a condition.

The condition is described in the places following the place of the "and" in the same structure element designation description. In the expression (17), the description is $$x \leq count\ (R@Abstract\ class: i). \quad (19)$$

The function of $$count\ (a) \quad (20)$$

describes the number of identifiers of the structure elements contained in the right-under structure of the structure element that is designated by "a".

Therefore, if a value of $$count\ (R@Abstract\ class : i) \quad (21)$$

is 3, "x" may be any of 1, 2, and 3.

At this time, the structure element generation rule, "rule2" is applied to the determination of the right-under structure of the structure element that is designated by any of the following structure element designation expressions:
when x=1
R-1-2#1.R-1#1.R
@Abstract class: o,
when x=2
R-1-2#1.R-1#2.R
@Abstract class : o, and
when x=3,
R-1-2#1.R-1#3.R
@Abstract class : o.

When the application of such a structure element generation rule is determined, the value of "x" is used in determining a structure element designated by a generation variable "Ni" depending on a later input structure element designation description.

When the applied structure element generation rule is determined, the structure element generation rule is evaluated to determine the right-under structure (step 1910).

The evaluation of the structure element generation rule is carried out by the following two steps:

(1) determining a structure element designated by the generation variable "Ni" based on the structure element designation description in the input structure element designation field, and (2) evaluating the generation rule.

It is first carried out to determine a structure element designated by the generation variable "Ni".

The structure element designation description described in the input generic logical structure element designation field of the structure element generation rule contains a description of the condition for the structure element designation expression, as the structure element designation description described in the output structure element designation field does.

That is, a structure element expressed by the structure element designation expression, which complies with the structure element designation description described in the input structure element designation field, is the structure element designated by the generation variable "Ni".

In determining the right-under structure of the structure element 2002, the structure element designation description in the input structure element designation field in the applied structure element generation rule "rule1" (1505) is $$Ni = R@Abstract\ class : i. \quad (22)$$

Accordingly, the structure element designated by the structure element designation expression given by $$R@Abstract\ class: i \quad (23)$$

is the structure element designated by the generation variable "Ni".

Such a structure element is the structure element "r" (1201) contained in the logical structure of the electronic document "Abstract A" shown in FIG. 12.

A variable "x" may be used as in the structure element designation description (given by the following expression (24)) of the input structure element designation field of the structure element generation rule "rule2" (1506) of the logical structure generation program, "Abstract generation".

$$Ni = R\text{-}1\text{-}2\#1.R\text{-}1\#x.R \quad (24)$$

At this time, the variable "x" necessarily appears in the structure element designation description in the output structure element designation field of the structure element generation rule. A value of "x" determined when the applied structure element generation rule is determined is directly applied to the "x".

After the structure element designated by the generation variable "Ni" according to the input structure element designation description is determined, the right-under structure of the output structure element is determined by the evaluation (step (2)) of the generation rule.

In determining the right-under structure of the structure element 2002, the description of the generation rule in the applied structure element generation rule is $$count(No) \leftarrow count\ (Ni) + 1. \quad (25)$$

This expression represents that "The number (count (No)) of identifiers of the structure elements contained in the right-under structure of the structure element designated by the generation variable "No", is one larger than the number (count (Ni)) of identifiers of the structure elements contained in the right-under structure of the structure element designated by the generation variable "Ni'"".

The structure element designated by the generation variable "Ni" is the structure element 1201. An evaluation value of
count (Ni) is 1.
Accordingly, count (No) is 2.

The structure element 2002 is restricted by the generic stucture element 1101, and its right-under structure has been determined to be a list including a string of the structure elements restricted by the generic stucture element "R-1" (1102), according to the restriction information given by $$(R\text{-}1). \quad (26)$$

Therefore, the right-under structure of the structure element 2002 is determined to be a list consisting of two structure elements restricted by the generic stucture element 1102. Two structure elements restricted by the generic stucture element 1102 are generated and a list of their identifiers becomes the right-under structure.

The right-under structure data generated anew at this time is "no-info".

Figure 20B:
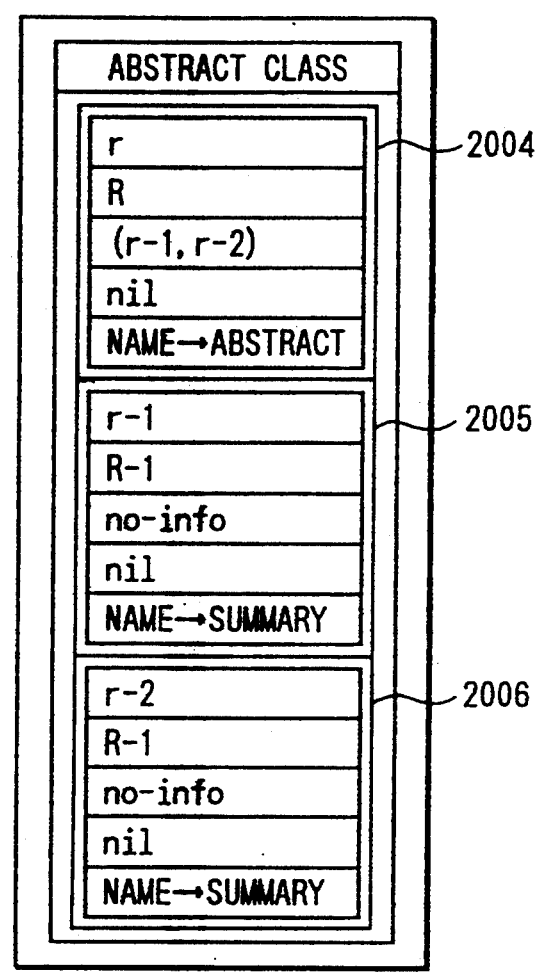

Generic logical structure identifiers and a status of a logical structure of a "Abstract B" generated anew are as shown in FIG. 20(b).

In FIG. 20(b), two structure elements restricted by the generic stucture element "R-1" (1102) contained in the generic logical structure "Abstract class" are formed, "r-1" (2005) and "r-2" ( 2006 ) .

A list of their identifiers (r-1, r-2) becomes the right-under structure data of the structure element 2002.

The identifiers "r-1" and "r-2" of the structure elements 2005 and 2006 are automatically formed according to a tree structure to be generated.

Then, the structure element 2002 is transformed into the structure element 2004.

Following the completion of the evaluation of the generation rule of step (2), the step returns to step 1902 where control checks whether the not-yet-set structure element of the right-under structure, i.e., the structure element of which the right-under structure data is "no-info", is present or not.

A process of generating the logical structure of the electronic document "Abstract B" will be described with reference to the steps from the status of FIG. 20(b).

Step 1902: the right-under structure data of the structure elements "r-1" and "r-2" is "no-info". Accordingly, the step advances to step 1903.

Step 1903: selecting the structure element "r-1".

Step 1904: The generic stucture element restricting the structure element "r-1" is "R-1" of the generic logical structure "Abstract class", and has restriction information. Accordingly, the structure element "r-1" has the right-under structure, and the step advances to step 1907.

Step 1907: The restriction information of the generic stucture element "R-1" of the generic logical structure "Abstract class" is $$\$(R-1-1, R-1-2, R-1-3) \tag{27}$$

Therefore, there is no need for the application of the structure element generation rule. Advance to step 1908.

Step 1908: According to the restriction information of the generic stucture element "R-1" of the generic logical structure "Abstract class", the structure elements "r-1-1", "r-1-2", and "r-1-3" are generated.

Generic logical structure identifiers and a status of a logical structure of the electronic document "Abstract B" are as shown in FIG. 20(c). The step returns to step 1902.

Step 1902: The right-under structure data of the structure elements "r-1-1", "r-1-2", "r-1-3" and "r-2" is "non-info". Accordingly, the step goes to step 1903.

Step 1903: The structure element "r-1-1" is selected.

Step 1904: The generic stucture element which restricts the structure element "r-1-1", is "R-1-1" of the generic logical structure "Abstract class", and has no restriction information.

Accordingly, the structure element "r-1-1" has no right-under structure, and thus the step advances to step 1905.

Steps 1905 and 1906: The right-under structure data of the structure element "r-1-1" is "nil", and the document-parts data is "?". Consequently, the step returns to step 1902.

Step 1902: The right-under structure data of the structure elements "r-1-2", "r-1-3", and "r-2" is "no-info", and then control proceeds to step 1903.

Step 1903: The structure element "r-1-2" is selected.

Step 1904: The generic stucture element, which restricts the structure element "r-1-2", is "R-1-2" of the generic logical structure "Abstract class", and has restriction information.

Accordingly, the structure element "r-1-2" has the right-under structure, and control goes to step 1907.

Step 1907: The restriction information of the generic logical structure "R-1-2" of the generic logical structure "Abstract class" is $$(R-1-2-1). \tag{28}$$

Accordingly, the application of the structure element generation rule is required. Control goes to step 1909.

Step 1909: The structure element designation expression which expresses the structure element "r-1-2", is $$R-1-2\#1.\#R-1\#1.R \ @Abstract\ class: o \tag{29}$$

The structure element designation description in the output structure element designation field of the structure element generation rule "rule2" contains $$x \leq count\ (R@Abstract\ class: i) \tag{30}$$

In the above structure element designation description, $$(R@Abstract\ class: i) \tag{31}$$

designates the structure element "r" (1201) in the logical structure of the electronic document "Abstract A", and $$count\ (R@abstract\ class: i) = 1 \tag{32}$$

Accordingly, a set of numbers to be put into the "variable" "x" is {1}.

When x=1, the structure element designation expression which expresses the structure element "r-1-2" is compatible with the structure element designation description in the output structure element designation field of the structure element generation rule "rule2". The application of the rule "rule 2" is decided.

Step 1910: In step 1909, it is decided that the generation variable "No" indicates the structure element "r-1" (2007).

<Evaluation(l)> The variable "x" of the structure element designation description in the output structure element designation field of the structure element generation rule "rule2" is 1. Hence, the generation variable "Ni" indicates a structure element designated by the structure element designation expression given by $$R-1-2\#1.R-1\#1.R \ @Abstract\ class: i. \tag{33}$$

This is the structure element "r-1-2" (1202) in FIG. 12. It is decided that the generation variable "Ni" indicates this.

<Evaluation (2)>
count(Ni)=2
Accordingly,
count(No)=2

It is decided that the number of the structure elements contained in the right-under structure of the structure element "r-1-2" (2007) is 2.

The structure element "r-1-2" (2007) is restricted by the generic stucture element "R-1-2" (1103). Its right-under structure has been determined to be a list including a string of structure elements restricted by the generic stucture element "R-1-2-1" (1104), according to the restriction information $$(R-1-2-1) \qquad (34)$$

Accordingly, the right-under structure of the structure element "r-1-2" (2007) is determined to be a list consisting of two structure elements restricted by the generic structure element "R-1-2-1" (1104). And the right-under structure is set.

At this time point, generic logical structure identifiers and a status of a logical structure of a "Abstract B" generated anew are as shown in FIG. 20(d). Control returns to step 1902.

Step 1902: The right-under structure data of the structure elements "r-1-2-1", "r-1-2-2", "r-1-3", and "r-2" is "no-info". Hence, control goes to step 1903.

Step 1903: The structure element "r-1-2-1" is selected.

Step 1904: The generic stucture element, which restricts the structure element "r-1-2-1", is "R-1-2-1" of the generic logical structure "Abstract class", and has restriction information.

Accordingly, the structure element "r-1-2-1" has the right-under structure, and control goes to step 1907.

Step 1907: The restriction structure of the generic stucture element "R-I-2-1" of the generic logical structure "Abstract class" is $$\$(R-1-2-1-1, R-1-2-1-2) \qquad (35)$$

Accordingly, the application of the structure element generation rule is not required. Control goes to step 1908.

Step 1908: The structure elements "r-1-2-1-1" and "r-1-2-1-2" are generated, which are respectively restricted by the generic stucture elements "R-1-2-1-1" and "R-1-2-1-2" according to the restriction information of the generic stucture element "R-1-2-1" of the generic logical structure "Abstract class". Those serve as the right-under structure of the structure element "r-1-2-1". Control returns to step 1902.

Step 1902: The right-under structure data of the structure elements "r-1-2-1-1", "r-1-2-1-2", "r-1-2-2", "r-1-3", and "r-2" is "no-info". Accordingly, control goes to step 1903.

Step 1903: The structure element "r-1-2-1-1" is selected.

Step 1904: The generic stucture element, which restricts the structure element "r-1-2-1-1", is "R-1-2-1-1" of the generic logical structure "Abstract class", and has no restriction information. Accordingly, the structure element "r-1-2-1-1" has no right-under structure, and control goes to step 1905.

Step 1905: The right-under structure data of the structure element "r-1-2-1-1" is "nil", and the document-parts data is "?". Then, control returns to step 1902.

Step 1902: The right-under structure data of the structure elements "r-1-2-1-2", "r-1-2-2", "r-1-3", and "r-2" is "no-info", and then control goes to step 1903.

Step 1903: Selecting the structure element "r-1-2-1-2".

Step 1904: The generic stucture element which restricts the structure element "r-1-2-1-2" is "R-1-2-1-2" of the generic logical structure "Abstract class", and has no restriction information.

Accordingly, the structure element "r-1-2-1-2" has no right-under structure, and control advances to step 1905.

Steps 1905 and 1906: The right-under structure data of the structure element "r-1-2-1-2" is "nil", the document-parts data is "?", and therefore control returns to step 1902.

Step 1902: The right-under structure data of the structure elements "r-1-2-2", "r-1-3", and "r-2" is "no-info", and then control proceeds to step 1903.

Step 1903: The structure element "r-1-2-2" is selected.

Step 1904: The generic stucture element, which restricts the structure element "r-1-2-2", is "R-1-2-1" of the generic logical structure "Abstract class", and has restriction information.

Accordingly, the structure element "r-1-2-2" has the right-under structure and control goes to step 1907.

Step 1907: The restriction information of the generic logical structure "R-1-2-1" of the generic logical structure "Abstract class" is $$\$(R-1-2-1-1, R-1-2-1-2) \qquad (35)$$

Accordingly, the application of the structure element generation rule is not required. Control goes to step 1908.

Step 1908: The structure elements "r-1-2-2-1" and "r-1-2-2-2" are generated, which are respectively restricted by the generic stucture elements "R-1-2-1-1" and "R-1-2-1-2", respectively, according to the restriction information of the generic stucture element "R-1-2-1" of the generic logical structure "Abstract class". Control returns to step 1902.

Step 1902: The right-under structure data of the structure elements "r-1-2-2-1", "r-1-2-2-2", "r-1-3", and "r-2" is "no-info". Accordingly, control goes to step 1903.

Step 1903: The structure element "r-1-2-2-1" is selected.

Step 1904: The generic stucture element which restricts the structure element "r-1-2-2-1", is "R-1-2-1-1" of the generic logical structure "Abstract class", and has no restriction information. Accordingly, the structure element "r-1-2-2-1" has no right-under structure, and control goes to step 1905.

Steps 1905 and 1906: The right-under structure data of the structure element "r-1-2-2-1" is "nil", the document-parts data is "?". The step returns to step 1902.

Step 1902: The right-under structure data of the structure elements "r-1-2-2-2", "r-1-3", and "r-2" is "non-info". Accordingly, control goes to step 1903.

Step 1903: The structure element "r-1-2-2-2" is selected.

Step 1904: The generic stucture element which restricts the structure element "r-1-2-2-2", is "R-1-2-1-2" of the generic logical structure "Abstract class", and has no restriction information. Accordingly, the structure element "r-1-2-2-2" has no right-under structure, and control goes to step 1905.

Steps 1905 and 1906: The right-under structure data of the structure element "r-1-2-2-2" is "nil", and the document-parts data is "?".

At this time point, the generic logical structure identifiers and the status of the logical structure shown in FIG. 20(d), are changed as shown in FIG. 20(e). Control returns to step 1902.

Step 1902: The right-under structure data of the structure elements "r-1-3" and "r-2" is "no-info". Accordingly, control goes to step 1903.

Step 1903: The structure element "r-1-3" is selected.

Step 1904: The generic stucture element which restricts the structure element "r-1-3", is "R-1-3" of the generic logical structure "Abstract class", and has the restriction information. Accordingly, the structure element "r-1-3" has the right-under structure and control goes to step 1907.

Step 1907: The restriction information of the generic logical structure "R-1-3" of the generic logical structure "Abstract class" is $$(R-1-3-1) \tag{37}$$

Accordingly, the application of the structure element generation rule is required. Control goes to step 1909.

Step 1909: The structure element designation expression which expresses the structure element "r-1-3", is $$R-1-3\#1.R-1\#1.R \ @Abstract\ class: o \tag{38}$$

The structure element designation description in the output structure element designation field of the structure element generation rule "rule4" contains $$x \leq count\ (R@Abstract\ class:\ i) \tag{39}$$

In the above structure element designation description, $$(R@Abstract\ class:\ i) \tag{40}$$

designates the structure element "r" (1201) in the logical structure of the electronic document "Abstract A", and $$count\ (R@Abstract\ class:\ i) = 1 \tag{41}$$

Accordingly, a set of numbers to be put into the variable "x" is {1}.

When x=1, the structure element designation expression which expresses the structure element "r-1-3" is compatible with the structure element designation description in the output structure element designation field of the structure element generation rule "rule4". The application of the "rule4" is decided.

Step 1910: In step 1909, it is decided that the generation variable "No" indicates the structure element "r-1-3" (2008).

<Evaluation(l)> The variable "x" of the structure element designation description in the output structure element designation field of the structure element generation rule "rule4", is 1. Hence, the generation variable "Ni" indicates a structure element designated by the structure element designation expression given by $$R-1-3\#1.R-1\#1.R \ @Abstract\ class:\ i \tag{42}$$

This is the structure element "r-1-3" (1203) in FIG. 12. It is decided that the generation variable "Ni" indicates this.

<Evaluation (2)>
count(Ni)=2
Accordingly,
count(No)=2

It is decided that the number of the structure elements contained in the right-under structure of the structure element "r-1-3" (2008) is 2.

The structure element "r-1-3" (2008) is restricted by the generic stucture element "R-1-3" (1105). Its right-under structure has been determined to be the list including a string of structure elements restricted by the generic stucture element "R-1-3-1" (1106), according to the restriction information $$(R-1-3-1) \tag{43}$$

Accordingly, it is decided that the right-under structure of the structure element "r-1-3" (2008) is a list consisting of two structure elements restricted by the generic stucture element "R-1-3-1" (1106). And the right-under structure is set.

At this time point, the generic logical structure identifiers and the logical structure status shown in FIG. 20(e) are changed as shown in FIG. 20(f). Control returns to step 1902.

Step 1902: The right-under structure data of the structure elements "r-1-3-1", "r-1-3-2", and "r-2" is "non-info". Hence, control goes to step 1903.

Step 1903: The structure element "r-1-3-1" is selected.

Step 1904: The generic stucture element which restricts the structure element "r-1-3-1", is "R-1-3-1" of the generic logical structure "Abstract class", and has no restriction information.

Accordingly, the structure element "r-1-3-1" has no right-under structure, and control goes to step 1905.

Steps 1905 and 1906: The right-under structure data of the structure element "r-1-3-1" is "nil", the document-parts data is "?", and therefore control returns to step 1902.

Step 1902: The right-under structure data of the structure elements "r-1-3-2" and "r-2" is "no-info". Accordingly, control goes to step 1903.

Step 1903: The structure element "r-1-3-2" is selected.

Step 1904: The generic stucture element, which restricts the structure element "r-1-3-2", is "R-1-3-1" of the generic logical structure "Abstract class", and has no restriction information. Accordingly, the structure element "r-1-3-2" has no right-under structure and control goes to step 1905.

Steps 1905 and 1906: The right-under structure data of the structure element "r-1-3-2" is "nil", the document-parts data is "?", and therefore control returns to step 1902.

Step 1902: The right-under structure data of the structure element "r-2" is "no-info". Accordingly, control goes to step 1903.

Step 1903: The structure element "r-2" is selected.

Step 1904: The generic stucture element which restricts the structure element "r-2", is "R-1" of the generic logical structure "Abstract class", and has restriction information.

Accordingly, the structure element "r-2" has the right-under structure and control goes to step 1907.

Step 1907: The restriction information of the generic logical structure "R-1" of the generic logical structure "Abstract class" is $$S(R-1-1, R-1-2, R-1-3) \tag{44}$$

Accordingly, the application of the structure element generation rule is not required. Control goes to step 1908.

Step 1908: The structure elements "r-2-1", "r-2-2" and "r-2-3" are generated according to the restriction information of the generic stucture element "R-1" of the generic logical structure "Abstract class". The generic logical structure identifiers and the logical structure status of the electronic document "Abstract B" are as shown in FIG. 20(g). Control returns to step 1902.

Step 1902: The right-under structure data of the structure elements "r-2-1", "r-2-2", and "r-2-3" is "no-info". Accordingly, control goes to step 1903.

Step 1903: The structure element "r-2-1" is selected.

Step 1904: The generic stucture element which restricts the structure element "r-2-1", is "R-1-1" of the generic logical structure "Abstract class", and has no restriction information.

Accordingly, the structure element "r-2-1" has no right-under structure, and control goes to step 1905.

Steps 1905 and 1906: The right-under structure data of the structure element "r-2-1" is "nil", the document-parts data is "?", and therefore control returns to step 1902.

Step 1902: The right-under structure data of the structure elements "r-2-2" and "r-2-3" is "no-info". Accordingly, control goes to step 1903.

Step 1903: The structure element "r-2-2" is selected.

Step 1904: The generic stucture element corresponding to the structure element "r-2-2" is "R-1-2" of the generic logical structure "Abstract class", and has the restriction information.

Accordingly, the structure element "r-2-2" has the right-under structure and control goes to step 1907.

Step 1907: The restriction information of the generic logical structure "R-1-2" of the generic logical structure "Abstract class" is $$(R-1-2-1) \tag{45}$$

Accordingly, the application of the structure element generation rule is required. Control goes to step 1909.

Step 1909: The structure element designation expression which expresses the structure element "r-2-2", is $$R-1-2\#1.R-1\#2.R \ @Abstract\ class: o \tag{46}$$

The structure element designation description in the output structure element designation field of the structure element generation rule "rule3" contains $$x = count\ (R@Abstract\ class: i) + 1 \tag{47}$$

In the above structure element designation description, $$(R@Abstract\ class: i) \tag{48}$$

designates the structure element "r" (1201) in the logical structure of the electronic document "Abstract A", and $$count\ (R@Abstract\ class: i) = 1 \tag{49}$$

Accordingly, a set of numbers to be put into the "variable" "x" is {2}.

When x=2, the structure element designation expression which expresses the structure element "r-2-2" is compatible with the structure element designation description in the output structure element designation field of the structure element generation rule "rule3". The application of the structure element generation rule "rule3" is decided.

Step 1910: In step 1909, it is decided that the generation variable "No" indicates the structure element "r-2-2" (2009).

<Evaluation(l)> The generation variable "Ni" indicates a structure element designated by the structure element designation expression given by $$R-1-2\#1.R-1\#1.R \ @Paper\ class: i \tag{50}$$

This is the structure element "r-1-2" (810) contained in the logical structure of the electronic document "Paper A" shown in FIG. 8. It is decided that the generation variable "Ni" indicates this.

<Evaluation (2)>
count(Ni)=1
Accordingly,
count(No)=1

It is decided that the number of the structure elements contained in the right-under structure of the structure element "r-2-2" (2009) is 1.

The structure element "r-2-2" (2009) is restricted by the generic stucture element "R-1-2" (1103). Its right-under structure has been determined to be a list consisting of a string of structure elements restricted by the generic stucture element "R-1-2-1" (1104), according to the restriction information $$(R-1-2-1) \tag{51}$$

Accordingly, it is decided that the right-under structure of the structure element "r-2-2" (2009) is a list including one structure element restricted by the generic stucture element "R-1-2-1" (1104). And the right-under structure is set.

At this time point, the generic logical structure identifiers and the logical structure status of "Abstract B" generated anew are changed as shown in FIG. 20(h). Control returns to step 1902.

Subsequently, similar processings are continued till no structure element of which the right-under structure data is "no-info" will appear. The generation processing of the logical structure ends.

At this time, the generic logical structure identifiers and the logical structure status of "Abstract B" generated anew are changed as shown in FIG. 20(i).

In the structure element generation rule of the logical structure generation program of the instant processing, the input and output electronic documents each have a single structure element. If required, the document logical structure generation system of the invention may be constructed so that the structure element generation rule can be described for a plurality of structure elements.

The logical structure is restricted by the generic logical structure "Abstract class (revised)" in FIG. 21, for example.

Let us consider a logical structure generation program for generating a logical structure of a new electronic document, which is restricted by the generic logical structure "Abstract class (revised)" in FIG. 21, from an already existing electronic document of which the logical structure is restricted by the generic logical structure "Abstract class (revised)" in FIG. 21, and another already-existing electronic document of which the logical structure is restricted by the generic logical structure "Abstract class" of FIG. 13.

It is assumed that there are no same abstract contents in the two electronic documents, and all of the abstract contents of the two electronic documents are contained in the output electronic document.

In this processing, the generic stucture element "R-2" of the generic logical structure "Abstract class (revised)" of FIG. 21 is indices of papers registered. It is assumed that the number of indices must be equal to the number of summaries of the papers.

At this time, the structure element generation rule showing this is described as follows:

The structure element designation description in the output structure element designation field $$No1 = R\text{-}1\#1.R@\text{Abstract class (revised): o} \qquad (59)$$

$$No2 = R\text{-}2\#1.R@\text{Abstract class (revised): o} \qquad (60)$$

The structure element designation description in the input structure element designation field $$Ni1 = R\text{-}1\#1.R@\text{Abstract class (revised): i} \qquad (61)$$

$$Ni2 = R@\text{Abstract class: i} \qquad (62)$$

Generation rule $$\text{count}(No1) = \text{count}(Ni1) + \text{count}(Ni2) \qquad (63)$$

$$\text{count}(No2) = \text{count}(Ni1) + \text{count}(Ni2) \qquad (64)$$

In the above description, in each of input and output, there are a plurality of structure elements referred in evaluation of the rule.

Accordingly, the output structure element designation field contains a plurality of structure element designation descriptions. The input structure element designation field contains a plurality of structure element designation descriptions. A plurality of generation variables exist.

Those are distinguished from each other by attaching "No1" and "No2" to them.

To automatically generate the logical structure by using the logical structure generation program having the structure element generation rule as described above, the flow chart of FIG. 19 must be slightly modified into the flow chart as shown in FIGS. 22a, 22b, and 22c.

Description of the logical structure processing flow will be given with reference to FIGS. 22a, 22b, and 22c.

In FIGS. 22a, 22b, and 22c a processing flow up to step 2203 is the same as the corresponding one in FIG. 19.

In step 2203 to select structure element generation rule to be applied, if the structure element designation expression which expresses the structure element selected in step 2201, is compatible with any of a plurality of the structure element designation descriptions in the output structure element designation fields, the compatible structure element generation rule is employed.

At this time point, the value one of the generation variables described in the structure element designation description in the output structure element designation field is determined.

In step 2204, if, for the generation variables of those variables described in the structure element designation description in the output structure element designation field, the structure elements to be designated by the variables are not yet determined, control checks as to whether or not there is a structure element, which satisfies the condition of the structure element designation description corresponding to the variable.

If there exist generation variables, even if single, in connection with which the structure element satisfying the condition of the structure element designation description does not exist, it is impossible to apply the structure element generation rule. Control proceeds to step 2206.

In step 2206, control checks whether or not there is a structure element of which the right-under structure has been not yet set, in which it is not decided that all of the structure element generation rules in the logical structure generation program cannot be applied.

If it is absent, an error message is displayed, and the processing ends.

If it is present, control selects one of the structure elements of which the right-under structures are not yet set, in which it is not decided that the structure element generation rules in the logical structure generation program cannot be applied, and returns to step 2202.

In step 2204, if the structure element generation rule is applicable, control evaluates the structure element generation rule, and determines the right-under structures of all of the structure elements that are designated by the generation variables described in the structure element designation descriptions in the output structure element designation fields. The electronic document used in the instant embodiment resembles the documents according to the ODA. Therefore, the instant embodiment is effective particularly for the processing of specific logical structures and content of the documents according to the ODA.

Specific layout structure of the ODA electronic documents and the generic layout structure, which restricts the specific layout structure, may have the data structures similar to the logical structure and the generic logical structure, which restricts the logical structure in the instant embodiment.

Therefore, the instant embodiment may be modified so as to generate a specific logical structure of a new electronic document, which is under the ODA rule, from a specific layout structure of an already-existing, ODA electronic document.

As seen from the foregoing description, the automatic document structure generation system of the invention can automatically generate the logical structure of a new electronic document from the logical structure of an already existing electronic document.

Accordingly, the processing of general documents as well as slips can be automated. The instant invention can greatly save a labor for the document processing in offices.

The second embodiment of the present invention will be described with reference to FIGS. 23 to 54.

Figure 23:
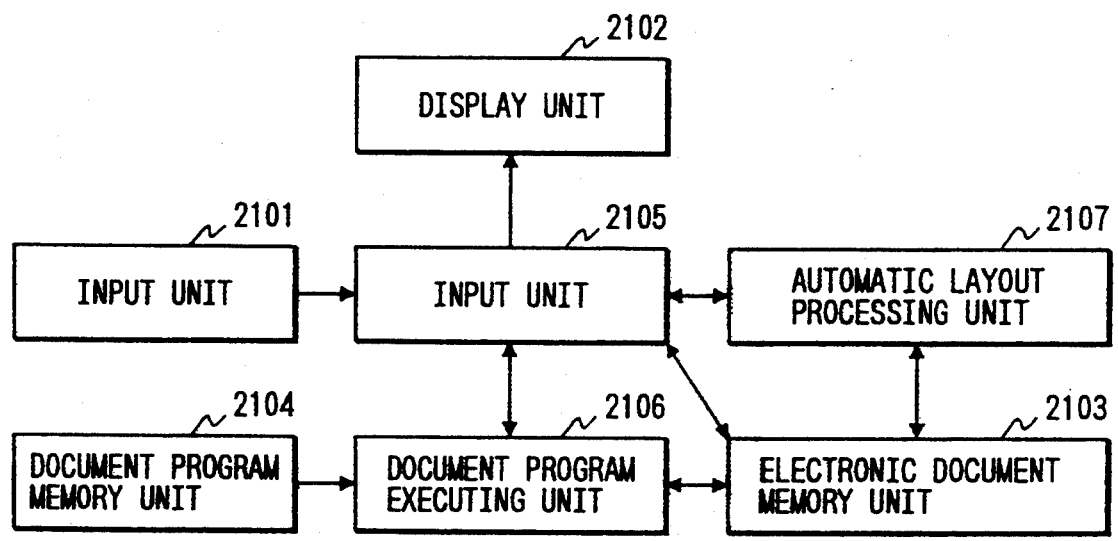
FIG. 23 is a block diagram showing the overall construction of an embodiment of an electronic document processing apparatus according to the present invention.

FIG. 23 is a block diagram showing the overall construction of the second embodiment of an electronic document processing system according to the present invention. In FIG. 23 which is similar to FIG. 1 showing the first embodiment of the present invention, reference numeral 2101 designates an input unit constituted by a keyboard, a mouse or the like. By operating the input unit 2101, a user enters edit items for editing a set of document-parts, logical structures, layout structures and document attributes, and further the user instructs the start of an automatic generation of a set of document-parts, logical structures, layout structures and document attributes, and instructs the start of an automatic layout processing, and instructs the start of an automatic document generating processing where the above two processings are performed successively.

A display unit 2102 is a CRT display, for example. An electronic document memory unit 2103 stores a part or the whole of a set of document-parts, logical structure, layout structure and document attributes of an electronic document. A document program memory unit 2104 stores a program to automatically generate the whole or a part of a set of document-parts, logical structure, and attributes of a new electronic document from an already existing electronic document. A document processing unit 2105 edits a set of document-parts, logical structure, layout structure and attributes of an electronic document read out of the electronic document memory unit 2103 according to the edit items concerning a set of document-parts, logical structure, layout structure and attributes, which are entered from the input unit 2101. The document processing unit 2105 also instructs the document program executing unit 2106 to execute the document program according to the instructions entered from input unit 2101: an instruction of starting an automatic generation of a set of document-parts, logical structure, and document attributes, and an instruction of starting an automatic document generating processing. Further, the document processing unit 2105 instructs the automatic layout processing unit 2107 to start the automatic layout processing according to an instruction of starting an automatic layout processing or automatic document generating. A document program executing unit 2106 reads the electronic document from the electronic document memory unit 2103, the document program from the document program memory unit 2104 according to an instruction to execute the document program, issued from the document processing unit 2105 so as to execute the document program, and to automatically generating the whole or a part of a set of document-parts, logical structure, and attributes of a new electronic document. An automatic layout processing unit 2107 reads the electronic document from the electronic document memory unit 2103 according to an instruction to execute the automatic layout processing issued from the document processing unit 2105, and executes the automatic layout processing.

Figure 24:
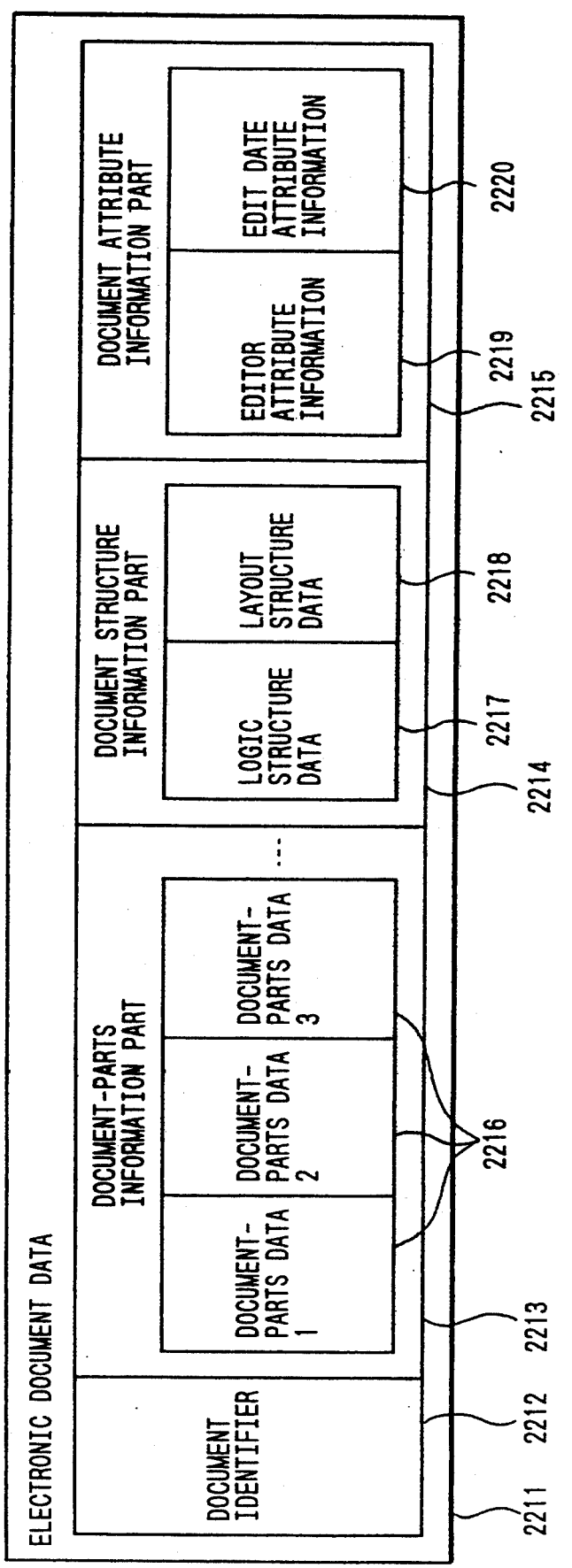
FIG. 24 is an explanatory diagram for explaining a data structure of an electronic document stored in the electronic document memory unit 2103 shown in FIG. 23.

FIG. 24 is an explanatory diagram for explaining a data structure of an electronic document stored in the electronic document memory unit 2103 shown in FIG. 23. In the figure, reference numeral 2211 designates electronic document data; 2212, a document identifier as an identifier of an electronic document; 2213, a document-parts information part containing information on document-parts as parts of an electronic document data; 2214, a document structure information part containing information on a document structure as a part of an electronic document; 2215, a document attribute information part containing information on document attributes as parts of an electronic document; 2216, document-parts data contained in the document-parts information part 2213; 2217, logical structure data 2217 contained in the document structure information part 2214; 2218, layout structure data contained in the document structure information part 2214; 2219, an editor attribute information as a part of the document attribute information part 2215; and 2220, an edit date attribute information as a part of the document attribute information part 2215.

FIG. 25 is an explanatory diagram for explaining an electronic document with an identifier "Paper A", stored in the electronic document memory unit 2103 in FIG. 23. In the figure, the document is displayed on the display unit 2102 as if it is displayed on a paper.

Reference numeral 2301 designates an entire "Paper A" and reference numerals 2302 to 2309 designate document-parts of the "Paper A".

FIG. 26 is an explanatory diagram showing a table listing attributes of the "Paper A". In the figure, reference numeral 2401 indicates an attribute name representative of the attribute of an editor who edits the document; 2402, an attribute value of the attribute designated by the attribute name 2401; 2403, an attribute name of the attribute representative of an edit date; and 2404, an attribute value of the attribute designated by the attribute name 2403.

FIG. 27 is an explanatory diagram showing a logical structure of the "Paper A", which is expressed in a tree structure showing comprehensive relationships.

In the figure, blocks 2512 to 2519 indicate document-parts of the "Paper A". In these blocks, the block 2512 corresponds to the document-part 2302 in FIG. 25; block 2513, to the document-part 2303; block 2514, to the document-part 2304; block 2515, to the document-part 2305; block 2516, to the document-part 2306; block 2517, to the document-part 2307; block 2518, to the document-part 2308; and block 2519, to the document-part 2309.

Blocks 2501 to 2511 indicate each a group of document-parts as grouped on the basis of logical meaning. For example, a title 2505 includes a text 2512. A header 2502 includes the title 2505, an author's name 2506, and a post 2507.

FIG. 28 is also an explanatory diagram showing a layout structure of the "Paper A", which is also expressed in a tree structure showing comprehension relationships.

In the figure, blocks 2614 to 2621 indicate document-parts of the "Paper A". In these blocks, the block 2614 corresponds to the document-part 2302 in FIG. 25; block 2615, to the document-part 2303; block 2616, to the document-part 2304; block 2617, to the document-part 2305; block 2618, to the document-part 2306; block 2619, to the document-part 2307; block 2620, to the document-part 2308; and block 2621, to the document-part 2309.

Blocks 2601 to 2513 indicate each a set of document-parts as categorized from a layout point of view. For example, a block 2606 includes a text 2614. A page 2602 includes frames 2603 to 2605.

Figure 29:
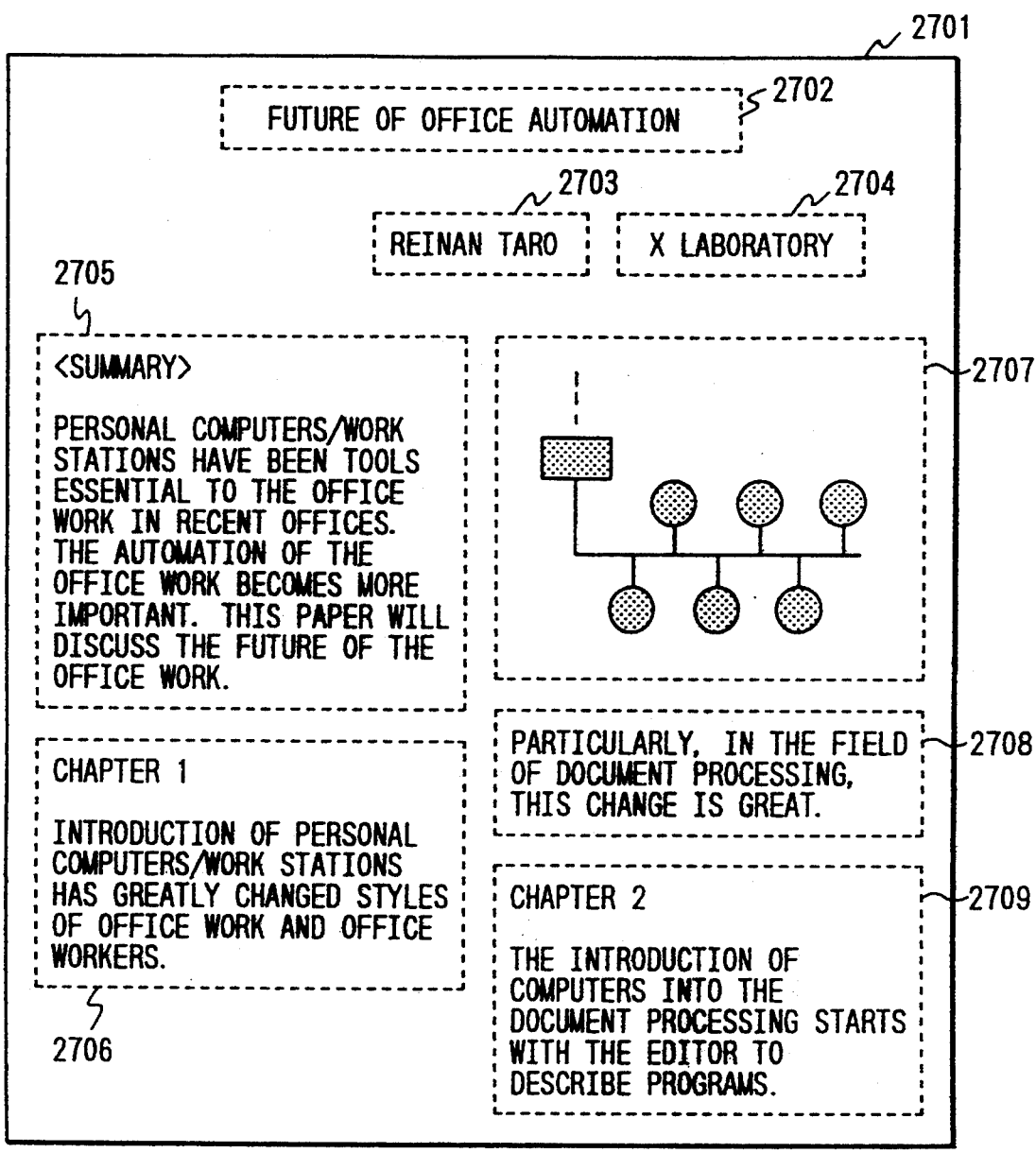
FIG. 29 is an explanatory diagram for explaining an electronic document with an identifier "Paper B", stored in the electronic document memory unit 2103 in FIG. 23.

FIG. 29 is an explanatory diagram for explaining an electronic document with an identifier "Paper B", stored in the electronic document memory unit 2103 in FIG. 23.

Reference numeral 2701 designates an entire "Paper B".

Reference numerals 2702 to 2709 designate document-parts of the "Paper B".

The "Paper B", like the "Paper A", has document attributes, logical structure, and layout structure similar to those shown in FIGS. 26 to 28.

Figure 30:
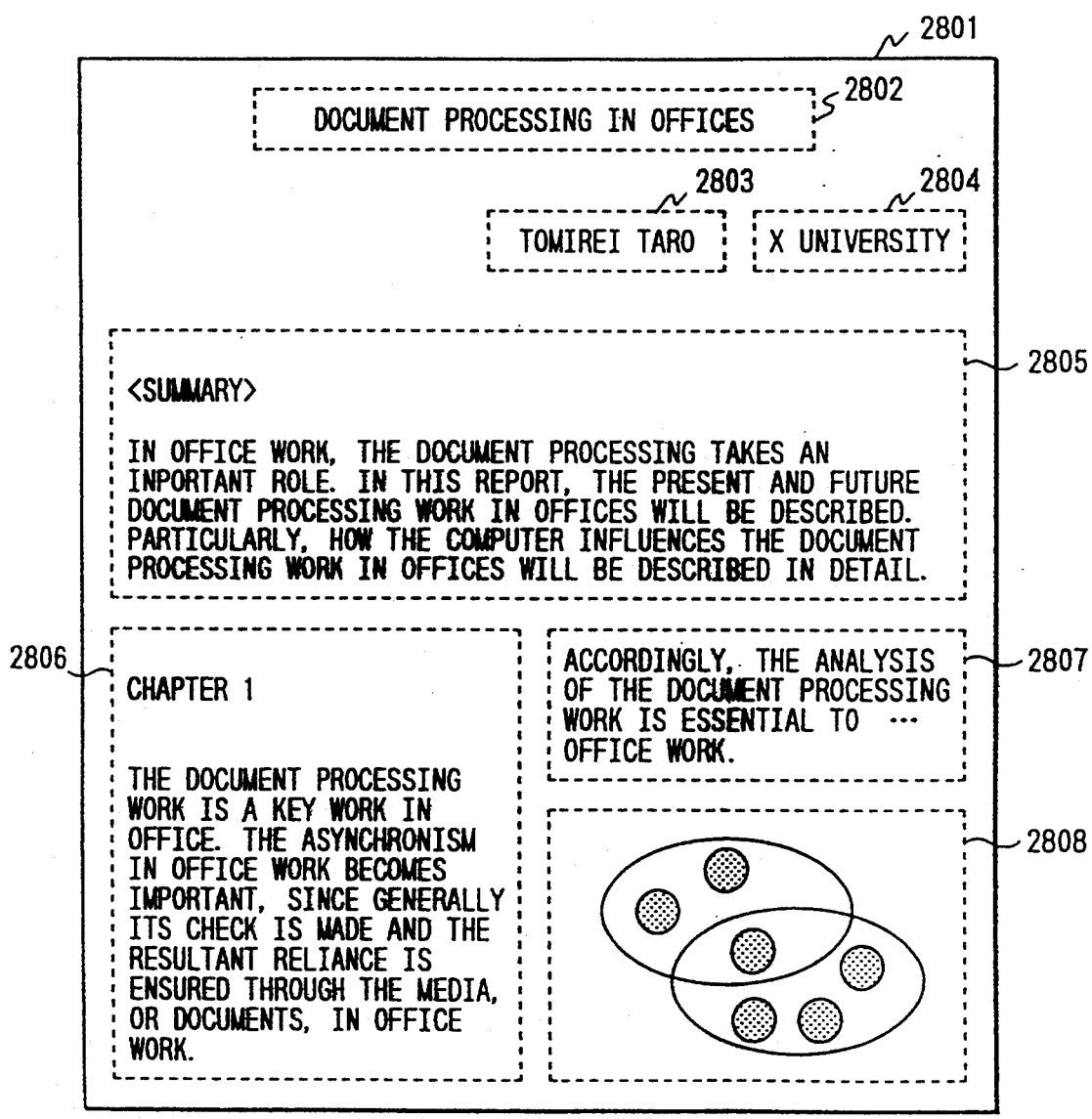
FIG. 30 is an explanatory diagram for explaining an electronic document with an identifier "Paper C", stored in the electronic document memory unit 2103 in FIG. 23.

FIG. 30 is an explanatory diagram for explaining an electronic document with an identifier "Paper C", stored in the electronic document memory unit 2103 in FIG. 23. In the figure, reference numeral 2801 designates an entire "Paper C". Reference numerals 2802 to 2808 indicate document-parts of the "Paper C".

The "Paper C", like the "Paper A", has document attributes, logical structure, and layout structure as shown in FIGS. 26 to 28.

FIG. 31 is an explanatory diagram for explaining an electronic document which is automatically generated from the "Paper A", "Paper B", and "Paper C" when the document program executing unit 2106 (FIG. 23) executes a document program (to be given in later and shown in FIG. 36) stored in the document program memory unit 2104 (FIG. 23). The identifier of the electronic document is "Abstract".

In the figure, reference numeral 2901 designates an entire "Abstract". Numerals 2902 to 2913 designate the document-parts constituting the "Abstract".

FIG. 32 is a table listing attributes of the "Abstract". In the figure, reference numeral 21001 indicates an attribute name representative of the attribute of an editor who edits the document; 21002, an attribute value of the attribute designated by the attribute name 21001; 21003, an attribute name of the attribute representative of an edit date; 1004, an attribute value of the attribute designated by the attribute name 21003.

Figure 33:
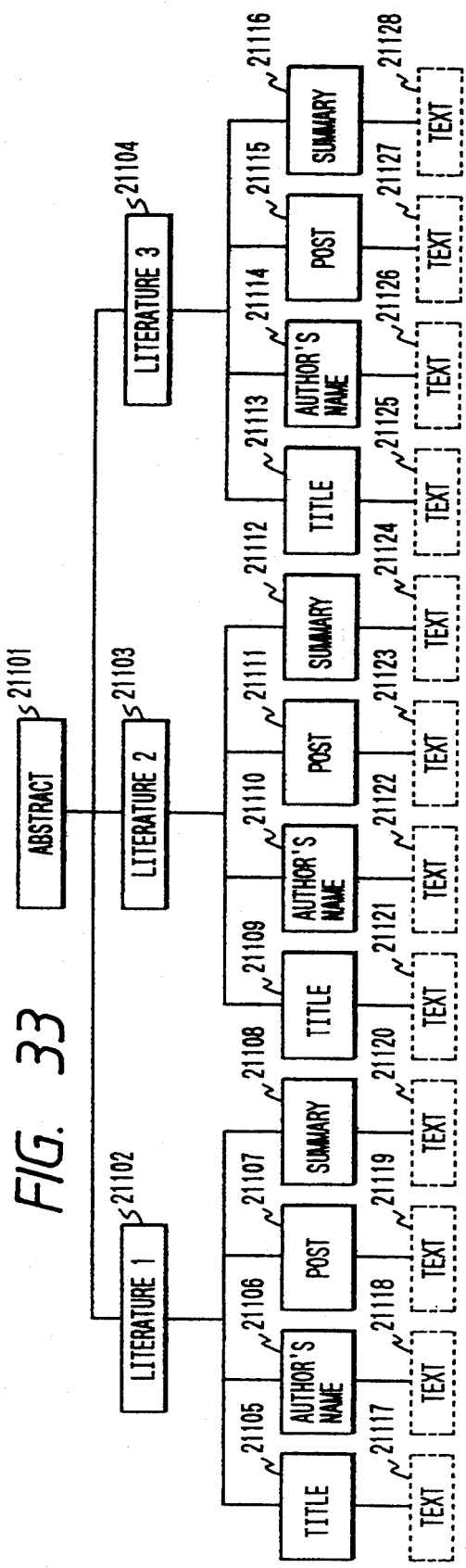
FIG. 33 is an explanatory diagram showing a logic structure of the "Abstract"

FIG. 33 is an explanatory diagram showing a logical structure of the "Abstract". Reference numerals 21117 to 21128 designate document-parts constituting the "Abstract".

In the figure, the document-parts in FIG. 33 respectively correspond to those in FIG. 31 in the following:
the document-part 21117 to the document-part 2902;
the document-part 21118 to the document-part 2903;
the document-part 21119 to the document-part 2904;
the document-part 21120 to the document-part 2905;
the document-part 21121 to the document-part 2906;
the document-part 21122 to the document-part 2907;
the document-part 21123 to the document-part 2908;
the document-part 21124 to the document-part 2909;
the document-part 21125 to the document-part 2910;
the document-part 21126 to the document-part 2911;
the document-part 21127 to the document-part 2912;
and the document-part 21128 to the document-part 2913.

Reference numerals 21101 to 21116 designate blocks showing document-parts as logically categorized.

Figure 34:
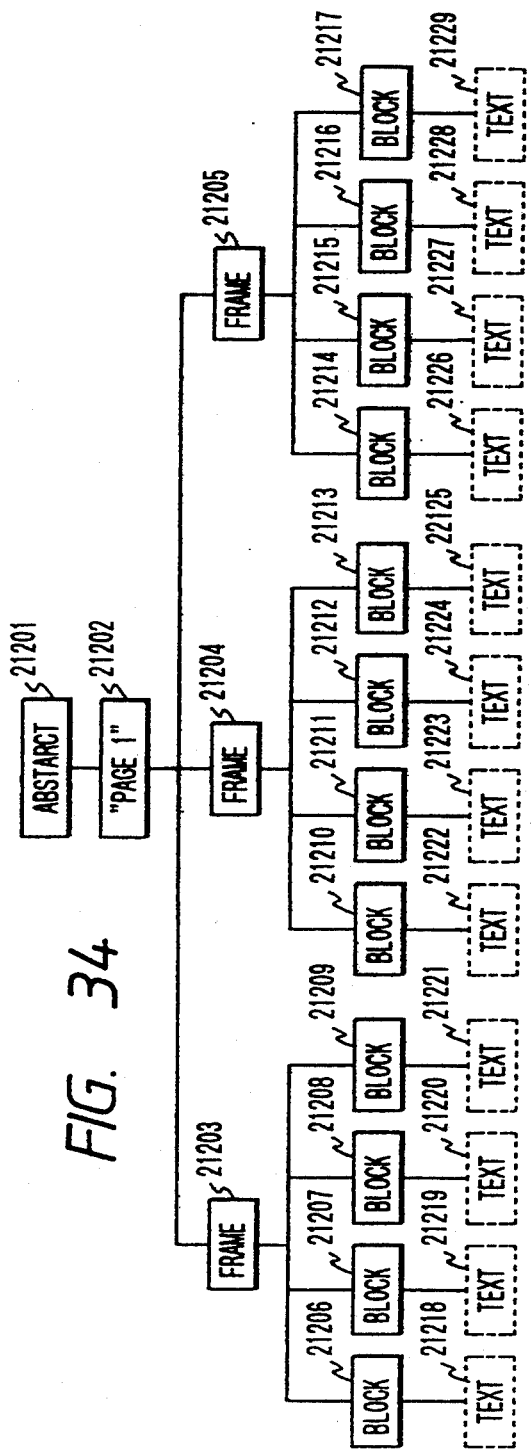
FIG. 34 is an explanatory diagram showing a layout structure of the "Abstract"

FIG. 34 is an explanatory diagram showing a layout structure of the "Abstract".

Reference numerals 21218 to 21229 designate document-parts constituting the "Abstract".

In the figure, the document-parts in FIG. 34 respectively correspond to those in FIG. 31 in the following:
the document-part 21218 to the document-part 2902;
the document-part 21219 to the document-part 2903;
the document-part 21220 to the document-part 2904;
the document-part 21221 to the document-part 2905;
the document-part 21222 to the document-part 2906;
the document-part 21223 to the document-part 2907;
the document-part 21224 to the document-part 2908;
the document-part 21225 to the document-part 2909;
the document-part 21226 to the document-part 2910;
the document-part 21227 to the document-part 2911;
the document-part 21228 to the document-part 2912;
and the document-part 21229 to the document-part 2913.

Reference numerals 21201 to 21217 designate blocks showing document-parts as categorized according to the layout structure.

FIG. 35 is a diagram showing a data structure of a document program stored in the document program memory unit. In the figure, reference numeral 21301 designates a document program; 21302, a document program identifier as an identifier of a document program; and 21303, a main body of a document program.

FIG. 36 is a diagram showing an example of the document program described in the document program memory unit 2104. A document program identifier of the program is "Abstract Generation". The program is used for automatically generating a set of document-parts, logical structure, and document attributes of the abstract from the "Paper A", "Paper B", and "Paper C".

Figure 37A:
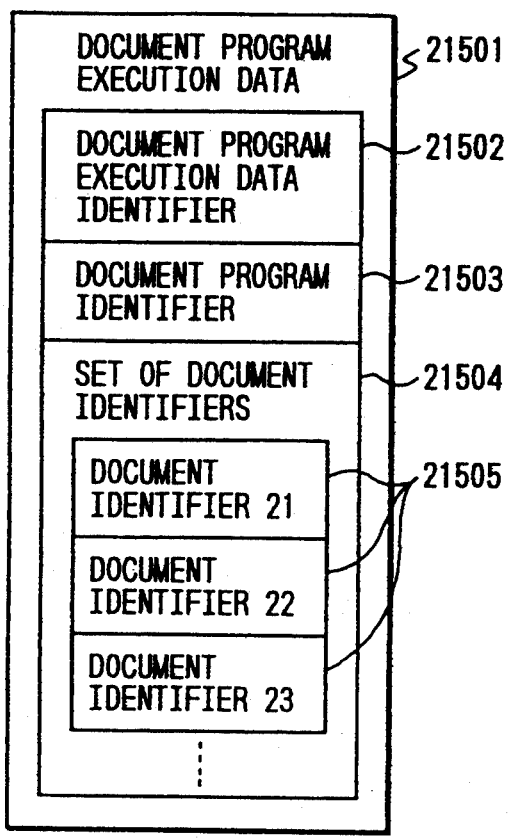
FIG. 37(a) is a diagram showing a data structure of document program execution data which is transferred to the document program executing unit 2106 by the document processing unit 2105.

FIG. 37(*a*) is a diagram showing a data structure of document program execution data which is transferred to the document program executing unit 2106 by the document processing unit 2105.

The document program executing unit 2106, when receiving the document program execution data, executes a document program according to the execution data.

Reference numeral 21501 designates document program execution data; 21502, an identifier of the document program execution data; 21503 an identifier of a document program to be executed; 21504, a set of document identifiers in which identifiers of a plurality of electronic documents to be inputs to a document program are described; and 21505, the identifiers of the individual electronic documents to be inputs to the document program.

FIG. 37(*b*) is a diagram showing a data structure of an example of the document program execution data.

Figure 38A:
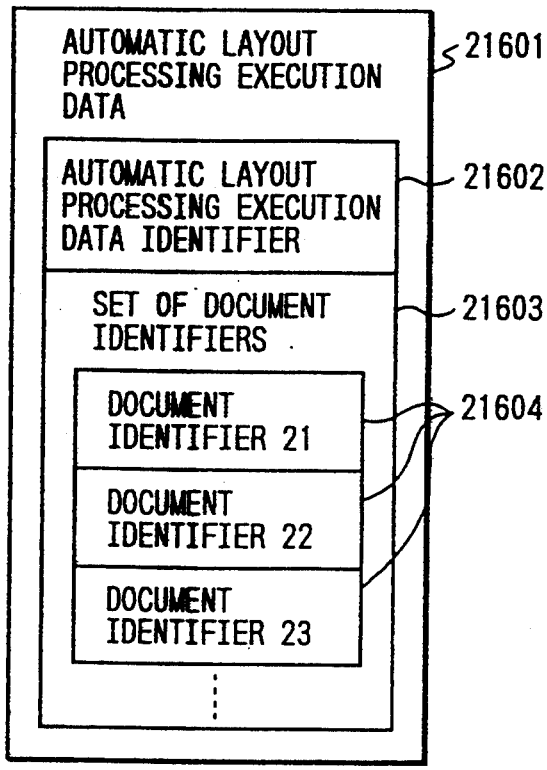
FIG. 38(a) is a diagram showing a data structure of automatic layout processing execution data which is transferred to the automatic layout processing unit 2107 by the document processing unit 2105.

FIG. 38(*a*) is a diagram showing a data structure of automatic layout processing execution data which is transferred to the automatic layout processing unit 2107 by the document processing unit 2105. The automatic layout processing unit 2107, when receiving the automatic layout processing execution data executes an automatic layout processing according to the execution data.

Reference numeral 21601 designates automatic layout processing execution data; 21602, an identifier of the automatic layout processing execution data; 21603, a set of document identifiers in which identifiers of a plurality of electronic documents to be subjected to the automatic layout processing; and 21604, the identifiers of the individual electronic documents to be automatically layout processed.

FIG. 38(*b*) is a diagram showing a data structure of an example of the automatic layout processing execution data.

Figure 39A:
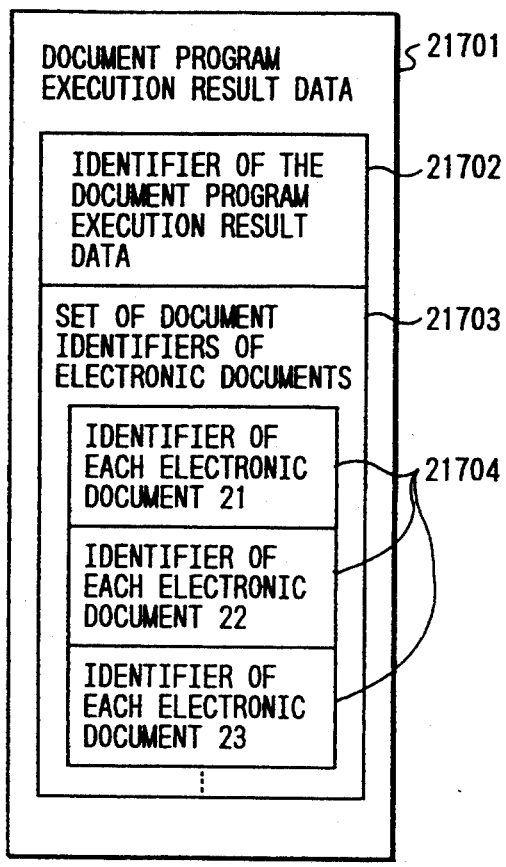
FIG. 39(a) is a diagram showing a data structure of document program execution result data, which is transferred from the document program executing unit 2106 to the document processing unit 2105 when the execution of the document program ends in the document program executing unit 2106 in FIG. 23; example of the document program execution result data.

FIG. 39(*a*) is a diagram showing a data structure of document program execution result data, which is transferred from the document program executing unit 2106 to the document processing unit 2105 when the execution of the document program ends in the document program executing unit 2106 in FIG. 23.

In the figure, reference numeral 21701 designates document program execution result data; 21702, an identifier of the document program execution result data; 21703, a set of document identifiers of electronic documents where the identifiers of electronic documents of which sets of document-parts, logical structures, and document attributes are partially or wholly generated as the result of executing the document program, are described; and 21704, an identifier of each electronic document of which a set of document-parts, logical structure, and document attributes are partially or wholly generated as the result of executing the document program.

Figure 39B:
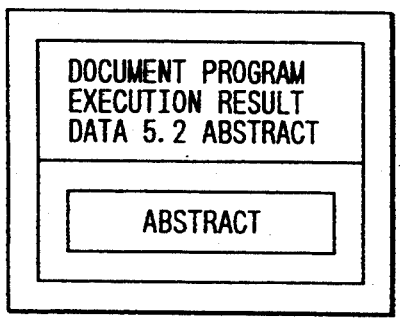
FIG. 39(b) is a diagram showing a data structure of an example of the document program execution result data.

FIG. 39(b) is a diagram showing a data structure of an example of the document program execution result data.

Figure 40A:
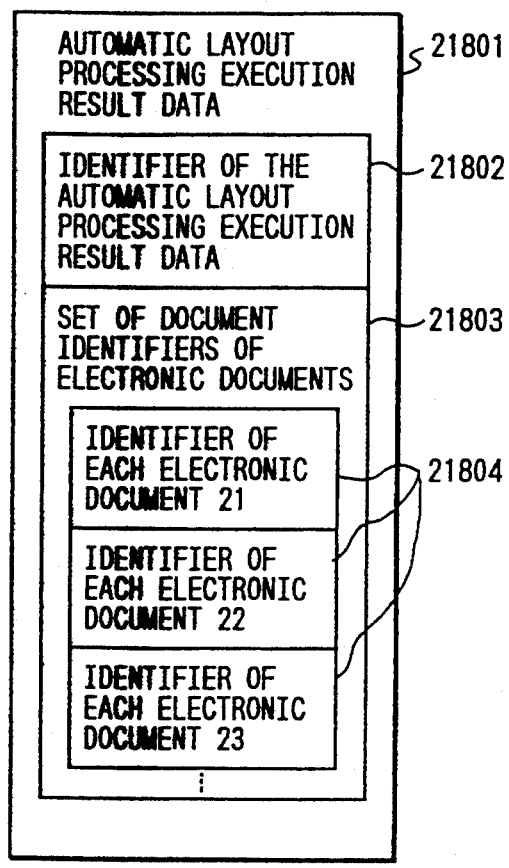
FIG. 40(a) is a diagram showing a data structure of automatic layout processing execution result data which is transferred from the automatic layout processing unit 2107 to the document processing unit 2105 when the execution of an automatic layout processing ends in the automatic layout processing unit 2107 in FIG. 23.

FIG. 40(a) is a diagram showing a data structure of automatic layout processing execution result data which is transferred from the automatic layout processing unit 2107 to the document processing unit 2105 when the execution of an automatic layout processing ends in the automatic layout processing unit 2107 in FIG. 23.

In the figure, reference numeral 21801 designates automatic layout processing execution result data; 21802, an identifier of the automatic layout processing execution result data; 21803, a set of document identifiers of electronic documents where the results of executing the automatic layout processing; and 21804, an identifier of each electronic document of which the layout structure is generated as the result of executing the automatic layout processing.

Figure 40B:
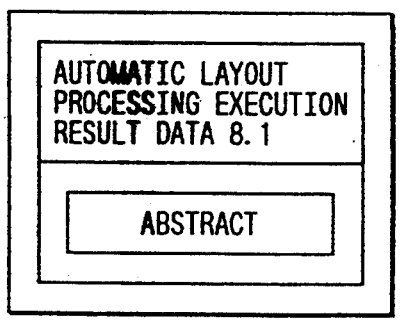
FIG. 40(b) is a diagram showing a data structure of an example of the automatic layout processing execution result data.
Figure 41A:
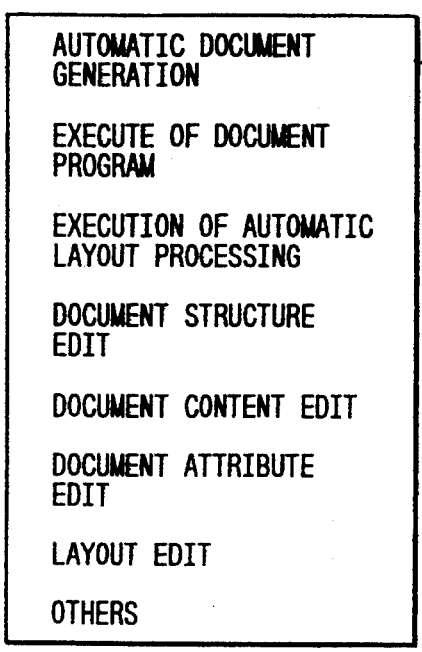
FIG. 41(a) is a diagram showing a menu displayed on the display unit 2102, which is used when a user instructs the execution of a document program and an automatic layout processing, and an edit of a set of document-parts, logic structure, layout structure, and document attributes.

FIG. 40(b) is a diagram showing a data structure of an example of the automatic layout processing execution result data. FIG. 41(a) is a diagram showing a menu displayed on the display unit 2102, which is used when a user instructs the execution of a document program and an automatic layout processing, and an edit of a set of document-parts, logical structure, layout structure, and document attributes. In the figure, the menu is designated by reference numeral 21901.

Figure 41B:
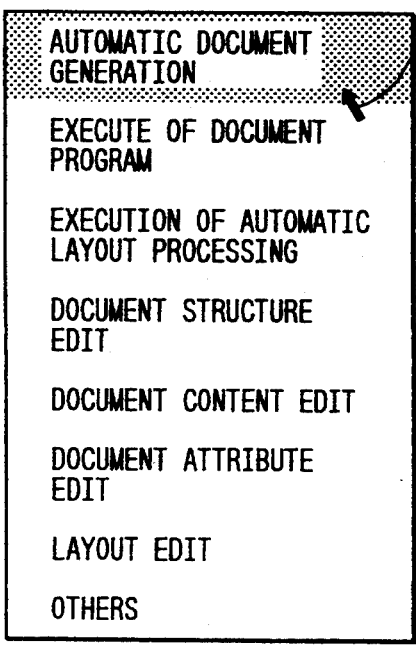
FIG. 41(b) is a diagram showing how a user selects his desired item in the menu 21901 by means of a cursor 21902.

FIG. 41(b) is a diagram showing how a user selects his desired item in the menu 21901 by means of a cursor 21902.

Figure 42A:
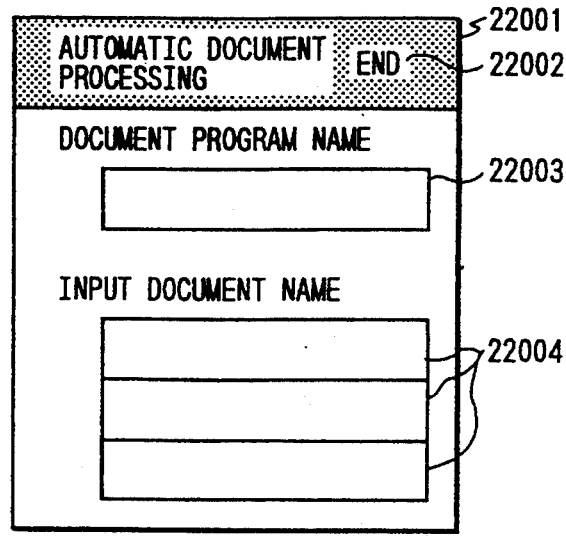
FIG. 42(a) is a diagram showing an automatic document generation processing window, which is displayed on the display unit 2102 in FIG. 23, the window being used for entering information for the automatic document generation.

FIG. 42(a) is a diagram showing an automatic document generation processing window, which is displayed on the display unit 2102 in FIG. 23, the window being used for entering information for the automatic document generation. In the figure, 22001 designates an automatic document generation window; 22002, an end button for transmitting the end of entering operation to the document processing unit 2105; 22003 a document program identifier field in which an identifier of a document program to be executed is described; 22004, an input document identifier field in which an identifier of an electronic document as an input to a document program.

Figure 42B:
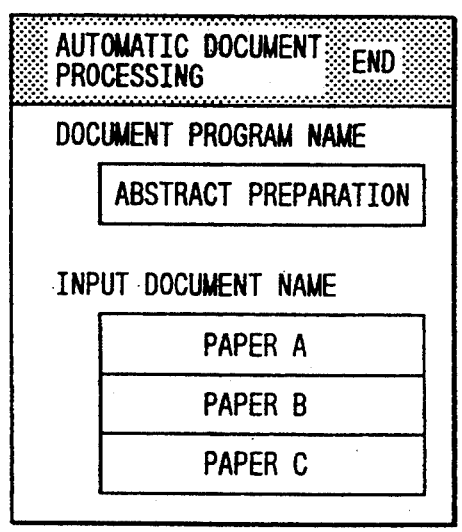
FIG. 42(b) is a diagram showing an automatic document generation processing window when the fields are filled with the information.

FIG. 42(b) is a diagram showing an automatic document generation processing window when the fields are filled with the information.

Figure 43:
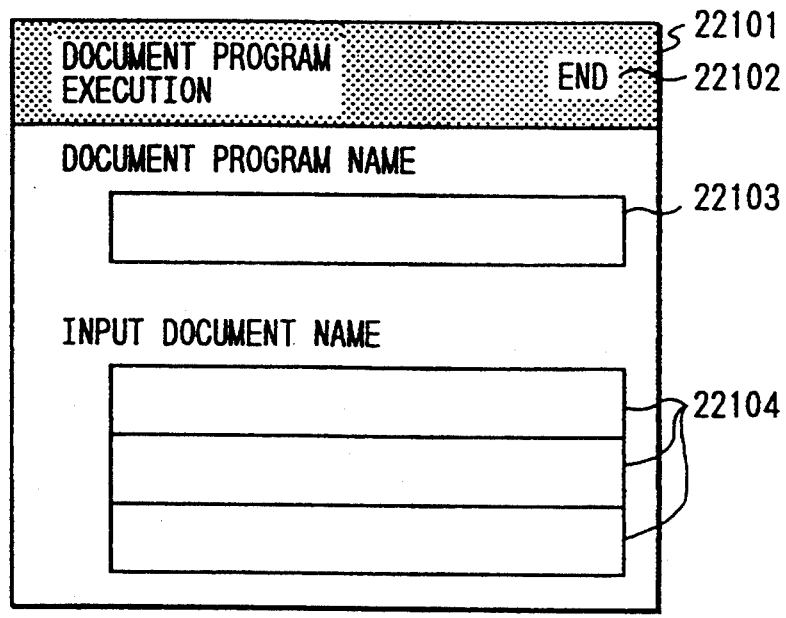
FIG. 43 is a diagram showing a document program execution window, which is displayed on the display unit 2102 in FIG. 23, the window being used for entering information for the document program.

FIG. 43 is a diagram showing a document program execution window, which is displayed on the display unit 2102 in FIG. 23, the window being used for entering information for the document program. In the figure, 22101 designates a document program execution window; 22102, an end button for transmitting the end of entering operation to the document processing unit 2105; 22103 a document program identifier field in which an identifier of a document program to be executed is described; 22104, an input document identifier field in which an identifier of an electronic document as an input to a document program.

Figure 44:
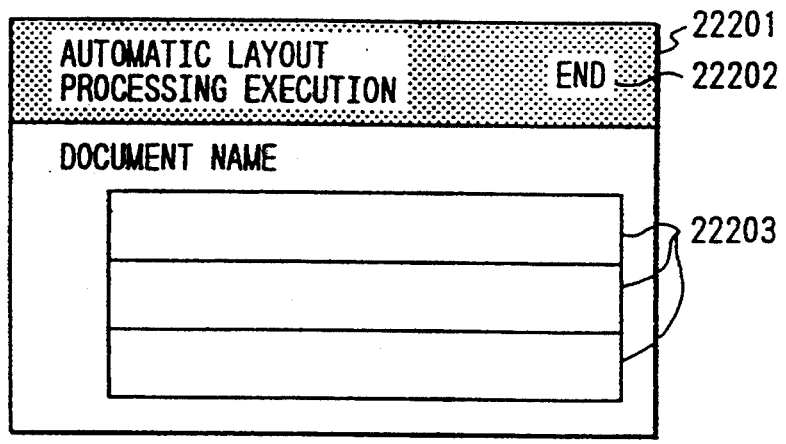
FIG. 44 is a diagram showing an automatic layout processing window, which is displayed on the display unit 2102 in FIG. 23, the window being used for entering information on the execution of the automatic layout processing.

FIG. 44 is a diagram showing an automatic layout processing window, which is displayed on the display unit 2102 in FIG. 23, the window being used for entering information on the execution of the automatic layout processing. In the figure, reference numeral 22201 designates an automatic layout processing window; 22202, an end button for transmitting the end of entering operation to the document processing unit 2105; 22203 a document program identifier field in which an identifier of a document program to be subjected to an automatic layout processing is described.

Figure 45:
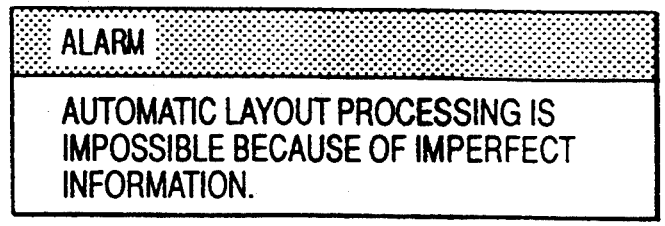
FIG. 45 is an explanatory diagram showing an alarm message, which is to be displayed on the display unit 2102, when information on any of a set of document-parts, logic structure, document attributes of an electronic document to be processed when the automatic layout processing is executed, is imperfect.

FIG. 45 is an explanatory diagram showing an alarm message, which is to be displayed on the display unit 2102, when information on any of a set of document-parts, logical structure, document attributes of an electronic document to be processed when the automatic layout processing is executed, is imperfect.

FIGS. 46 to 48 are diagrams showing processes of generating logical structures of electronic documents outputted when the document program executing unit 2106 executes the document program (shown in FIG. 36) for the "Paper A", "Paper B", and "Paper C" (shown in FIGS. 25, 29, and 30).

Figure 49:
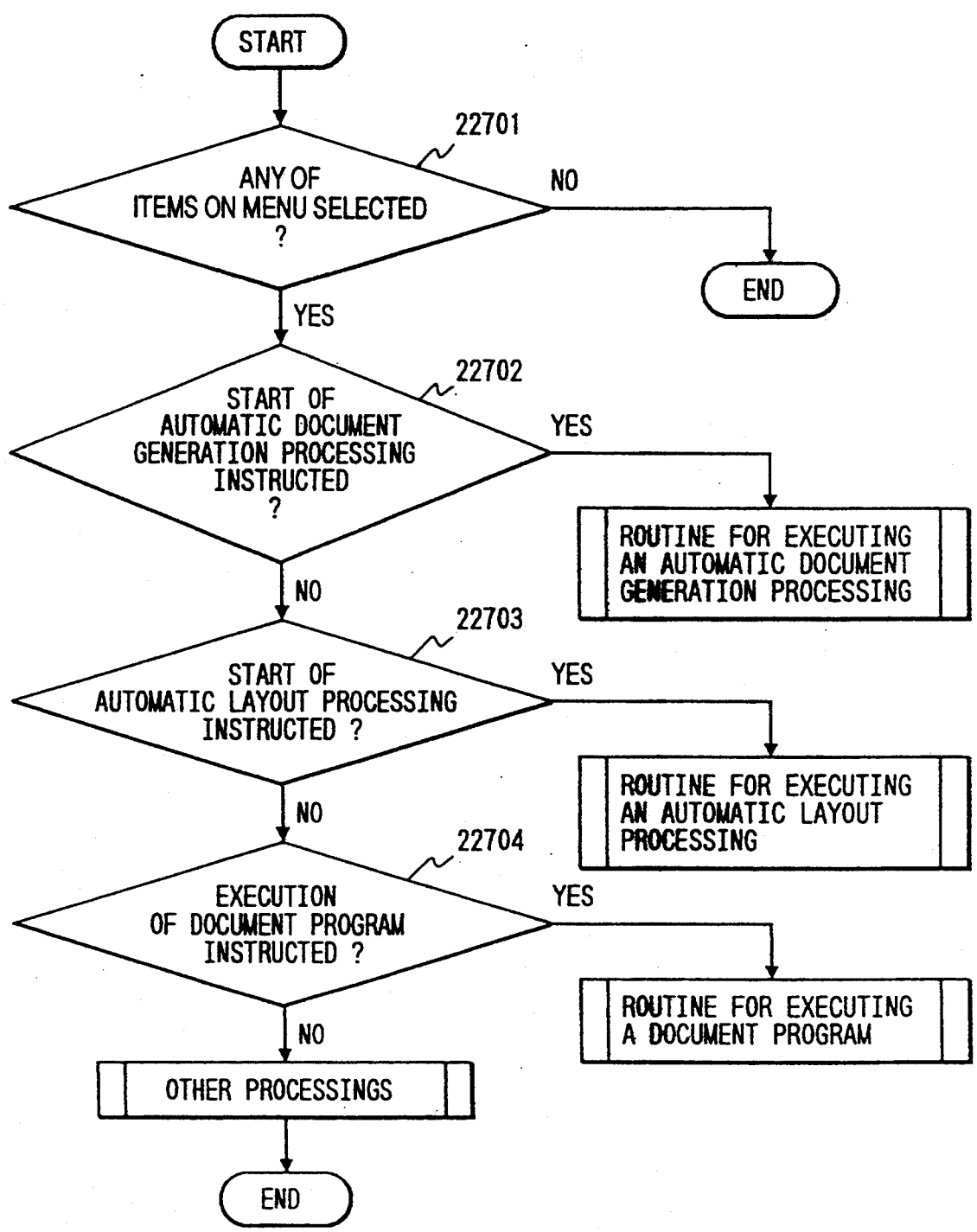
FIG. 49 a flow chart showing a flow of an actual processing when a processing item is selected on the menu of FIG. 41.

FIG. 49 is a flow chart showing a flow of an actual processing when a processing item is selected on the menu of FIG. 41.

Figure 50A:
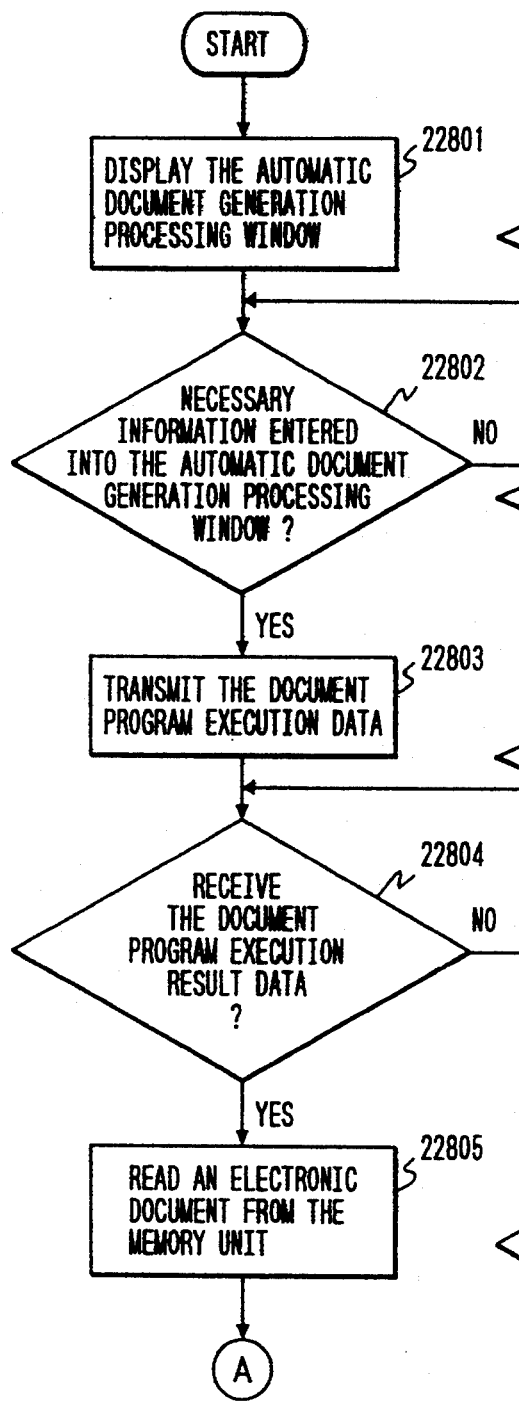
FIGS. 50a and 50b are flow charts showing a processing flow of an execution routine of an automatic generation processing to be executed by the document processing unit 2105.
Figure 50B:
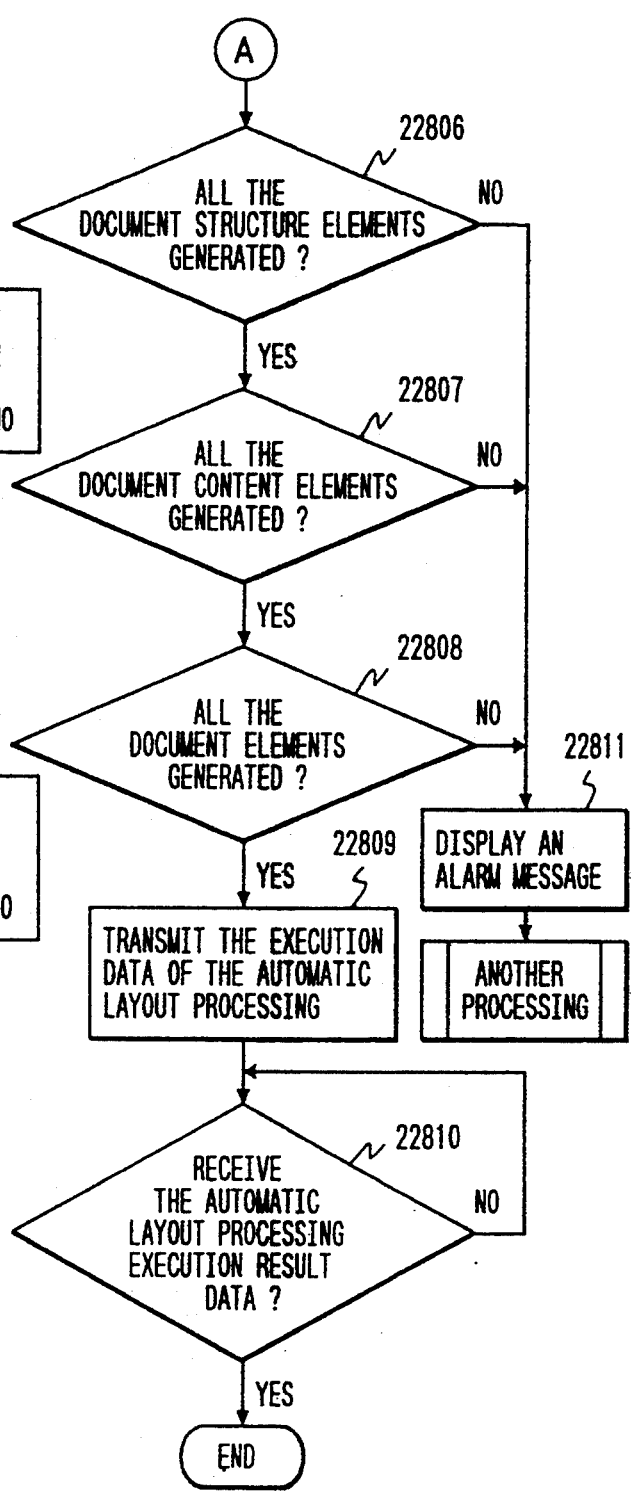

FIGS. 50a and 50b are flow charts showing a processing flow of an execution routine of an automatic document generation processing to be executed by the document processing unit 2105.

Figure 51:
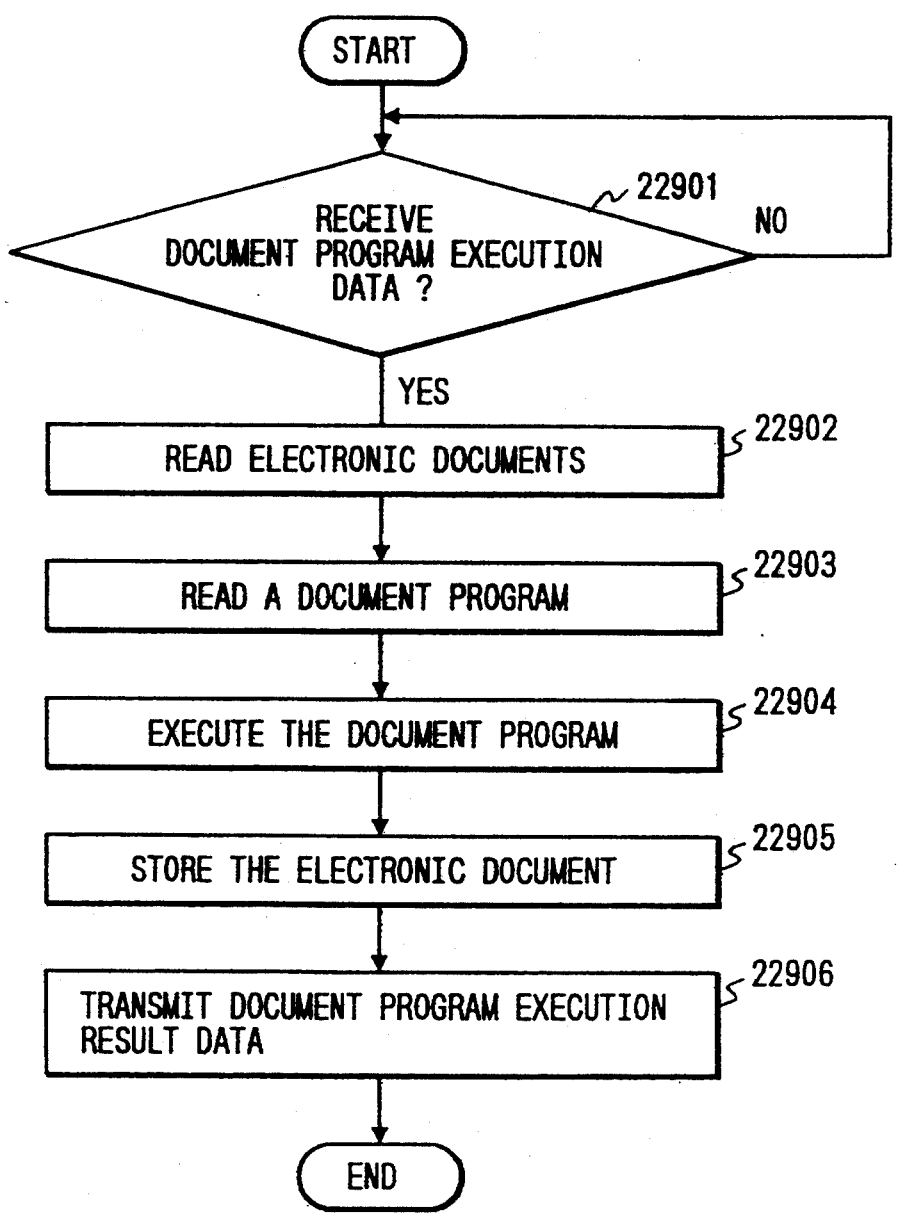
FIG. 51 is a flow chart showing a processing flow of a document program to be executed by the document program executing unit 2106.

FIG. 51 is a flow chart showing a processing flow of a document program to be executed by the document program executing unit 2106.

Figure 52:
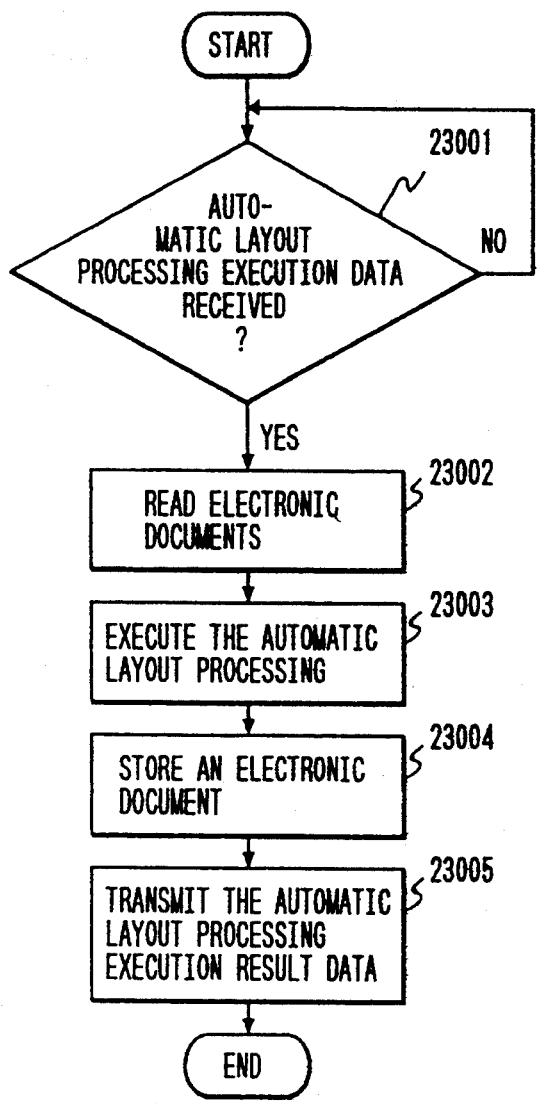
FIG. 52 is a flow chart showing a processing flow of the execution of an automatic layout processing executed by the automatic layout processing unit 2107.

FIG. 52 is a flow chart showing a processing flow of the execution of an automatic layout processing executed by the automatic layout processing unit 2107.

Figure 53:
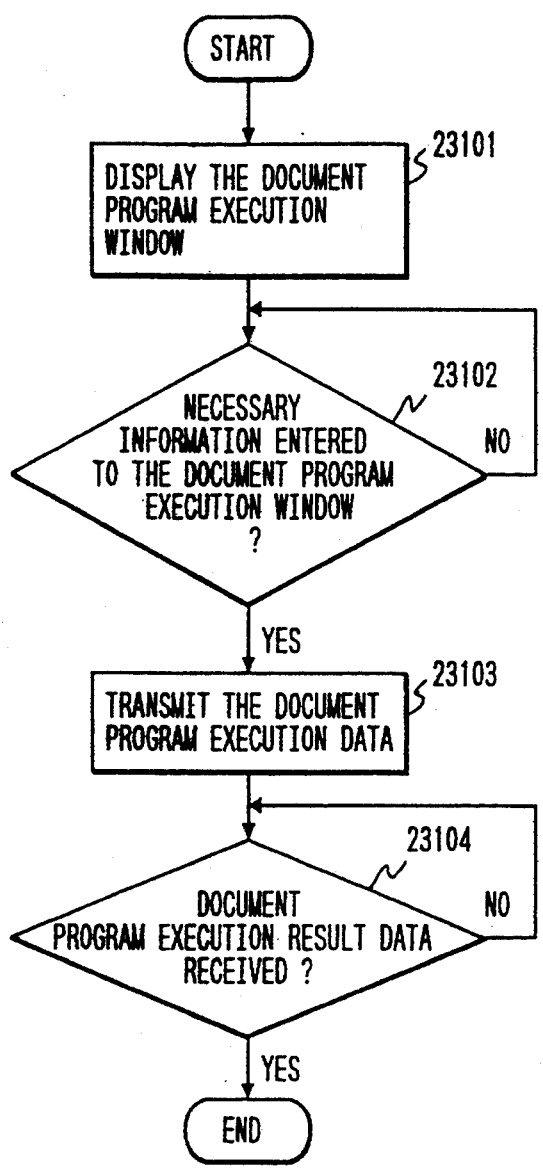
FIG. 53 is a flow chart showing a processing flow of an execution routine of a document program executed by the document processing unit 2105.

FIG. 53 is a flow chart showing a processing flow of an execution routine of a document program executed by the document processing unit 2105.

Figure 54A:
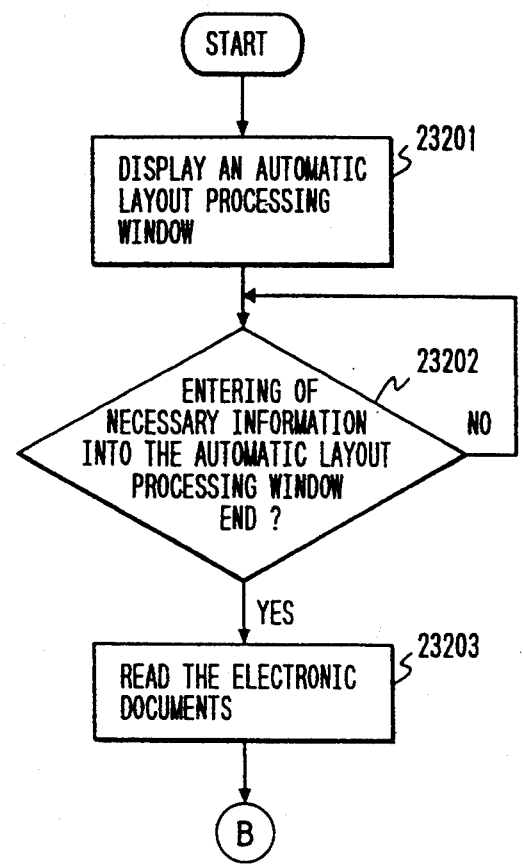
FIGS. 54a and 54b are flow charts showing a processing flow of an execution routine of an automatic layout processing executed by the document processing unit 2105.
Figure 54B:
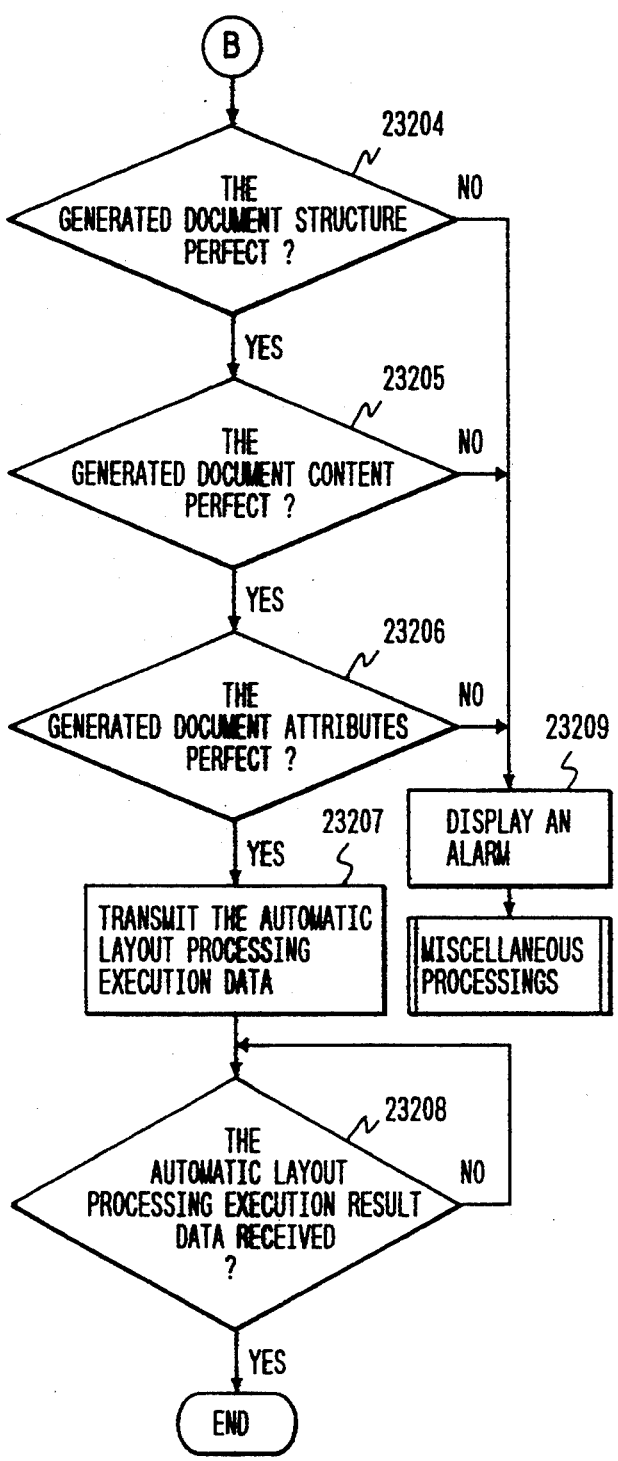

FIGS. 54a, and 54b are flow charts showing a processing flow of an execution routine of an automatic layout processing executed by the document processing unit 2105.

The processing flows of an automatic document generation processing, execution of a document program, and an automatic layout processing in the electronic document processing apparatus shown in FIG. 23 will be described with reference to FIGS. 49 to 54.

The item selection will first be described using a flow chart of FIG. 49.

In the present embodiment, the menu 21901 is displayed on the display unit 2102, and a desired item is selected by means of the cursor 21902.

In step 22701, control detects the selection on the menu.

After the menu selection is detected, control checks which of the items on the menu is selected in step 22702 and the subsequent steps.

If the selected item is "Automatic Document Generation", a routine for executing an automatic document generation processing is started up (step 22702). I If the item is "Execution of Automatic Layout Processing", a routine for executing an automatic layout processing is started up (step 22703).

If the selected item is "Execution of Document Program", a routine for executing a document program (step 22704).

A processing flow of the routine for executing an automatic document generation processing will be described with reference to the flow chart(s) of FIG. 50a and 50b. In the description to follow, the Abstract shown in FIG. 31 is automatically generated from the "Paper A" (FIG. 25), "Paper B" (FIG. 29), and "Paper C" (FIG. 30), by the document program having the identifier "Abstract Generation" shown in FIG. 36.

The "Automatic Document Generation" is selected on the menu 21901 in FIG. 41. Then, the automatic document generation processing window 22001 is displayed on the display unit 2102 (step 22801).

After necessary information is entered into the automatic document generation processing window 22001, and the end button 22002 is pushed by the mouse cursor (step 22802), the document program execution data is generated according to the content of the automatic document generation processing window 22001, and is sent to the document program executing unit 2106 (step 22803).

In this instance, the input to the automatic document generation processing window is as shown in FIG. 42(b), and the document program execution data to be generated is as shown in FIG. 37 (b).

After the document program execution data is transmitted, the apparatus waits for the document program execution result data that is sent from the document program executing unit 2106 (step 22804).

When receiving the document program execution result data from the document program executing unit 2106, the control of the apparatus reads an electronic document of which a set of document-parts, logical structure, and document attributes are generated anew, from the electronic document memory unit 2103 (step 22805).

In this instance, the document program execution result data is as shown in FIG. 39(b). The document processing unit 2105 fetches an electronic document with an identifier "Abstract". At this stage, the electronic document generated is imperfect, viz., it has not yet a layout structure.

In some combinations of the input document and the document program, a set of document-parts, logical structure, and document attributes that are generated are still imperfect.

The electronic document that is fed to the document processing unit 2105 in step 22805 is checked whether or not the set of document-parts, logical structure, and document attributes are completely generated in steps 22806 to 22808.

If the set of document-parts, logical structure, and document attributes are imperfect, an alarm message as shown in FIG. 45 is displayed on the display unit 2102 (step 22811), and control goes to another processing step.

If those are perfect, the automatic layout processing execution data is generated and transmitted to the automatic layout processing unit 2107 (step 22809).

Figure 38B:
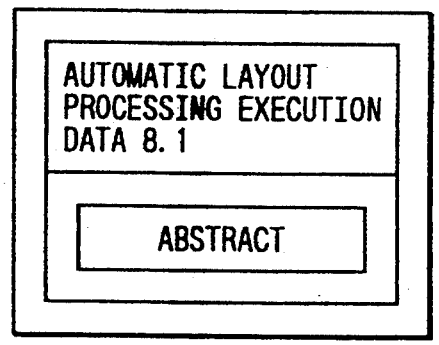
FIG. 38(b) is a diagram showing a data structure of an example of the automatic layout processing execution data.

In this instance, the automatic layout processing execution data is as shown in FIG. 38(b).

After the automatic layout processing execution data is transmitted, the apparatus waits for the automatic layout processing execution result data that is transmitted from the automatic layout processing unit 2107 (step 22810).

In this instance, the automatic layout processing execution result data transmitted from the automatic layout processing unit 2107 is as shown in FIG. 40(b).

A processing flow of the routine for executing the document program, which is executed by the document program executing unit 2106, will be described with reference to the flow chart of FIG. 51. In the description that follows, the same example as the above will be used.

When the document program executing unit 2106 receives the document program execution data (step 22901), then the document program executing unit 2106 reads electronic documents, which are to be the input necessary for the execution of the document program, from the electronic document memory unit 2103 (step 22902).

Figure 37B:
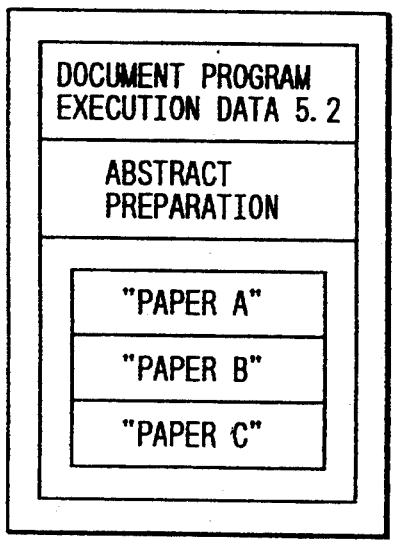
FIG. 37(b) is a diagram showing a data structure of an example of the document program execution data.

In this instance, the document program execution data received by the document program executing unit 2106 is as shown in FIG. 37(b). Accordingly, the electronic documents fetched by the document program executing unit 2106 have identifiers "Paper A", "Paper B", and "Paper C", that is, the electronic documents shown in FIGS. 25, 29, and 30.

Then, the document program designated by the document program execution data is read out of the document program memory unit 2104, and transferred into the document program executing unit 2106 (step 22903).

In this instance, the document program having an identifier "Abstract Generation" is transferred into the document program executing unit.

At the completion of the read and transfer operations of the electronic documents and the document program, the document program is executed (step 22904). As the result of executing the document program, a set of document-parts, logical structure, and document attributes of a new electronic document are generated.

In this instance, a set of document-parts, logical structure, and document attributes of a new electronic document having an identifier "Abstract" are generated.

Following the new document generation, the new document is stored into the electronic document memory unit (step 22905).

Finally, the document program execution result data is generated, and transmitted to the document processing unit 2105 (step 22906).

In this instance, the document program execution result data generated is as shown in FIG. 39(b).

A processing flow of the routine for executing the automatic layout processing, which is executed by the automatic layout processing unit 2107, will be described with reference to the flow chart of FIG. 52. In the description that follows, the same example as the above will be used.

When receiving the automatic layout processing execution data (step 23001), an electronic document to be subjected to the automatic layout processing is read out of the electronic document memory unit 2103, and transmitted to the automatic layout processing unit 2107 (step 23002).

In this instance, the automatic layout processing execution data received by the automatic layout processing unit is shown in FIG. 38(b). Then, the electronic document transmitted to the automatic layout processing unit 2107 has the identifier "Abstract", viz., the electronic document shown in FIG. 31 (actually, however, the document cannot be expressed laid out as shown in FIG. 31, since the layout structure is not yet generated).

In the next step, the automatic layout processing is executed (step 23003).

As the result of executing the automatic layout processing, the layout structure of the electronic document, which is transmitted to the automatic layout processing unit 2107, is generated.

After the automatic layout processing ends, the electronic document of which the layout structure is generated is stored into the electronic document memory unit 2103 (step 23004).

Finally, the automatic layout processing execution result data is generated, and transmitted to the document processing unit 2105 (step 23005).

The automatic layout processing execution result data generated in this instance is as shown in FIG. 40(b).

Description will be given how a set of document-parts, logical structure, and document attributes of the Abstract of paper shown in FIG. 31 are generated from the "Paper A", "Paper B", and "Paper C" (FIGS. 25, 29, and 30) by the document program shown in FIG. 36.

In FIG. 36, "11" indicates a description to determine an identifier of an electronic document to be generated anew.

By the description (SetID "Abstract") of "11", the identifier of the new document is "Abstract".

"12" indicates a description to make a root node of a logical structure of the "Abstract".

By (MakeNewNode "Abstract"), a node whose name is "Abstract" is made, and by (Make Root (MakeNewNode "Abstract")), the node made is transformed into a root node.

"13" is a description to set a node named "Literature 1" to a child node of the root node made by 12.

By (MakeNewNode "Literature 1"), a node named "Literature 1" is made, and by (AddChild Abstract . . . ), the node made is transformed into a child node of a node named "Abstract".

"14" is a description to set a node named "Literature 2" to a child node of the root node made by 12.

By (MakeNewNode "Literature 2"), a node named "Literature 2" is made, and by (AddChild Abstract . . . ), the node made is transformed into a child node of a node named "Abstract".

"15" is a description to set a node named "Literature 3" to a child node of the root node made by 12.

By (MakeNewNode "Literature 3"), a node named "Literature 3" is made, and by (AddChild Abstract . . . ), the node made is transformed into a child node of a node named "Abstract".

At the stage of the program execution up to "15", a logical structure of the "Abstract" is as shown in FIG. 46.

"16" describes that a copy of a subtree starting with the node (2505 in FIG. 27) named "Title" in the logical structure of Paper A is transformed to a subtree of a node named "Literature 1" in the logical structure of the Abstract.

In (AddSubTree . . . ), the document-parts contained in the subtree are also copied, and constitute part of the document-parts of the "Abstract".

In this instance, what is copied is the document-part 2512.

At the stage of the program execution up to "16", a logical structure of the Abstract is as shown in FIG. 47.

"17" describes that a copy of a subtree starting with the node (2506 in FIG. 27) named "Author's name" in the logical structure of Paper A is transformed into a subtree of a node named "Literature 1" in the logical structure of the "Abstract".

"18" describes that a copy of a subtree starting with the node (2507 in FIG. 27) named "Post" in the logical structure of Paper A is transformed into a subtree of a node named "Literature 1" in the logical structure of the "Abstract".

"19" describes that a copy of a subtree starting with the node (2503 in FIG. 27) named "Summary" in the logical structure of Paper A is transformed into a subtree of a node named "Literature 1" in the logical structure of the "Abstract".

At the stage of the program execution up to "19", a logical structure of the Abstract is as shown in FIG. 48.

"110" describes that a copy of a subtree starting with the node named "Title" in the logical structure of Paper B is transformed into a subtree of a node named "Literature 2" in the logical structure of the "Abstract".

"111" describes that a copy of a subtree starting with the node named "Author's name" in the logical structure of Paper B is transformed into a subtree of a node a node named "Literature 2" in the logical structure of the "Abstract".

"112" describes that a copy of a subtree starting with the node named "Post" in the logical structure of Paper B is transformed into a subtree of a node a node named "Literature 2" in the logical structure of the "Abstract".

"113" describes that a copy of a subtree starting with the node named "Summary" in the logical structure of Paper B is transformed into a subtree of a node a node named "Literature 2" in the logical structure of the "Abstract".

"114" describes that a copy of a subtree starting with the node named "Title" in the logical structure of Paper C is transformed into a subtree of a node a node named "Literature 3" in the logical structure of the "Abstract".

"115" describes that a copy of a subtree starting with the node named "Author's name" in the logical structure of Paper C is transformed into a subtree of a node a node named "Literature 3" in the logical structure of the "Abstract".

"116" describes that a copy of a subtree starting with the node named "Post" in the logical structure of Paper C is transformed into a subtree of a node a node named "Literature 3" in the logical structure of the "Abstract".

"117" describes that a copy of a subtree starting with the node named "Summary" in the logical structure of Paper C is transformed into a subtree of a node a node named "Literature 3" in the logical structure of the "Abstract".

At the stage of "117", the logical structure of the Abstract is as shown in FIG. 33.

"118" describes that the document-part of those contained in the logical structure of the "Abstract", of which the document content is a Text "X laboratory" is changed to "Our laboratory".

Accordingly, it is changed to "Our laboratory", since the document content of the document-part 21123 in FIG. 33 is a Text "X laboratory".

"119" describes that an attribute value of a document attribute named "Editor" of those attributes of the "Abstract" is transformed into "Auto".

"120" describes that an attribute value of a document attribute named "Edit date" of those attributes of the "Abstract" is transformed into the date for the automatic edit.

By (Date), the date this document program was executed is outputted, and by (SetAttribute "Edit date" . . . ), the date outputted is transformed into an attribute value of a document attribute "Edit date".

As the result of executing "119" and "120", the attribute table shown in FIG. 32 is formed.

In addition to the automatic document generation processing as mentioned above, the electronic document processing apparatus of the present embodiment has the function of a document edit. In the document edit mode, edit items on a set of document-parts, logical structure, and document attributes, and edit items for making the edit for the layout structure are entered from the input unit 2101. The document processing unit 2105 makes a document edit according to the edit instructions.

While in the automatic document processing thus far described, the document program and the automatic layout processing are executed in a package, those may be executed individually.

Accordingly, an electronic document may be generated in the following manners. In the first manner, a set of document-parts, logical structure, and document attributes are generated according to the edit items entered from the input unit 2101, and then are subjected to the automatic layout processing. In the second manner, a set of document-parts, logical structure, and document attributes are automatically generated by executing the document program. Edit items for editing the layout structure are entered from the input unit 2101, and the layout structure is determined according to the entered edit items. In the third manner, a set of document-parts, logical structure, and document attributes are automatically generated by executing the document program, although those are imperfect. Then, the set of document-parts, logical structure, and document attributes are edited to be perfect by the edit items entered from the input unit 2101. Finally, those are subjected to the automatic layout processing. Thus, the electronic document may be automatically generated partially and in a flexible manner.

A processing flow of the routine for executing the document program when it is independently executed, will be described with reference to the flow chart of FIG. 53.

The item "Execution of Document Program" is selected in the menu 21901 in FIG. 41. Then, the document program execution window 22101 is displayed on the display unit 2102 (step 23101).

After necessary information is entered into the document program execution window 22101, the end button 22102 is pushed by the mouse cursor, and this is detected (step 23102). A document program execution data is generated according to the contents in the document program execution window 22101, and transmitted to the document program executing unit 2106 (step 23103).

After the document program execution data is transmitted, the apparatus waits for the document program execution result data from the document program executing unit 2106 (step 23104).

When receiving the document program execution result data, the routine for executing the document program ends.

A processing flow of the routine for executing the automatic layout processing when it is independently executed, will be described with reference to the flow chart of FIG. 54.

The item "Automatic Layout Processing" is selected in the menu 21901 in FIG. 41. Then, the automatic layout window 22201 is displayed on the display unit 2102 (step 23201).

After necessary information is entered into the automatic layout window 22201, the end button 22202 is pushed by the mouse cursor, and this is detected (step 23202). An electronic document having an identifier described in the document identifier field 22203 of the window is read out of the electronic document memory unit 2103 (step 23203).

Steps 23204 to 23206 check whether or not a set of document-parts, logical structure, and document attributes of the electronic document, that is transmitted to the document processing unit 2105 in step 23203, are perfect.

If the set of document-parts, logical structure, and document attributes are imperfect, an alarm message is displayed on the display unit 2102, and control goes to another processing step (step 23209).

If those are perfect, the automatic layout processing execution data is generated and transmitted to the automatic layout processing unit 2107 (step 23207).

After the automatic layout processing execution data is transmitted, the apparatus waits for the automatic layout processing execution result data that is transmitted from the automatic layout processing unit 2107 (step 23208).

When the automatic layout processing execution result data is received from the automatic layout processing unit 2107, the routine for executing the automatic layout processing ends.

In realizing the electronic document processing apparatus shown in FIG. 23, secondary memory devices such as hard disc and floppy discs may be used for the electronic document memory unit 2103 and the document program memory unit 2104. In addition to those, the file server coupled with the apparatus through a network may be used.

As seen from the foregoing description, a new electronic document can be automatically generated from an already existing electronic document consisting of a set of document-parts, logical structure, and document attributes. For the document generation, a user may select the automatic document generation or the document generation based the edit that is performed according to the edit items entered by the user. Accordingly, the efficiency of the electronic document generation is remarkably improved.

What is claimed is:

1. A method of generating a logical document structure for a new electronic document,
   wherein the new electronic document is to have a plurality of logically-connected document-parts;
   wherein a generic logical structure corresponds to a configuration of document-parts and is expressed by a tree-like logical connection of nodes; and
   wherein each of multiple generic logical structures includes restrictions for the connection of nodes therein;
   the method comprising the steps of:
   storing a plurality of the generic logical structures;
   storing a plurality of electronic documents, each having a logical document structure corresponding to one of the stored generic logical structures;
   storing a plurality of sets of rules, each defining a relationship between logical document structures corresponding to one of the stored generic logical structures and logical document structures corresponding to another of the stored generic logical structures;

receiving at least one of the stored electronic documents and the stored generic logic structure corresponding thereto, at least one stored generic logical structure restricting the logical document structure of the new electronic document, and at least one of the stored sets of rules defining the relationship between logical document structures corresponding to the received generic logical structures; and establishing and interconnecting nodes to generate the new logical document structure of the new electronic document, according to restrictions of the received generic logical structure restricting the logical structure of the new electronic document and according to the received set of rules.

2. A method of generating a new logical structure for a new electronic document, wherein the new electronic document is to have a plurality of logically-connected document-parts;

wherein a generic logical structure corresponds to a configuration of the document-parts and is expressed by a logic-tree structure having at least one parent node connected to at least one corresponding child node, and a leaf node being a child node having any one of the document-parts as its contents; and wherein each of multiple generic logical structures includes restrictions for the connection of nodes therein;

the method comprising the steps of:

storing a plurality of the generic logical structures;

storing a plurality of electronic documents, each having a logical document structure corresponding to one of the stored generic logical structures;

storing a plurality of sets of rules, each defining a relationship between logical document structures and logical document structures corresponding to one of the stored generic logical structures corresponding to another of the stored generic logical structures;

receiving at least one of the stored electronic documents and the stored generic logic structure corresponding thereto, at least one stored generic logical structure restricting the logical document structure of the new electronic document, and at least one of the stored sets of rules defining the relationship between logical document structures corresponding to the received generic logical structures; and establishing and interconnecting nodes to generate the new logical document structure of the new electronic document, according to restrictions of the received generic logical structure restricting the logical structure of the new electronic document and according to the received set of rules, the step of establishing and interconnecting further including the substeps of:

determining a need for one or more child nodes;

generating any child node needed for interconnection of nodes, determining, according to a descriptor in the restrictions of the received generic logical structure, whether any rule of the received set of rules is necessary for interconnection of nodes; and applying any rule determined to be necessary.

3. An electronic document processing system comprising:

an electronic document memory unit for storing a plurality of predetermined electronic documents, wherein each predetermined electronic document includes a set of logically-connected document-parts, a logical structure of the document-parts that expresses the logical relationships among the document-parts, and a generic logical structure derived from the Logical structure;

a document program memory unit for storing a program to automatically generate a new electronic document from the stored electronic documents and for storing a plurality of sets of rules defining relationships between any pair of stored generic logical structures; and a document program executing unit for receiving at least one of the stored electronic documents, a first and second of at least one of the stored generic logical structures, at least one of the stored sets of rules corresponding to the first and second generic logical structures, and the stored program and for executing the program to automatically generate the new electronic document according to the received electronic documents, first and second generic logical structures and sets of rules.

4. An electronic document processing system comprising:

an electronic document memory unit for storing a plurality of predetermined electronic documents, wherein each predetermined electronic document includes a set of logically-connected document-parts, a logical structure of the document-parts that expresses the logical relationships among the document-parts, and a generic logical structure derived from the logical structure;

a document program memory unit for storing a program to automatically generate a new electronic document from the stored electronic documents and for storing a plurality of a set of rules defining relationships between any pair of stored generic logical structures;

a document program executing unit for receiving at least one of the stored electronic documents, a first and second of at least one of the stored generic logical structures, at least one of the stored sets of rules corresponding to the first and second generic logical structures, and the stored program and for executing the program to automatically generate the new electronic document according to the received electronic documents, first and second generic logical structures and sets of rules; and an automatic layout processing unit for receiving the new electronic document and for automatically executing a physical layout structure of the new electronic document.

5. An electronic document processing system comprising:

an electronic document memory unit for storing a plurality of predetermined electronic documents, wherein each predetermined electronic document includes a set of logically-connected document-parts, a logical structure of the document-parts that expresses the logical relationships among the document-parts, and a generic logical structure derived from the logical structure;

a document program memory unit for storing a program to automatically generate a new electronic document from the stored electronic documents and for storing a plurality of sets of rules defining relationships between any pair of stored generic logical structures;

a document program executing unit for receiving at least one of the stored electronic documents, a first and second of at least One Of the stored generic logical structures, at least one of the stored sets of rules corresponding to the first and second logical structures, and the stored program and for executing the program to automatically generate the new electronic document according to the received electronic documents, first and second generic logical structures, and sets of rules;

an automatic layout processing unit for receiving the new electronic document and for automatically executing a physical layout structure of the new electronic document;

an input unit for inputting edit items; and a document processing unit for editing the new electronic document according to the edit items;

whereby an automatic generation mode or an edit mode are selectable.

* * * * *